US012118844B2

(12) United States Patent
Umeda

(10) Patent No.: US 12,118,844 B2
(45) Date of Patent: Oct. 15, 2024

(54) COIN RECEIVING AND DISPENSING DEVICE, COIN LIFTING DEVICE, AND COIN LIFTING DEVICE OF COIN RECEIVING AND DISPENSING DEVICE

(71) Applicant: ASAHI SEIKO CO., LTD, Tokyo (JP)

(72) Inventor: Masayoshi Umeda, Saitama (JP)

(73) Assignee: ASAHI SEIKO CO., LTD, Tokyo (JP)

( * ) Notice: Subject to any disclaimer, the term of this patent is extended or adjusted under 35 U.S.C. 154(b) by 748 days.

(21) Appl. No.: 17/289,442

(22) PCT Filed: Oct. 23, 2019

(86) PCT No.: PCT/JP2019/041463
§ 371 (c)(1),
(2) Date: Apr. 28, 2021

(87) PCT Pub. No.: WO2020/090571
PCT Pub. Date: May 7, 2020

(65) Prior Publication Data

US 2022/0005305 A1 Jan. 6, 2022

(30) Foreign Application Priority Data

Nov. 1, 2018 (JP) ................................. 2018-206950
Nov. 28, 2018 (JP) ................................. 2018-222163

(51) Int. Cl.
*G07D 3/04* (2006.01)
*G07D 3/10* (2006.01)
(Continued)

(52) U.S. Cl.
CPC ................. *G07D 3/04* (2013.01); *G07D 3/10* (2013.01); *G07D 9/008* (2013.01); *G07D 11/14* (2019.01); *G07D 2201/00* (2013.01)

(58) Field of Classification Search
CPC .......... G07D 11/14; G07D 7/20; G07D 11/16; G07D 11/237; G07D 11/40; G07D 11/60;
(Continued)

(56) References Cited

U.S. PATENT DOCUMENTS 4,385,481 A * 5/1983 Capawana ............... G07D 9/00 53/461
4,558,711 A * 12/1985 Ikuta Yoshiaki ......... G07D 3/14 453/3
(Continued)

FOREIGN PATENT DOCUMENTS

CN 104125934 10/2014
CN 204166606 2/2015
(Continued)

OTHER PUBLICATIONS

Official communications received in International Patent Application No. PCT/JP2019/041463, dated Dec. 24, 2019.
(Continued)

*Primary Examiner* — Jeffrey A Shapiro
(74) *Attorney, Agent, or Firm* — GREENBLUM & BERNSTEIN, P.L.C.

(57) ABSTRACT

Denominational dispensing and storing devices are arranged on three stages, and a plurality of denominational dispensing and storing devices are arranged on each stage. At least a dispensing passage is provided for each stage, the dispensing passages are stacked in an up-down direction, and a bottom plate of the dispensing passage is inclined downward toward a dispensing port side. An upward transport belt arranged and inclined upward toward the dispensing port side is arranged below a lower end of each bottom plate. A coin fed from each of the denominational dispensing and storing devices first falls onto an inclined plate from the dispensing passage, slips down, and then falls on the upward transport belt. The coin that has fallen on the upward
(Continued)

transport belt is transported to the dispensing port by the upward transport belt moving toward the dispensing port side.

9 Claims, 30 Drawing Sheets

(51) Int. Cl.
*G07D 9/00* (2006.01)
*G07D 11/14* (2019.01)

(58) Field of Classification Search
CPC ........... G07D 2207/00; G07D 2211/00; G07D 11/26; G07D 3/00; G07D 3/02; G07D 3/04; G07D 3/06; G07D 3/08; G07D 3/10; G07D 3/12; G07D 3/121; G07D 3/123; G07D 3/125; G07D 3/126; G07D 3/128; G07D 3/14; G07D 3/16; G07D 9/008; G07D 9/04; G07D 9/06; G07D 9/065; G07D 2201/00; G07D 1/00; G07D 1/02; G07D 1/04; G07D 1/06; G07D 1/08; B65H 2404/143; G07F 1/048; G07F 5/00; G07F 5/02; G07F 5/04; G07F 5/06; G07F 5/08; G07F 5/10; G07F 5/12; G07F 5/14; G07F 5/16; G07F 5/18; G07F 5/20; G07F 5/22; G07F 5/24; G07F 5/26; G07F 1/00; G07F 1/02; G07F 1/04; G07F 1/041; G07F 1/042; G07F 1/043; G07F 1/044; G07F 1/045; G07F 1/046; G07F 1/047; G07F 1/06; B65G 2047/687
See application file for complete search history.

(56) References Cited

U.S. PATENT DOCUMENTS 5,366,407 A * 11/1994 Sentoku ................... G07D 3/14 453/32
5,554,070 A * 9/1996 Takatoshi ................ G07F 17/32 134/131
6,059,650 A * 5/2000 Stoltz ..................... G07D 9/008 453/57
6,193,599 B1 * 2/2001 Kurosawa ................. G07F 5/24 453/57
6,739,965 B2 * 5/2004 String ...................... G07D 3/10 209/684
6,899,214 B2 * 5/2005 Morikawa ................ G07D 5/00 194/302
7,066,807 B2 6/2006 Abe et al.
7,112,130 B2 * 9/2006 Nishimura ............... G07D 1/00 453/56
7,377,846 B2 5/2008 Umeda
7,497,314 B2 * 3/2009 Umeda .................... G07D 3/02 194/302
8,465,349 B2 * 6/2013 Nishida .................... G07D 1/00 453/57
8,668,559 B2 * 3/2014 Bellis ..................... G07D 9/008 453/57
8,839,938 B2 * 9/2014 Shimizu ................... G07D 3/16 453/15
2003/0201146 A1 10/2003 Abe et al.
2005/0277378 A1 * 12/2005 Schimpl ................. G07D 9/008 453/18
2006/0183418 A1 8/2006 Umeda
2007/0087675 A1 * 4/2007 Umeda .................... G07D 9/00 453/3
2014/0057542 A1 * 2/2014 Abe ......................... G07D 3/00 453/3
2014/0194045 A1 * 7/2014 Fischer .................. G07D 9/008 453/3
2015/0206368 A1 * 7/2015 Fischer .................... G07D 9/00 453/3
2016/0240027 A1 * 8/2016 Onishi ................... G07D 9/008
2019/0073851 A1 * 3/2019 Umeda .................... G07D 3/14

FOREIGN PATENT DOCUMENTS

| | | |
|---|---|---|
| CN | 105133728 | 12/2015 |
| CN | 206639285 | 11/2017 |
| EP | 0831429 | 3/1998 |
| ES | 2515590 | 10/2014 |
| JP | 4-340695 | 11/1992 |
| JP | 8-2759 | 1/1996 |
| JP | 2899563 | 6/1999 |
| JP | 2003-169891 | 6/2003 |
| JP | 2003-272023 | 9/2003 |
| JP | 2006-190009 | 7/2006 |
| JP | 3820237 | 9/2006 |
| JP | 2015-109113 | 6/2015 |

OTHER PUBLICATIONS

Official communications received in International Patent Application No. PCT/JP2019/041463, dated Apr. 27, 2021.
Official Communication Received in European Application No. 19879970.2-1009, dated Oct. 20, 2022.
Official Communication Received in European Application No. 23190956.5-1009, dated Nov. 24, 2023.

* cited by examiner

COIN RECEIVING AND DISPENSING DEVICE, COIN LIFTING DEVICE, AND COIN LIFTING DEVICE OF COIN RECEIVING AND DISPENSING DEVICE

TECHNICAL FIELD

The present invention relates to a so-called circulation-type coin receiving and dispensing device that is used in an automatic fare adjustment machine, bank counter assist equipment or the like, that uses accepted coins as the coins to be dispensed.

Specifically, the present invention relates to a circulation-type coin receiving and dispensing device that enables smooth collection without causing coin jamming even when coins stored inside are collected together.

The present invention also relates to a coin lifting device for lifting a coin from a lower position to an upper position by an upward transport belt in a coin processing device such as a coin receiving device, a coin dispensing device, or a coin receiving and dispensing device.

Particularly, the present invention relates to a coin lifting device that can smoothly lift coins without causing coin jamming or the like when lifting many coins at a time.

Furthermore, the present invention relates to a coin lifting device of a coin receiving and dispensing device that can smoothly lift coins without causing coin jamming or the like when lifting many coins at a time.

A "coin" used herein is a concept including not only a disk shape such as a coin or token having a predetermined thickness and diameter but also a modified octagonal shape such as a British twenty or fifty pence. Moreover, "coin jamming" is a concept including not only a state where coins are completely jammed and immobile but also those in a pseudo-state. Further, terms indicating orders such as "first" and "second" are only used to differentiate between identical component names, and are not taken into consideration in the interpretation of rights.

BACKGROUND ART

As a first conventional technique of this kind, there has been known a coin receiving and dispensing machine characterized by comprising: a coin accepting port that accepts coins from outside the machine, a storing and dispensing device in which the coins accepted in the coin accepting port are sent to be stored and in which the stored coins are dispensed one by one, a receiving transport portion that transports, one by one in a first direction, the coins dispensed by the storing and dispensing device, a plurality of accommodating and dispensing portions, provided under the receiving transport portion, that accommodate the coins transported from the receiving transport portion and dispense the accommodated coins one by one in a second direction different from the first direction, a dispensing space through which the coins dispensed from the plurality of accommodating and dispensing portions pass, a first dispensing transport portion in which the coins that have passed through the dispensing space fall, and a second dispensing transport portion that transports, to an upper coin throwing port, the coins transported from the first dispensing transport portion, wherein the plurality of accommodating and dispensing portions are arranged in such a way as to be on a plurality of stages in a vertical direction, and the dispensing space is provided on one side, in the second direction, of the accommodating and dispensing portions arranged on the plurality of stages (Patent Literature 1).

As a second conventional technique, there has been known a belt-type coin lifting device in which one coin is caught on one protruding member by an endless belt provided with a plurality of protruding members at equal intervals, whereby coins are transported one by one on a transport surface (Patent Literature 2).

As a third conventional technique, there has been known a coin lifting device which lifts coins by use of a vertical guide portion that guides the coins in a vertical direction while holding the coins in a standing posture, and a screw member that rotates and thereby pushes up, with a helical protruding thread thereof, the coins one by one (Patent Literature 3).

As a fourth conventional technique, there has been known a coin lifting device in which a plurality of belt bodies are arranged with a parallel running zone provided for the belt bodies to run in contact with one another, and a thrown coin is let in between the belt bodies in the parallel running zone and thus lifted (Patent Literature 4).

CITATION LIST

Patent Literature

Patent Literature 1: Japanese Patent Application Publication No. 2015-109113 (FIGS. 1 and 2, paragraphs 0019 to 0031 and 0064 to 0072)

Patent Literature 2: Japanese Patent Application Publication No. 2015-109113 (FIGS. 1 and 2, paragraphs 0025 and 0031)

Patent Literature 3: Japanese Patent Application Publication No. 2003-169891 (FIG. 1, paragraphs 0038 to 0042 and 0031)

Patent Literature 4: Japanese Patent No. 2899563 (FIG. 1, paragraph 0011)

SUMMARY OF INVENTION

Technical Problem

In the first conventional technique, a coin fed from a plurality of accommodating and dispensing portions falls in a common dispensing space, then falls on a first dispensing transport portion constituting a level bottom of the dispensing space, is delivered to a second dispensing transport portion by a transport operation of the first dispensing transport portion, and moved upward and then thrown into a coin throwing port by movement of the second dispensing transport portion toward the coin throwing port. In other words, coins fed from a plurality of accommodating and dispensing portions once fall in the first dispensing transport portion constituting a level bottom, and are then transported upward and fed to the coin throwing port by movement of the second dispensing transport portion. With this configuration, all the coins fed from the accommodating and dispensing portions fall on the first dispensing transport portion. A rubber belt having a high friction coefficient is used for the first dispensing transport portion in order to smoothly transport coins, and the first dispensing transport portion is abundantly elastic. Therefore, there is a problem that the coins that have fallen are flipped up greatly by the elasticity of the rubber belt, interfere with one another, and thus closely contact the first dispensing transport portion, requiring time before the coins are transported to the second dispensing transport portion. In other words, there is a problem in that it takes time to feed coins. Particularly, during collection in which coins are simultaneously fed from a plurality of accommodating and dispensing portions, all the coins fall on the first dispensing transport portion, so that the coins are piled up high, and coin jamming tends to occur.

In the second conventional technique, coins are caught, one by one, on one protruding member and lifted, so that there is concern that when many coins are supplied at a time, the coins are balanced with one another and brought into a static state in a part where the coins are caught, and coin jamming tends to occur.

In the third conventional technique, coins are lifted one by one by the rotation of a helical protruding thread of a screw member, so that there is again concern that coin jamming tends to occur at an entrance to the screw member.

In the fourth conventional technique, coins are lifted in between a pair of belts running parallel, so that there is concern that adjusting the tension of the pair of belts and guides of the belts is difficult.

An object of the present invention is to provide a coin receiving and dispensing device that enables smooth collection without causing coin jamming during a collection operation of simultaneously dispensing and collecting coins dispensed from a denominational storing and dispensing device.

A second object of the present invention is to provide a coin lifting device that enables smooth lifting without causing coin jamming or the like even when many coins are clustered together.

A third object of the present invention is to provide a coin lifting device of a coin receiving and dispensing device that enables smooth lifting without causing coin jamming or the like even when many coins are clustered together.

Solution to Problem

A first feature of the disclosure is configured as follows:

a coin receiving and dispensing device that discriminates, by a coin distinguishing device, coins thrown into a receiving port, then distributes the coins according to a plurality of denominations by a coin distributing device while transporting the coins one by one by a coin transporting device extending linearly in a direction away from the receiving port, then guides and stores the coins by a denominational drop passage arranged on one side of the coin transporting device into a plurality of denominational storing and dispensing devices arranged on a plurality of stages in a vertical direction and arrayed along the coin transporting device, feeds the coins one by one to a dispensing passage arranged on the other side of the coin transporting device from a feeding port of the denominational storing and dispensing devices on the basis of a dispensing command, drops the coins on a upward transport belt arranged along the array of the denominational storing and dispensing devices, and feeds the coins to a dispensing port or a coin storing container by running of the upward transport belt, the coin receiving and dispensing device characterized in that the dispensing passage has an inclined plate which constitutes at least a bottom surface of the dispensing passage and which is inclined downward toward the dispensing port side and through which the coins that have fallen from the feeding port slide down, and the upward transport belt is partly arranged below a lower end of the inclined plate, and inclined upward toward the dispensing port side.

The denominational drop passage arranged on one side of the coin transporting device includes not only a configuration in which the entire denominational drop passage is arranged on one side of the coin transporting device but also a configuration in which a part of the denominational drop passage is arranged on one side of the coin transporting device.

Moreover, the coin transporting device extending linearly in a direction away from the receiving port includes not only a configuration in which the entire coin transporting device extends linearly in a direction away from the receiving port but also a configuration in which a part of the coin transporting device extends linearly in a direction away from the receiving port.

Furthermore, coins may be collected not only by keeping the coins in a dedicated coin storing container but also by installing a coin collector contiguously with the dispensing port.

A second feature of the disclosure is configured as follows:

the coin receiving and dispensing device according to the first invention, characterized in that the inclined plate is provided on each of the plurality of stages and constitutes the bottom surface of the dispensing passage for each stage.

A third feature of the disclosure is configured as follows:

the coin receiving and dispensing device according to the first invention, characterized in that the inclined plate is provided for each of the feeding ports of three or less of the denominational storing and dispensing devices.

A fourth feature of the disclosure is configured as follows:

the coin receiving and dispensing device according to the first to third inventions, characterized by including a drop preventing device that is provided in opposition to the predetermined inclined plate and that prevents falling in collaboration with the upward transport belt in such a way that a coin falling on the upward transport belt from each of the inclined plates does not fall on a lower transport passage.

A fifth feature of the disclosure is configured as follows:

the coin receiving and dispensing device according to the fourth invention, characterized in that the upward transport belt is provided with an inclination of 45 degrees or more relative to a horizontal line toward the dispensing port side.

A sixth feature of the disclosure is configured as follows:

the coin receiving and dispensing device according to the first to fifth inventions, characterized in that the plurality of stages are three stages that are an upper stage, a middle stage, and a lower stage.

A seventh feature of the disclosure is configured as follows:

the coin receiving and dispensing device according to the sixth invention, characterized in that three denominational storing and dispensing devices are arranged on the upper and middle stages, and two denominational storing and dispensing devices are arranged on the lower stage.

An eighth feature of the disclosure is configured as follows:

the coin receiving and dispensing device according to the seventh invention, characterized in that among the denominational storing and dispensing devices arranged on the middle and lower stages, two of the denominational storing and dispensing devices far from the receiving port are superposed in a vertical direction.

A ninth feature of the disclosure is configured as follows:

a coin lifting device that drops coins, fed from a plurality of coin storing and dispensing devices arrayed in a horizontal direction, onto an upward transport belt inclined forwardly upward toward a subsequent process side, and feeds the coins toward the subsequent process side by running of the upward transport belt, the coin lifting device characterized by including:

at least a drop preventing body having, above the upward transport belt, an upper end being revolvable around an axis line extending approximately in a direction orthogonal to a longitudinal center line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

A tenth feature of the disclosure is configured as follows:

a coin lifting device that drops coins, fed from a plurality of arrays of coin storing and dispensing devices provided in a horizontal direction and stacked on a plurality of stages in an up-down direction, onto an upward transport belt inclined forwardly upward toward a subsequent process side, and feeds the coins toward the subsequent process side by running of the upward transport belt, the coin lifting device characterized by including:

at least a drop preventing body having, above the upward transport belt, an upper end being revolvable around an axis line extending approximately in a direction orthogonal to a travel direction line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

An eleventh feature of the disclosure is configured as follows:

a coin lifting device that drops coins, fed from a plurality of arrays of coin storing and dispensing devices provided in a horizontal direction and stacked on a plurality of stages in an up-down direction, onto an upward transport belt inclined forwardly upward toward a subsequent process side, and feeds the coins toward the subsequent process side by running of the upward transport belt, the coin lifting device characterized by including:

at least an inclined plate which some of the coins fed from the plurality of coin storing and dispensing devices fall on and then slip down toward the upward transport belt;

a drop preventing body having, under a lower end of the inclined plate and above the upward transport belt, an upper end being revolvable around an axis line extending approximately in a direction orthogonal to a travel direction line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

A twelfth feature of the disclosure is configured as follows:

a coin lifting device that drops coins, fed from a plurality of arrays of coin storing and dispensing devices provided in a horizontal direction and stacked on a plurality of stages in an up-down direction, onto an upward transport belt inclined forwardly upward toward a subsequent process side, and feeds the coins toward the subsequent process side by running of the upward transport belt, the coin lifting device characterized by including:

at least a plurality of inclined plates which some of the coins fed from the plurality of coin storing and dispensing devices fall on and then slip down toward the upward transport belt and which are provided for each of the coin storing and dispensing devices or for each of a plurality of the coin storing and dispensing devices;

a drop preventing body having, under a lower end of a predetermined inclined plate among the inclined plates and above the upward transport belt, an upper end being revolvable around an axis line extending approximately in a direction orthogonal to a travel direction line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

A thirteenth feature of the disclosure is configured as follows:

the coin lifting device according to the ninth to twelfth inventions, characterized by including a regulation portion that regulates revolution of the drop preventing body toward the travel direction of the upward transport belt.

A fourteenth feature of the disclosure is configured as follows:

the coin lifting device according to the ninth to thirteenth inventions, characterized in that the drop preventing body has a thrust body formed in a middle portion of the upward transport belt on the longitudinal downstream side, the thrust body protruding toward the longitudinal downstream side of the upward transport belt.

A fifteenth feature of the disclosure is configured as follows:

the coin lifting device according to the ninth to fourteenth inventions, characterized in that a plurality of the protrusions are provided, and arranged so as to be staggered in a width direction and a longitudinal direction of the upward transport belt.

A sixteenth feature of the disclosure is configured as follows:

the coin lifting device according to the ninth to fifteenth inventions, characterized in that a right guide wall and a left guide wall that are each vertical relative to the upward transport belt are arranged on a right side and a left side along the upward transport belt, a right downwardly inclined surface and a left downwardly inclined surface that are inclined downward toward a middle side of the upward transport belt from the respective sides of the right guide wall and the left guide wall on the longitudinal downstream side of the upward transport belt relative to the arrest position of the drop preventing body are formed, and a right inclined surface toward middle and a left inclined surface toward middle, that face toward the middle side of the upward transport belt respectively from the right guide wall and the left guide wall on the longitudinal downstream side of the upward transport belt, and that are inclined toward the longitudinal downstream side of the upward transport belt are formed.

A seventeenth feature of the disclosure is configured as follows:

a coin lifting device of a coin receiving and dispensing device that discriminates, by a coin distinguishing device, coins thrown into a receiving port, then distributes the coins according to a plurality of denominations by a coin distributing device while transporting the coins one by one by a coin transporting device extending linearly in a direction away from the receiving port, then guides and stores the coins by a denominational drop passage arranged on one side of the coin transporting device into a plurality of denominational storing and dispensing devices arrayed on a plurality of stages in a vertical direction and arranged along the coin transporting device, feeds the coins one by one to a dispensing passage arranged on the other side of the coin transporting device from a feeding port of each of the denominational storing and dispensing devices on the basis of a dispensing command, drops the coins on an upward transport belt arranged along the array of the denominational storing and dispensing devices, and feeds the coins to a dispensing port or a coin storing container by running of the upward transport belt, the coin lifting device of a coin receiving and dispensing device characterized by including:

a plurality of inclined plates which at least some of the coins fed from the plurality of coin storing and dispensing devices fall on and then slip down toward the upward transport belt and which are provided for each of the coin storing and dispensing devices or for each of a plurality of the coin storing and dispensing devices;

a drop preventing body having, under a lower end of a predetermined inclined plate among the inclined plates and above the upward transport belt, an upper end being revolvable around an axis line extending approximately in a direction orthogonal to a travel direction line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

Advantageous Effects of Invention

According to the first invention, coins stored in denominational storing and dispensing devices are paid out one by one from feeding ports thereof to a dispensing passage. The coins falling from the feeding ports slide down an inclined plate constituting a bottom surface inclined downward toward a dispensing port side. The coins that have slid down the inclined plate fall on a upward transport belt that is inclined upward toward the dispensing port side, partly arranged below a lower end of the inclined plate, and moved toward the dispensing port side at a predetermined speed, are transported upward by the upward transport belt, and are then released to the dispensing port.

With this configuration, coins paid out from the denominational storing and dispensing devices fall while each being dispersed to several inclined plates, so that even when coin jamming occurs during collection of coins, the coin jamming is small-scale coin jamming, and can be immediately eliminated. Moreover, it is difficult for coins that have fallen on the inclined plate to cause coin jamming during a step of slipping down the inclined plate. Even when coin jamming occurs, coins are moved by coins being transported by the upward transport belt, so that the coin jamming can be immediately eliminated. Therefore, when coins reach the upward transport belt, coin jamming is more or less eliminated. Thereafter, the coins are transported upward by the upward transport belt, and released to the dispensing port or a collection safe. Thus, there is an advantage that even when coins are continuously paid out from the denominational storing and dispensing devices simultaneously, the coins can be smoothly collected without causing coin jamming, and the object of the present invention can be achieved.

The second invention has the same basic configuration as the first invention, and can therefore achieve the object in the invention of the present application. Further, in the second invention, the inclined plate is provided for each of the plurality of stages and constitutes a bottom surface of a dispensing passage for each stage. Therefore, since a plurality of denominational storing and dispensing devices are distributed to the respective stages, the number of denominational storing and dispensing devices for the inclined plate for each stage decreases, so that there is an advantage that the number of coins simultaneously released to the same coin passage also decreases, and coin jamming can be further prevented.

The third invention has the same basic configuration as the first invention, and can therefore achieve the object in the invention of the present application. Further, in the third invention, since the inclined plate is provided for each of three or less feeding ports, coins falling on the same inclined plate are coins released from at most three denominational storing and dispensing devices, and the number of coins simultaneously falling in the same coin passage is limited, so that there is an advantage that coin jamming can be further prevented. The inclined plate being provided for each of the feeding ports of three or less of the denominational storing and dispensing devices includes a case where feeding ports and inclined plates are in a one-to-one relation, a case of two feeding ports and one inclined plate, and a case of three feeding ports and one inclined plate.

The fourth invention has the same basic configuration as the first invention, and can therefore achieve the object in the invention of the present application. Further, in the fourth invention, a drop preventing device is provided for each inclined plate, where the device prevents, in collaboration with the upward transport belt, a coin falling in such a way that a coin falling on the upward transport belt from each of the inclined plates does not fall on a lower inclined plate side. Thus, a coin falling on the inclined plate does not reach the lower inclined plate even when falling on the upward transport belt, so that there is an advantage that coin jamming can be further prevented.

The fifth invention has the same basic configuration as the first invention, and can therefore achieve the object in the invention of the present application. Further, in the fifth invention, the upward transport belt is provided with an inclination of 45 degrees or more relative to a horizontal line toward the dispensing port side. Thus, an installation length of the upward transport belt in a front-back direction relative to the dispensing port can be shortened, so that there is an advantage that an installation area can be decreased, i.e., the device can be reduced in size.

The sixth invention has the same basic configuration as the first invention, and can therefore achieve the object in the invention of the present application. Further, in the sixth invention, the plurality of stages are three stages that are an upper stage, a middle stage, and a lower stage, so that there is an advantage that height can also be reduced.

The seventh invention has the same basic configuration as the first invention, and can therefore achieve the object in the invention of the present application. Further, in the seventh invention, three denominational storing and dispensing devices are arranged on the upper and middle stages, and two denominational storing and dispensing devices are arranged on the lower stage. Thus, in combination with the inclination of the transport belt, eight denominational storing and dispensing devices can be arranged in a limited space, so that there is an advantage that the device can be reduced in size.

The eighth invention has the same basic configuration as the first invention, and can therefore achieve the object in the invention of the present application. Further, in the eighth invention, among the denominational storing and dispensing devices arranged on the middle and lower stages, two of the denominational storing and dispensing devices far from the receiving port are superposed in a vertical direction. Thus, denominational drop passages can be reasonably arranged for the middle and lower stages in a limited space, so that there is an advantage that the device can be reduced in size.

According to the ninth invention, coins stored in coin storing and dispensing devices arrayed in a horizontal direction are fed one by one from feeding ports thereof, fall on an upward transport belt inclined and arranged forwardly upward toward a subsequent process, are locked by a protrusion protrusively provided on the upward transport belt, lifted obliquely upward, and then delivered to the subsequent process. A coin that has not been locked by the protrusion falls on the upward transport belt by its own weight. However, a coin that has fallen on the upward transport belt is locked by a drop preventing body located on an upper side of the upward transport belt. The drop preventing body is pushed from a back surface side by the protrusion moving together with the upward transport belt, and has a lower end thereof revolved toward the subsequent process side. Due to this revolution, the coin locked by the drop preventing body is flicked off toward a longitudinal downstream side of the upward transport belt, and dispersed. When again falling on the upward transport belt, the flicked off and dispersed coin is locked by the protrusion, and fed to the subsequent process by the upward transport belt. A coin that has not been locked by the protrusion this time as well falls on the upward transport belt by its own weight, and is locked by the drop preventing body. The coin is finally locked by the protrusion as a result of being flicked off and locked by the drop preventing body, and fed to the subsequent process. Therefore, even if a state similar to coin jamming or the like is formed when a coin is locked by the drop preventing body, the coin is flicked off by the drop preventing body having been forcibly moved by the protrusion, so that coin jamming or the like is forcibly eliminated. It is difficult for coin jamming to occur during a step of slipping down the inclined plate. Even when coin jamming or the like occurs, coins are moved by coins being transported by the upward transport belt, so that the coin jamming or the like can be immediately eliminated. Therefore, there is an advantage that coins can be smoothly lifted without causing coin jamming or the like, and the object of the present invention can be achieved. Moreover, in the present invention, the drop preventing body is revolved by the protrusion protrusively provided on the upward transport belt, and therefore a drive source can be shared with the upward transport belt, and thus there is an advantage in terms of a size reduction and cost of the device, and running cost.

The tenth invention is the same as the ninth invention except that arrays of denominational storing and dispensing devices are stacked on a plurality of stages in an up-down direction, so that the tenth invention operates substantially in a manner similar to the first invention, and the object in the invention of the present application can be achieved. Further, in the second invention, arrays of denominational storing and dispensing devices are stacked on a plurality of stages in an up-down direction, so that a height difference of lifting is large. However, coin jamming or the like is forcibly eliminated by the drop preventing body, so that there is an advantage that even when a height difference of lifting is large, coins can be smoothly lifted without causing coin jamming or the like.

The eleventh invention is the same as the ninth invention except that arrays of denominational storing and dispensing devices are stacked on a plurality of stages in an up-down direction, and at least some of the coins fed from the denominational storing and dispensing devices fall on the inclined plate, so that the eleventh invention operates substantially in a manner similar to the first invention, and the object in the invention of the present application can be achieved. Further, in the third invention, at least some of the coins slip down the inclined plate, and therefore, when many coins are fed, coins remain on the inclined plate as well, so that there is an advantage that the number of coins remaining on the upward transport belt is limited, and coin jamming or the like can be further prevented.

The twelfth invention is the same as the ninth invention except that arrays of denominational storing and dispensing devices are stacked on a plurality of stages in an up-down direction, and a plurality of inclined plates provided for each of the coin storing and dispensing devices or for each of a plurality of the coin storing and dispensing devices are included, so that the twelfth invention operates substantially in a manner similar to the first invention, and the object in the invention of the present application can be achieved. Further, in the fourth invention, coins fed from at most three coin storing and dispensing devices slip down the inclined plate, and therefore, when many coins are fed, coins remain on each inclined plate as well, so that there is an advantage that the number of coins remaining on the upward transport belt is limited, and coin jamming or the like can be further prevented.

The thirteenth invention has the same basic configuration as the ninth invention, and can therefore achieve the object in the invention of the present application. Further, in the fifth invention, a regulation portion that regulates revolution toward the travel direction of the upward transport belt is provided. Thus, even when the drop preventing body is greatly revolved by the protrusion, the degree of revolution of the drop preventing body is regulated, and the degree to which the lower end of the drop preventing body separates from the upward transport belt is limited by the regulation portion, so that there is an advantage that a coin falling by its own weight does not fall through the space between the lower end of the drop preventing body and the upward transport belt.

The fourteenth invention has the same basic configuration as the ninth invention, and can therefore achieve the object in the invention of the present application. Further, in the sixth invention, a thrust body protruding toward the longitudinal downstream side of the upward transport belt is formed in the drop preventing body on the longitudinal downstream side of the upward transport belt, and therefore, when the drop preventing body is revolved toward the subsequent process side, the thrust body moves into clustered coins and breaks down the coin cluster, so that there is an advantage that coins can be efficiently flipped up by the drop preventing body.

The fifteenth invention has the same basic configuration as the ninth invention, and can therefore achieve the object in the invention of the present application. Further, in the seventh invention, a plurality of the protrusions are provided, and arranged so as to be staggered in a width direction and a longitudinal direction of the upward transport belt. Thus, the drop preventing body revolves toward the subsequent process side in two stages, and therefore, a large number of coins are flipped away by the first revolution toward the subsequent process side, and the remaining coins are then flipped away, so that there is an advantage that coins can be reliably flicked off to the subsequent process.

The sixteenth invention has the same basic configuration as the ninth invention, and can therefore achieve the object in the invention of the present application. Further, in the sixteenth invention, a right guide wall and a left guide wall that are each vertical relative to the upward transport belt are arranged on a right side and a left side along the upward transport belt, and a right inclined surface toward middle and a left inclined surface toward middle that are inclined downward toward a middle side of the upward transport belt from the respective sides of the right guide wall and the left guide wall on the longitudinal downstream side of the upward transport belt relative to the arrest position of the drop preventing body are formed, and a right extending-direction guide surface and a left extending-direction guide surface that face toward the middle side of the upward transport belt respectively from the right guide wall and the left guide wall on the longitudinal downstream side of the upward transport belt, and that are inclined toward the longitudinal downstream side of the upward transport belt are formed. With this configuration, coins falling on the drop preventing body are guided toward the middle side of the drop preventing body by a left downward-direction guide surface, the right inclined surface toward middle, the left extending-direction guide surface, and the right extending-direction guide surface, so that a coin is not caught between the drop preventing body and the left guide wall or the right guide wall, and can be reliably flipped up by the drop preventing body. As a result, there is an advantage that coins can be fed to the subsequent process without causing coin jamming or the like.

In a seventeenth invention, coins stored in a plurality of coin storing and dispensing devices arrayed in a horizontal direction are fed one by one from feeding ports thereof, fall on a upward transport belt inclined and arranged forwardly upward toward a subsequent process, are locked by a protrusion protrusively provided on the upward transport belt, lifted obliquely upward, and then delivered to the subsequent process. A coin that has fallen from the feeding port slides down the inclined plate inclined downward toward the upward transport belt side. The coin that has slid down the inclined plate falls on the upward transport belt that is inclined upward toward the subsequent process side and moved toward the subsequent process side at a predetermined speed, is lifted by the upward transport belt, and then fed to the subsequent process.

At least some of the coins paid out from a plurality of denominational storing and dispensing devices fall while each being dispersed to several inclined plates, so that even when coin jamming or the like occurs, the coin jamming is small-scale coin jamming, and can be immediately eliminated. Moreover, it is difficult for coins that have fallen on the inclined plate to cause coin jamming or the like during a step of slipping down the inclined plate. Even when coin jamming or the like occurs, coins are moved by coins being transported by the upward transport belt, so that the coin jamming or the like can be immediately eliminated. Therefore, when coins reach the upward transport belt, coin jamming is more or less eliminated. Thereafter, the coins are transported upward by the upward transport belt, and released to the dispensing port or a collection safe.

A coin that has not been locked by the protrusion falls on the upward transport belt by its own weight. However, a coin that has fallen on the upward transport belt is locked by a drop preventing body located on an upper side of the upward transport belt. The surface of the drop preventing body on a longitudinal upstream side of the upward transport belt is pushed by the protrusion moving together with the upward transport belt, and has a lower end thereof revolved toward the longitudinal downstream side of the upward transport belt, i.e., the subsequent process side. Due to this revolution, the coin locked by the drop preventing body is flicked off toward the longitudinal downstream side of the upward transport belt, and dispersed. When again falling on the upward transport belt, the coin that has been flicked off and dispersed is locked by the protrusion, and fed to the subsequent process by the upward transport belt. A coin that has not been locked by the protrusion this time as well falls on the upward transport belt by its own weight, and is locked by the drop preventing body. The coin is finally locked by the protrusion as a result of being flicked off and locked by the drop preventing body, and fed to the subsequent process. Therefore, even if a state similar to coin jamming or the like is formed when a coin is locked by the drop preventing body, the coin is flicked off by the drop preventing body having been forcibly moved by the protrusion, so that coin jamming or the like is forcibly eliminated. Therefore, there is an advantage of being able to achieve the second object of the present invention of providing a coin lifting device of a coin receiving and dispensing device that can smoothly lift coins without causing coin jamming or the like, and enables smooth lifting without causing coin jamming or the like even when many coins are clustered together. Moreover, in the present invention, the drop preventing body is revolved by the protrusion protrusively provided on the upward transport belt, and therefore a drive source can be shared with the upward transport belt, and thus there is an advantage in terms of a size reduction and cost of the device, and running cost.

DESCRIPTION OF EMBODIMENTS

Figure 1:
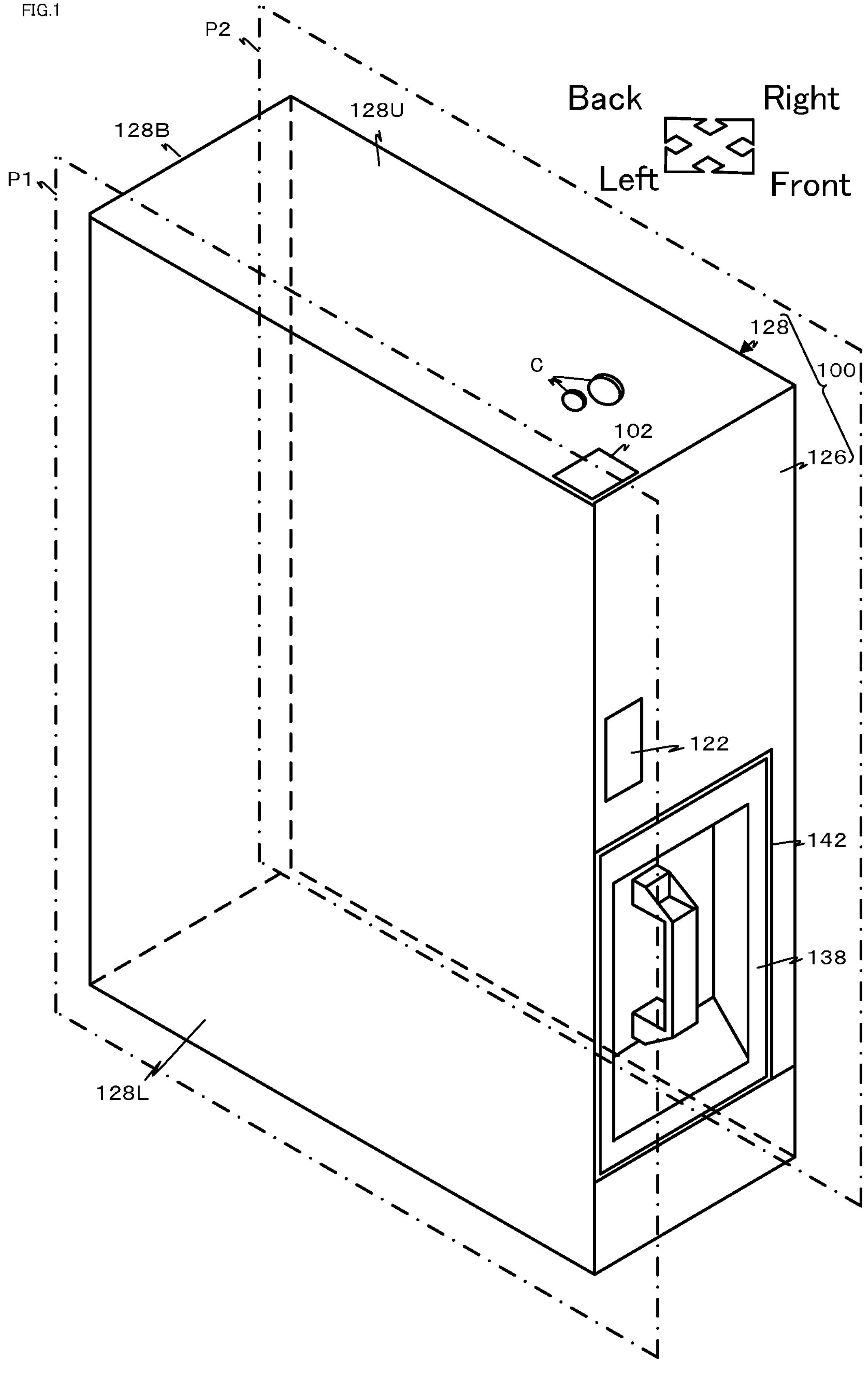
FIG. 1 is a perspective view of a coin receiving and dispensing device (with a cover) of Embodiment 1 according to the present invention from an upper left direction.

A coin receiving and dispensing device is chiefly characterized by discriminating, by a coin distinguishing device, coins thrown into a receiving port, then distributing the coins according to a plurality of denominations by a coin distributing device while transporting the coins one by one by a coin transporting device extending linearly in a direction away from the receiving port, then guiding and storing the coins by a denominational drop passage arranged on one side of the coin transporting device into a plurality of denominational storing and dispensing devices arranged on a plurality of stages in a vertical direction and arrayed along the coin transporting device, feeding the coins one by one to a dispensing passage arranged on the other side of the coin transporting device from a feeding port of the denominational storing and dispensing devices on the basis of a dispensing command, dropping the coins on a upward transport belt arranged along the array of the denominational storing and dispensing devices, and feeding the coins to a dispensing port arranged in the vicinity of the receiving port by running of the upward transport belt, wherein the dispensing passage has an inclined plate which constitutes at least a bottom surface of the dispensing passage and which is inclined downward toward the dispensing port side and through which the coins that have fallen from the feeding port slide down, and the upward transport belt is partly arranged below a lower end of the inclined plate, and inclined upward toward the dispensing port side.

This makes it possible to provide a coin receiving and dispensing device that enables smooth collection without causing coin jamming during a collection operation of simultaneously dispensing and collecting coins dispensed from a denominational storing and dispensing device.

A mode for carrying out the present invention is a coin lifting device that drops coins, fed from a plurality of arrays of coin storing and dispensing devices provided in a horizontal direction, onto a upward transport belt inclined forwardly upward toward a subsequent process side, and feeds the coins toward the subsequent process side by running of the upward transport belt, the coin lifting device characterized by including:

at least a drop preventing body having, above the upward transport belt, an upper end being revolvable around an axis line extending approximately in a direction orthogonal to a travel direction line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward a coin lifting direction of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward an upward direction of the upward transport belt.

Thus, even if coin jamming occurs when a coin is locked by the drop preventing body, the coin is flipped up by the drop preventing body having been forcibly moved by the protrusion, so that coin jamming is forcibly eliminated. Therefore, coins can be smoothly lifted without causing coin jamming

Embodiment 1

A coin receiving and dispensing device 100 according to Embodiment 1 is described with reference to FIGS. 1 to 12. In Embodiment 1, the coin receiving and dispensing device 100 for euro coins is intended to handle a two-cent coin, a five-cent coin, a ten-cent coin, a twenty-cent coin, a one-cent coin, a two-euro coin, a fifty-cent coin, and a one-euro coin, but is compatible with Japanese coins, US coins, etc.

The coin receiving and dispensing device 100 is used independently as an automatic receiving and dispensing device of coins at a bank, a retail store, or the like, or used in combination with a bill receiving and dispensing device, a credit card and debit card processor or the like, and used to receive inserted coins as payment, dispense change, store the accepted coins according to coin denominations, and automatically dispense a designated amount of money.

The coin receiving and dispensing device 100 in Embodiment 1 includes at least a coin separating and feeding device 104 that separates and feeds, one by one, coins C accepted in a receiving port 102 in a bulk state, a coin distinguishing device 106 that distinguishes the authenticity and denominations of the coins C, a coin transporting device 108 that transports the coin C distinguished as an authentic coin by the coin distinguishing device 106, linearly in a direction away from the receiving port 102, a coin distributing device 112 that distributes, according to coin denominations, the coins C transported in a direction away from the receiving port 102 by the coin transporting device 108, a denominational storing and dispensing device 114 that stores the coins C distributed in the coin distributing device 112, and feeds the coins C one by one, a denominational drop passage 116 that guides, to the denominational storing and dispensing device 114, the coins C distributed by the coin distributing device 112, a dispensing passage 118 that guides the coins C fed one by one from the denominational storing and dispensing device 114, and a upward transport belt 124 that transports, to a dispensing port 122, the coins C that have fallen in the dispensing passage 118.

Figure 8:
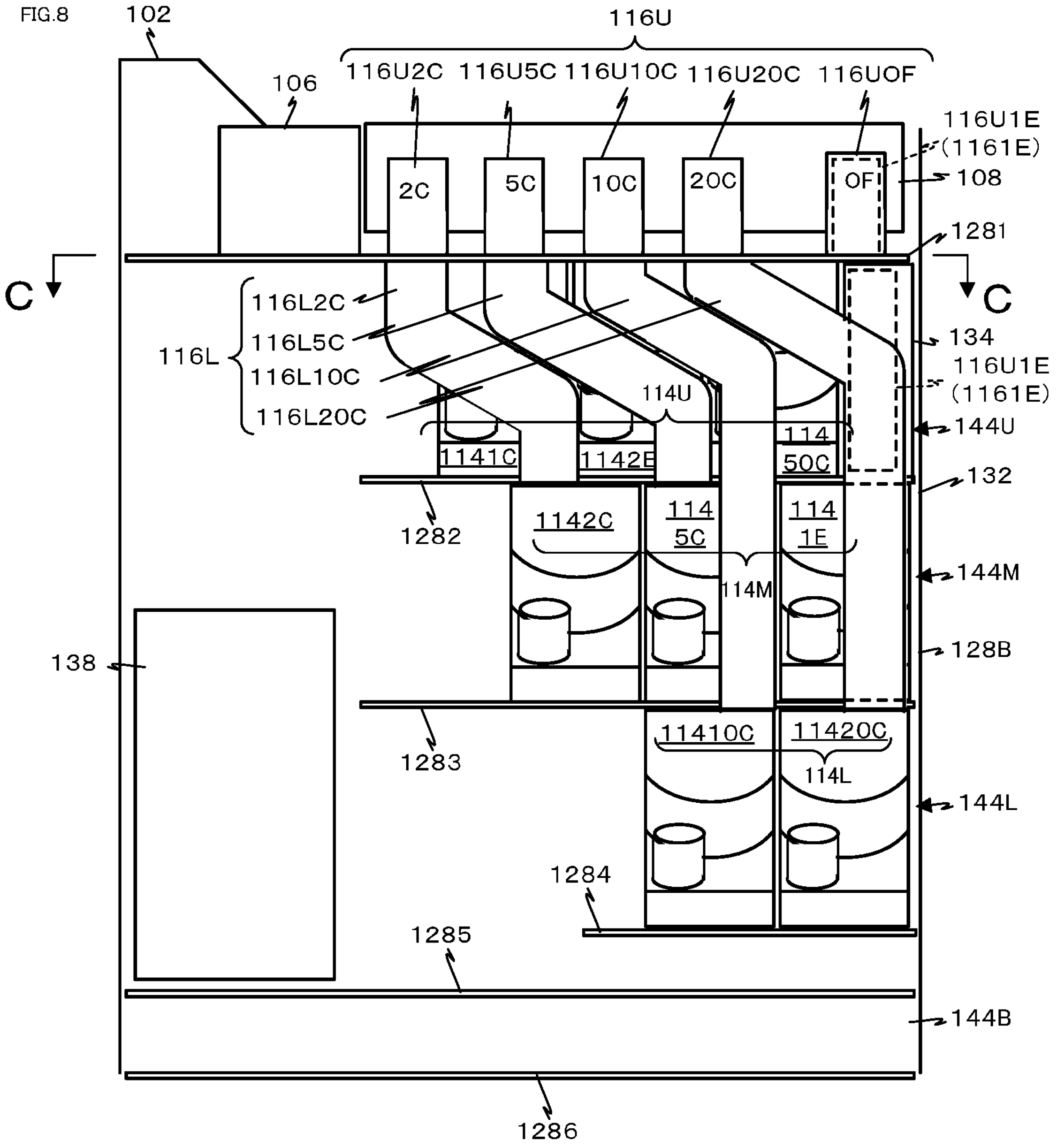
FIG. 8 is a longitudinal cross-sectional view along a vertical surface P2 in FIG. 1.

First, the entire coin receiving and dispensing device 100 in Embodiment 1 is described mainly with reference to FIGS. 1 and 8.

Figure 6:
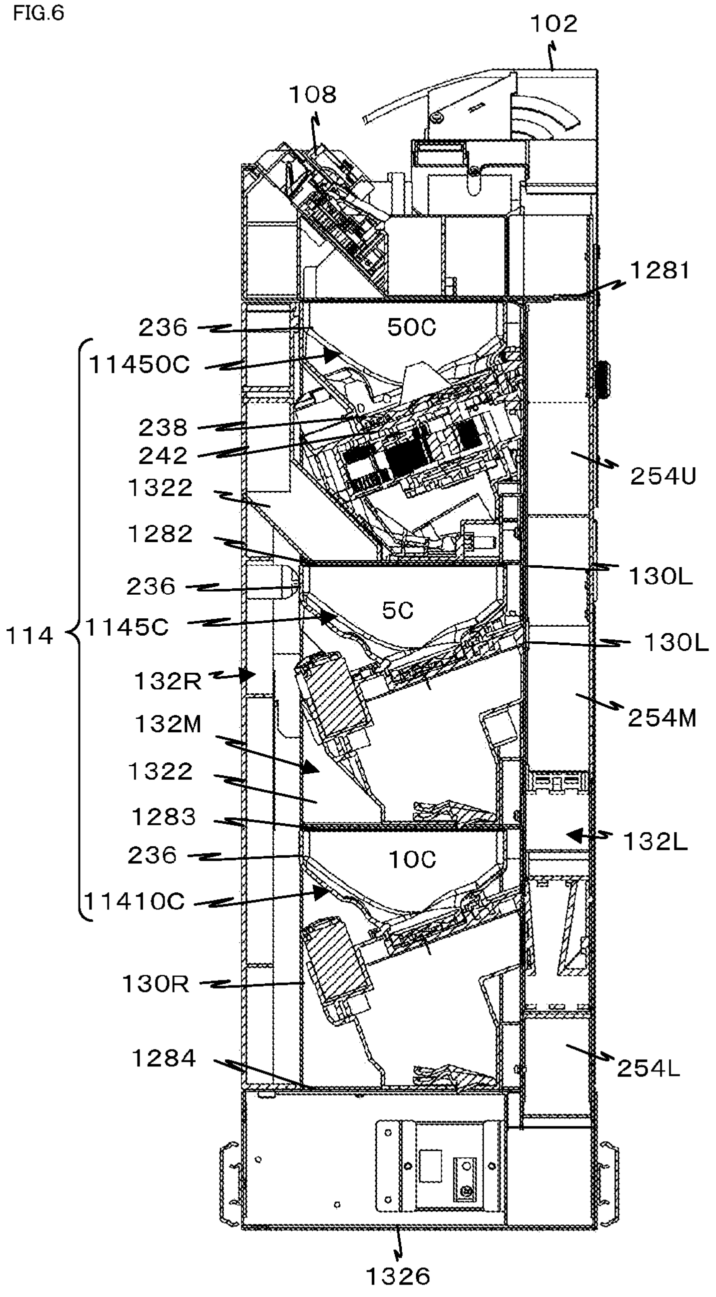
FIG. 6 is a cross-sectional view along the line A-A in FIG. 4.

The coin receiving and dispensing device 100 is configured into an elongated cubic shape by an approximately rectangular body 126, and a cover 128 covering a left plate 128L, a right plate 128R, an upper plate 128U, and a back plate 128B in an outer surface of the body 126. As illustrated in FIG. 6, inside the coin receiving and dispensing device 100, in the width direction, a vertically long right space 132R is demarcated by an inner right wall plate 130R arranged vertically on a right side in the width direction when seen from a front side, a vertically long left space 132L is demarcated by an inner left wall plate 130L arranged vertically on a left side, and a vertically long middle space 132M wider than the right space 132R and the left space 132L is demarcated in the middle. A part of the denominational drop passage 116 is arranged in the right space 132R, the dispensing passage 118 is arranged in the left space 132L, and the denominational storing and dispensing device 114 is arranged in the long middle space 132M.

In a vertical front surface of the body 126, the rectangular dispensing port 122 is formed in an intermediate portion in an up-down direction. Under the dispensing port 122, an attachment hole 142 for a coin container 138 attachable to and detachable from a lower portion of the body 126 is formed. The coin container 138 accommodates all the coins C when all the coins are collected. A rectangular receiving port 102 for the coins C is formed upward in an upper surface of the body 126 close to the front surface. When the coin receiving and dispensing device 100 is arranged in a housing integrated with other processing devices, an upper left section of the left plate 128L facing the coin transporting device 108, and the upper plate 128U do not need to be covered.

Next, the body 126 is described.

Figure 9:
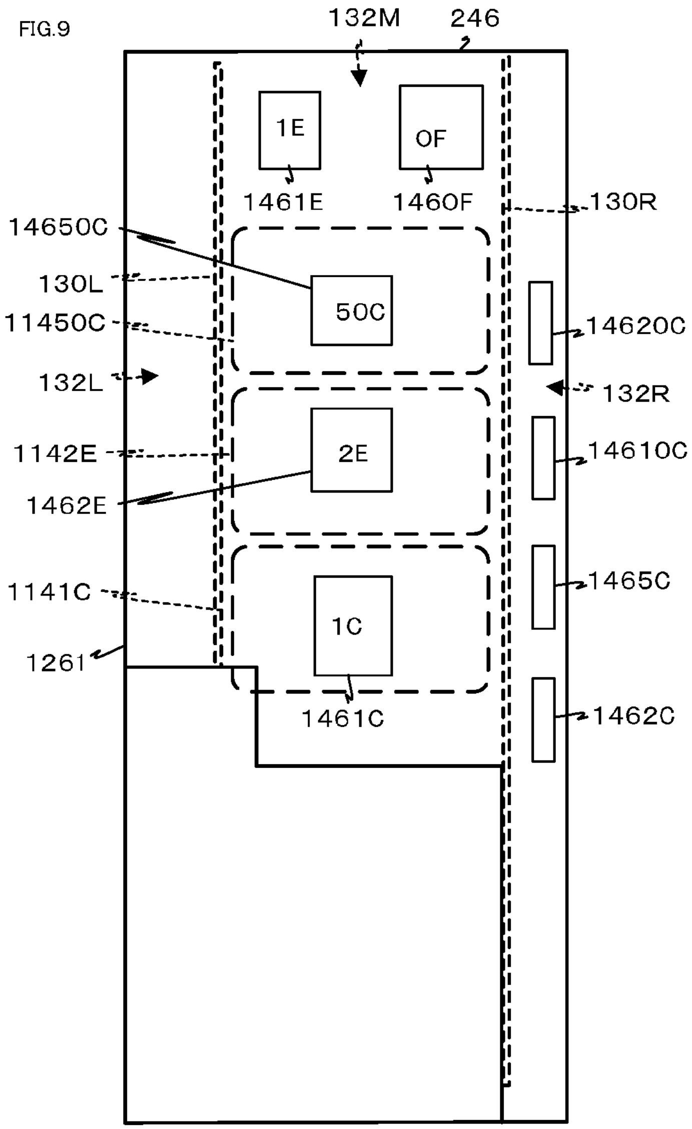
FIG. 9 is a cross-sectional view along the line C-C in FIG. 8.

The body 126 has a function of having the primary devices described above incorporated therein or attached thereto, is configured into an approximately vertical cubic shape by sheet metal, and is divided inside into approximately four layers in a vertical direction by a top plate 1281, an upper-stage bottom plate 1282, a middle-stage bottom plate 1283, a lower-stage bottom plate 1284, an inner bottom plate 1285, and a bottom plate 1286 that are installed approximately horizontally. That is, an upper-stage space 144U is formed between the top plate 1281 and the upper-stage bottom plate 1282, a middle-stage space 144M is formed between the upper-stage bottom plate 1282 and the middle-stage bottom plate 1283, and a lower-stage space 144L is formed between the middle-stage bottom plate 1283 and the lower-stage bottom plate 1284. A bottom space 144B is formed between the inner bottom plate 1285 and the bottom plate 1286. The upper-stage space 144U, the middle-stage space 144M, and the lower-stage space 144L are arranged under the receiving port 102, horizontally extend linearly in a direction away from the receiving port 102, and are formed with the same height and width. The coin transporting device 108 and the coin distributing device 112 that are integrated are installed on the top plate 1281. Moreover, as illustrated in FIG. 9, a one-cent opening 1461C for one-cent coin dropping, a two-euro opening 1462E for two-euro coin dropping, and a fifty-cent opening 14650C for fifty-cent coin dropping that are formed into an approximately square shape are formed above the middle space 132M being in the middle of the top plate 1281 in a width direction sequentially from the receiving port 102 side, and an overflow opening 146OF is made on a right side and a one-euro opening 1461E for one euro is made on a left side in the vicinity of a back wall 246. Moreover, a two-cent opening 1462C for two-cent coin dropping, a five-cent opening 1465C for five-cent coin dropping, a ten-cent opening 14610C for ten-cent coin dropping, and a twenty-cent opening 14620C for twenty-cent coin dropping that are approximately elongatedly formed in a transport direction of the coins C are formed above the right space 132R being on a right side of the top plate 1281 in a width direction sequentially from the receiving port 102 side.

Figure 2:
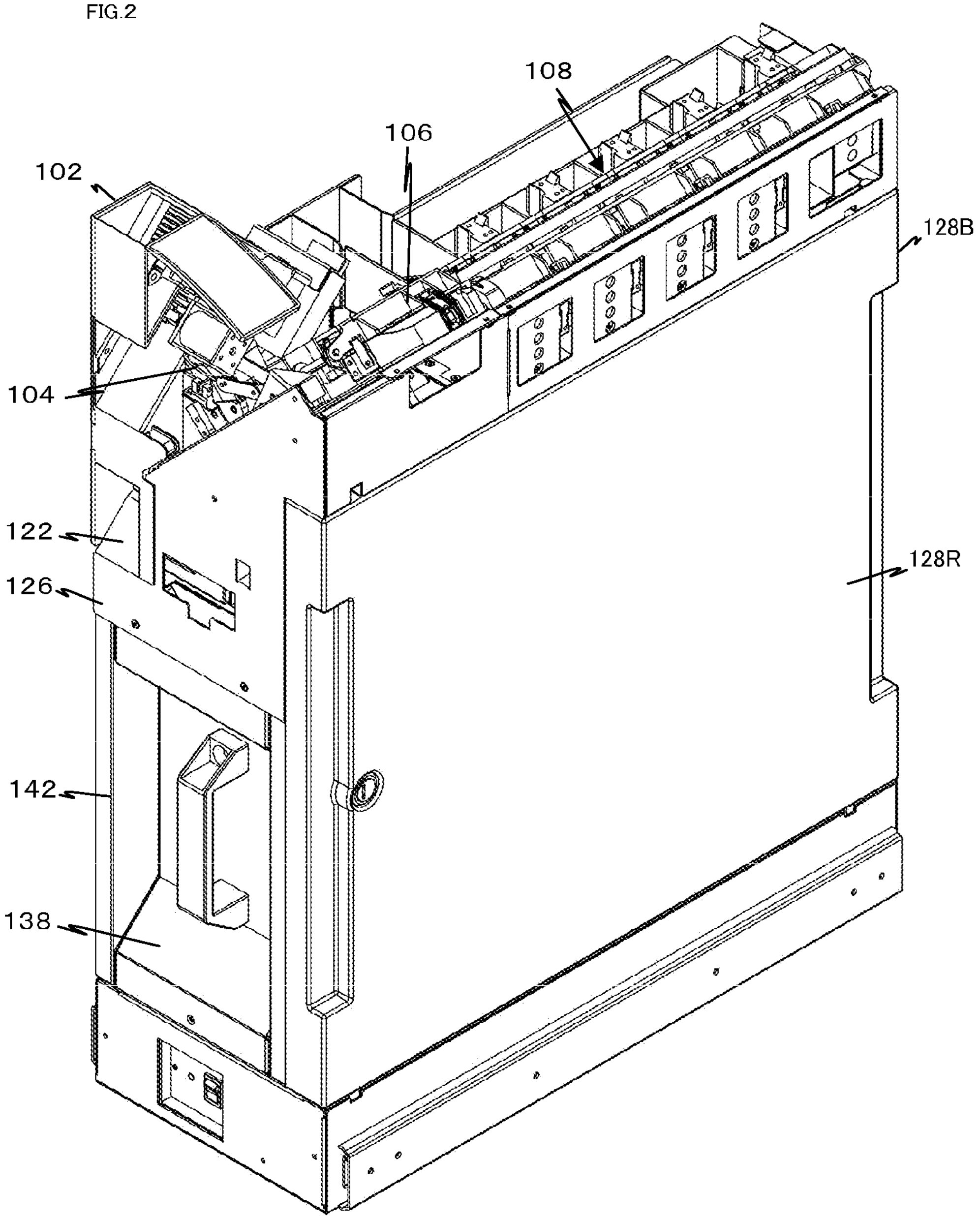
FIG. 2 is a perspective view of the coin receiving and dispensing device (without a cover) of Embodiment 1 according to the present invention from an upper right direction.

Next, the receiving port 102 is described mainly with reference to FIG. 2.

The receiving port 102 has a function of accepting the plurality of coins C collectively, and guiding the coins C to the coin separating and feeding device 104. In Embodiment 1, the receiving port 102 is an upward rectangular opening formed in a front-side upper surface of the body 126. A guide tube 146 (FIG. 3) facing in an obliquely downward direction is formed contiguously from the receiving port 102 from a front side to a back side, and a lower end of the guide tube146 is open above an upper-surface opening of a bowl-shaped coin storing container 148 constituting the coin separating and feeding device 104. Therefore, the plurality of coins C thrown in the receiving port 102 are guided into the guide tube 146 and fall in the coin storing container 148 of the coin separating and feeding device 104.

Figure 3:
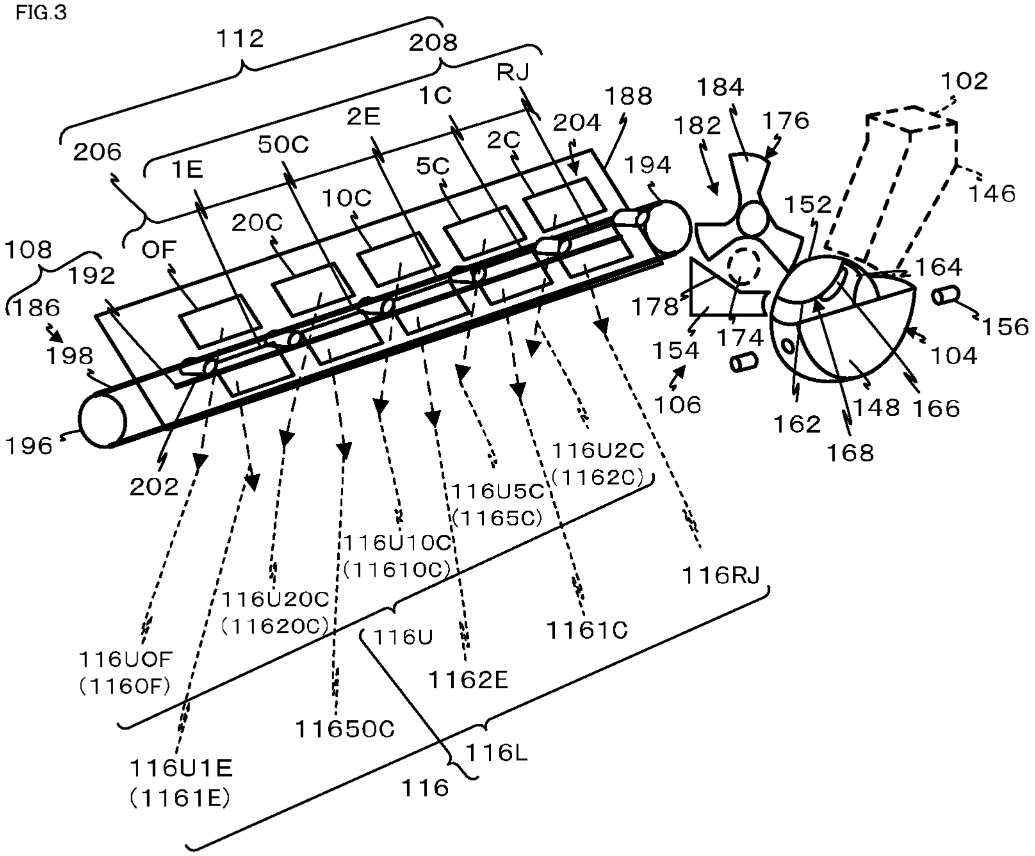
FIG. 3 is a schematic explanatory view of a coin distinguishing device, a coin transporting device, and a coin distributing device of the coin receiving and dispensing device of Embodiment 1 according to the present invention.

Next, the coin separating and feeding device 104 is described mainly with reference to FIG. 3.

The coin separating and feeding device 104 has a function of separating, one by one, the coins C of a plurality of denominations stored in a bulk state and differing in diameter, and feeding the coins C to the coin distinguishing device 106 being a subsequent process. A publicly known coin separating and feeding device is used as the coin separating and feeding device 104.

The coin separating and feeding device 104 in Embodiment 1 is arranged under the receiving port 102, and includes a rotary disc 152, the coin storing container 148, a receiving body 154, and a full sensor 156.

The rotary disc 152 has an accepting portion 168 that accepts the coins C one by one, is inclined and arranged at a predetermined angle, and is rotated at a predetermined speed.

The accepting portion 168 has a Y-shaped plate 164 that has three concave portions 162 formed in an upper surface of the rotary disc 152 at equal intervals and that is fixed concentrically with the rotary disc 152.

A pushing body 166 that makes a pivot movement is arranged on one side of the concave portion 162 (e.g., see JP Patent No. 4997374).

In other words, the nearly semicircular accepting portion 168 is formed by the pushing body 166 and the concave portion 162.

The accepting portion 168 is set at a size that cannot accept two smallest-diameter coins in parallel and can accept only one largest-diameter coin.

The pushing body 166 is normally located in a static state at a position close to one side of the concave portion 162 so as to form the accepting portion 168, and feeds the stored coin C in a peripheral direction of the rotary disc 152 when making a pivot movement and moving to a predetermined position.

The accepting portion 168 accepts, one by one, the coins C stored in a bulk state in a lower portion opposed to the coin storing container 148, and the pushing body 166 pushes the coins C in the accepting portion 168 in the peripheral direction at a predetermined position above a rotation center of the rotary disc 152, and delivers the coins C to the knife-shaped receiving body 154.

The rotary disc 152 is rotated at a predetermined speed by a non-illustrated electric motor via a reduction gear.

The full sensor 156 has a function of outputting a full signal when the amount of coins in the coin storing container 148 has become equal to or more than a predetermined amount, and is, for example, a transmission-type photoelectric sensor.

Acceptance of the coins C from the receiving port 102 is limited by a non-illustrated means when the full sensor 156 outputs a full signal, and the acceptance limitation of the coins C is canceled when a full signal is no longer output.

Next, the coin distinguishing device 106 is described.

The coin distinguishing device 106 has a function of acquiring, by a sensor, physical property information, surface pattern information, or the like of the coin C fed by the coin separating and feeding device 104, and performing a genuineness determination and a denomination determination on the basis of the acquired information, where a publicly known coin distinguishing device is used as the coin distinguishing device 106. In Embodiment 1, the coin distinguishing device 106 includes a magnetic sensor 174, a slide base (not illustrated) arranged flush with an upper surface of the rotary disc 152, a rotating body 176 for sending the coins C, and a reference guide 178.

The slide base (not illustrated) has a function of guiding one surface of the coin C pushed by the rotating body 176.

The rotating body 176 has a function of moving the coins C received from the coin separating and feeding device 104, and passing the coins C, one by one, through a coin accepting portion 182.

Further, the rotating body 176 has a function of delivering, to the coin transporting device 108, the coins C that have passed through the coin accepting portion 182.

The rotating body 176 is rotatable in a plane parallel and proximate to the slide base, forms the coin accepting portion 182 by three pushing levers 184 that are of the same number as the accepting portions 168 and that are arranged at equal intervals, and has a Y-shape.

The reference guide 178 has a function of linearly guiding the passing coin C in opposition to the coin accepting portion 182, and bringing the coin C to a constant position relative to the magnetic sensor 174. A coin determination device disclosed in JP Patent No. 4997374 is preferably, but not exclusively, used as the publicly known coin distinguishing device 106.

Next, the coin transporting device 108 is described.

The coin transporting device 108 has a function of linearly transporting, in a direction away from the receiving port 102, the coins C fed one by one from the coin distinguishing device 106.

The coin transporting device 108 in Embodiment 1 is mounted onto the top plate 1281 integrally with the coin distributing device 112 described later. The coin transporting device 108 includes an endless transport body 186 moving within the same plane in one direction away from the receiving port 102, a slide plate 188 on which one surface of the coin C pushed by the endless transport body 186 slides, and a straight guide rail 192 that guides a peripheral surface of the coin C.

In Embodiment 1, the endless transport body 186 is a chain 198 stretched substantially horizontally between a first sprocket 194 and a second sprocket 196 arranged at a predetermined interval. The chain 198 is installed in a flat running track form, and the first sprocket 194 is arranged immediately beside the rotating body 176 of the coin distinguishing device 106. Push pins 202 are fixed to a side surface of the chain 198 at predetermined intervals.

A plurality of the push pins 202 are mounted on the chain 198 at intervals corresponding to the intervals of the pushing levers 184.

The first sprocket 194 is rotated at a predetermined speed, and the pushing levers 184 and the push pins 202 are set to immediately push, by the push pins 202, the coin C pushed to a transfer path 204 of the push pins 202 by the pushing levers 184. The transfer path 204 is a path where the coin C pushed by the push pins 202 moves while being guided by the guide rail 192.

The guide rail 192 has a function of guiding a lower-end peripheral surface of the coin C in such a way that the coin C pushed by the push pins 202 moves in the transfer path 204.

The guide rail 192 is arranged along and slightly below the chain 198 presenting an upper linear shape of the running track form.

The guide rail 192 protrudes slightly further than the largest thickness of the coin C to be handled, in a direction orthogonal to the slide plate 188.

Therefore, the coin C pushed by the push pins 202 has a lower surface of the coin C guided by the slide plate 188, and a lower-end peripheral surface of the coin C guided by the guide rail 192.

As described later, the guide rail 192 in Embodiment 1 also serves as a sorting portion. For example, a coin transporting device disclosed in JP Patent No. 4997374 is preferably, but not exclusively, used as the coin transporting device 108.

Next, the coin distributing device 112 is described.

The coin distributing device 112 has a function of dropping the coins C transported by the coin transporting device 108, into coin sorting holes of relevant denominations according to coin denominations distinguished in the coin distinguishing device 106, and distributing the coins C according to predetermined coin denominations.

The coin distributing device 112 in Embodiment 1 has an upper sorting portion 206 arranged along the guide rail 192 on an upper side of the guide rail 192, and a lower sorting portion 208 arranged along the guide rail 192 on a lower side of the guide rail 192.

The upper sorting portion 206 has a two-cent sorting hole 2C, a five-cent sorting hole SC, a ten-cent sorting hole 10C, a twenty-cent sorting hole 20C, and an overflow sorting hole OF that are arranged sequentially toward a travel direction of the coin transporting device 108, i.e., in a direction away from the receiving port 102.

The lower sorting portion 208 has a reject sorting hole RJ, a one-cent sorting hole 1C, a two-euro sorting hole 2E, a fifty-cent sorting hole 50C, and a one-euro sorting hole 1E that are arranged sequentially toward the travel direction of the coin transporting device 108, i.e., in a direction away from the receiving port 102.

The arrangement of denominations for the respective coin sorting holes is one example, and therefore, denominations can be freely arranged as needed.

A gate device (not illustrated) that is actuated by an electric actuator is arranged for each of the coin sorting holes 2C, 5C, 10C, 20C, OF, 1E, RJ, 1C, 2E, and 50C.

In Embodiment 1, the gate device for each of the coin sorting holes RJ, 1C, 2E, and 50C also serves as the guide rail 192.

That is, the guide rail 192 is constituted of a fixed guide fixed between the transfer path 204 and the coin sorting hole 1E RJ, 1C, 2E, or 50C, and an electrically moved movable guide, and normally presents one straight form. When the transported coin C is dropped in the coin sorting hole RJ, 1C, 2E, or 50C, the movable guide is moved from a normal position so that the coin C to be transferred is not guided to the movable guide and falls in a predetermined coin sorting hole (see JP Patent No. 4997374).

The gate device opposed to each of the coin sorting holes 2C, 5C, 10C, 20C, OF, 1E, RJ, 1C, 2E, or 50C is selectively opened or closed on the basis of a timing signal from a timing sensor (not illustrated), and authenticity and a denomination determined by coin information detected by the coin distinguishing device 106.

As a result, the coin C transported by the coin transporting device 108 is dropped in the predetermined the coin sorting hole 2C, 5C, 10C, 20C, OF, 1E, RJ, 1C, 2E, or 50C for each denomination.

Figure 7:
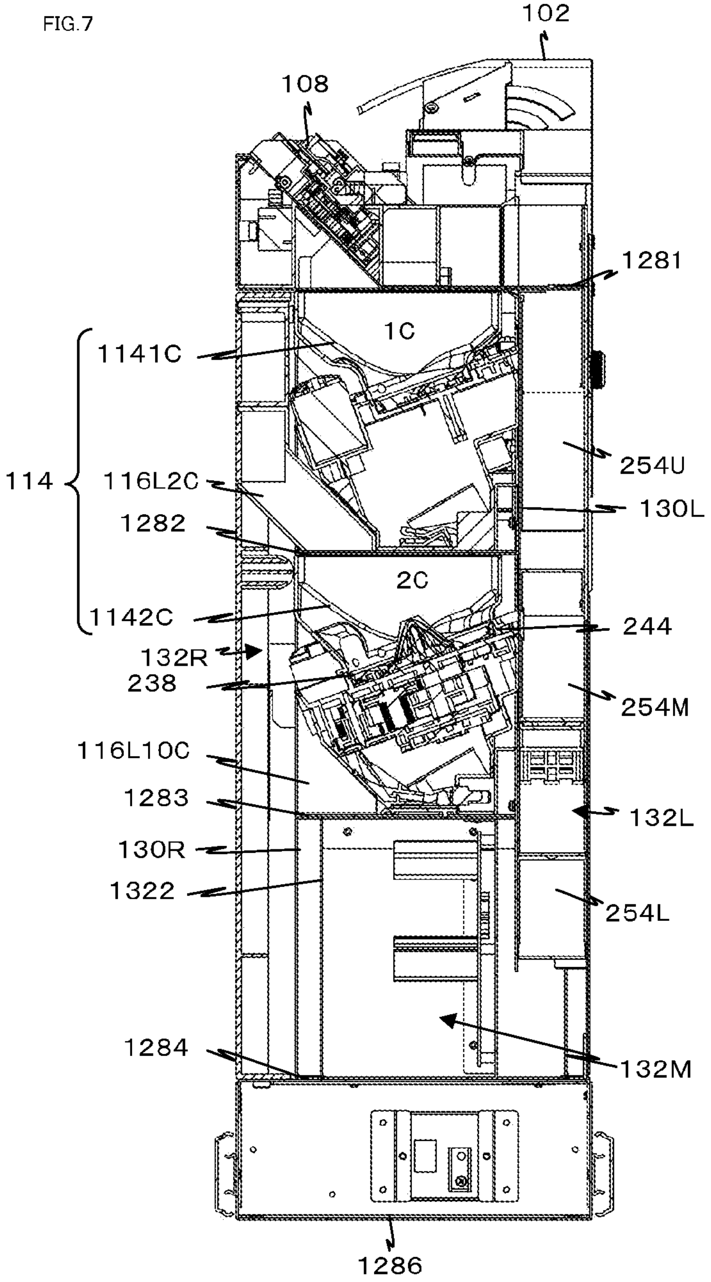
FIG. 7 is a cross-sectional view along the line B-B in FIG. 4.

Next, the denominational storing and dispensing device 114 is described mainly with reference to FIG. 6 or 7.

The denominational storing and dispensing device 114 has a function of storing, according to coin denominations, the coins C sorted for each denomination in the coin distributing device 112, and a function of paying out a predetermined number of coins C of predetermined denominations one by one in accordance with a command from high-order equipment, e.g., a POS register. In Embodiment 1, since intended denominations are eight denominations ranging from a one-cent coin to a two-euro coin, eight denominational storing and dispensing devices 114 are arranged. However, since the denominational storing and dispensing devices 114 all have the same basic configuration, the configuration of each portion is described with the same reference sign, and when explanation is particularly needed for each denomination, a denomination mark is given after the sign 114 for explanation. That is, a one-cent storing and dispensing device 1141C for one cent, a two-cent storing and dispensing device 1142C for two cents, a five-cent storing and dispensing device 1145C for five cents, a ten-cent storing and dispensing device 11410C for ten cents, a twenty-cent storing and dispensing device 11420C for twenty cents, a fifty-cent storing and dispensing device 11450C for fifty cents, a one-euro storing and dispensing device 1141E for one euro, and a two-euro storing and dispensing device 1142E for 2 euros are used.

In Embodiment 1, the denominational storing and dispensing device 114 is broadly constituted of a hopper bowl 236, a hole-equipped rotating body 238, a slide base 242, and a flick-out device (not illustrated).

The hopper bowl 236 is a vertical tubular body that is open in an upper surface and that is rectangular in an upper portion and circular in a lower portion, and stores the coins C in a bulk load state. The hole-equipped rotating body 238 is rotatably arranged in a circular hole in the bottom of the hopper bowl 236, and has a plurality of circular holes which are formed at eccentric positions and in which the coins C fall. The slide base 242 guides a lower surface of the coin C that has fallen in the hole-equipped rotating body 238. The flick-out device (not illustrated) is configured by a snapping roller forced to approach a fixed roller arranged beside the hole-equipped rotating body 238, and is configured to catch the coin C pushed out by the hole-equipped rotating body 238 between the rollers and flick out the coin C laterally from a feeding port 244 formed beside the hole-equipped rotating body 238. A so-called coin hopper is preferably used as the denominational storing and dispensing device 114.

Next, arrangement of the denominational storing and dispensing devices 114 according to coin denominations is described mainly with reference to FIG. 9.

The denominational storing and dispensing devices 114 are arranged for three denominations in the upper-stage space 144U, for three denominations in the middle-stage space 144M, and for two denominations in the lower-stage space 144L. Specifically, the one-cent storing and dispensing device 1141C, the two-euro storing and dispensing device 1142E, and the fifty-cent storing and dispensing device 11450C are put on the upper-stage bottom plate 1282 sequentially from the receiving port 102 side, thereby arranged in the upper-stage space 144U, and constitute an upper-stage storing and dispensing device array 114U. The two-cent storing and dispensing device 1142C, the five-cent storing and dispensing device 1145C, and the one-euro storing and dispensing device 1141E are arranged on the middle-stage bottom plate 1283 sequentially from the receiving port 102 side, and constitute a middle-stage storing and dispensing device array 114M. The ten-cent storing and dispensing device 11410C and the twenty-cent storing and dispensing device 11420C are arranged on the lower-stage bottom plate 1284 sequentially from the receiving port 102 side, and constitute a lower-stage storing and dispensing device array 114L. The one-euro storing and dispensing device 1141E in the middle-stage space 144M and the twenty-cent storing and dispensing device 11420C in the lower-stage space 144L are arranged in the vicinity of the back plate 128B, and are aligned in an up-down direction. In other words, the one-euro storing and dispensing device 1141E in the middle-stage space 144M and the twenty-cent storing and dispensing device 11420C in the lower-stage space 144L are arranged in the middle space 132M that is the farthest from the receiving port 102. The five-cent storing and dispensing device 1145C in the middle-stage space 144M and the ten-cent storing and dispensing device 11410C in the lower-stage space 144L are aligned with each other in an up-down direction. In other words, the five-cent storing and dispensing device 1145C in the middle-stage space 144M and the ten-cent storing and dispensing device 11410C in the lower-stage space 144L are arranged in the middle space 132M that is second farthest from the receiving port 102. The fifty-cent storing and dispensing device 11450C, the two-euro storing and dispensing device 1142E, and the one-cent storing and dispensing device 1141C in the upper-stage space 144U are staggered toward the receiving port 102 side relative to the one-euro storing and dispensing device 1141E, the five-cent storing and dispensing device 1145C, and the two-cent storing and dispensing device 1142C in the middle-stage space 144M. This is because the denominational drop passage 116 is arranged between the denominational storing and dispensing device 114 and the back plate 128B.

Next, the denominational drop passage 116 is described mainly with reference to FIGS. 8 and 9.

The denominational drop passage 116 has a function of guiding the coin C, distributed by the coin distributing device 112 according to coin denominations, to the denominational storing and dispensing device 114 for each denomination. In Embodiment 1, the denominational drop passage 116 is approximately formed into a tubular shape extending in an up-down direction, and is separated into an upper drop passage 116U arranged on an upper side of the top plate 1281, and a lower drop passage 116L arranged below the top plate 1281. Thus, the denominational drop passage 116 corresponding to the one-cent sorting hole 1C, the two-euro sorting hole 2E, the fifty-cent sorting hole 50C, and the one-euro sorting hole 1E that are formed in the lower sorting portion 208 is only configured by the upper drop passage 116U on the upper side of the top plate 1281.

First, the denominational drop passage 116 for the one-cent storing and dispensing device 1141C, the two-euro storing and dispensing device 1142E, and the fifty-cent storing and dispensing device 11450C that are arranged in the upper-stage space 144U is described. As illustrated in FIG. 3, a return denominational drop passage 116RJ is formed under a return sorting hole RJ of the lower sorting portion 208 in the coin distributing device 112 closest to the receiving port 102, and guides the coin C to be returned in such a way that the coin C slips down to the dispensing port 122.

The one-cent coin C that has fallen from the one-cent sorting hole 1C being second closest to the receiving port 102 is guided to a one-cent drop passage 1161C, falls in the one-cent opening 1461C illustrated in FIG. 9, and is then stored in the one-cent storing and dispensing device 1141C arranged in the upper-stage space 144U.

The two-euro coin C that has fallen from the two-euro sorting hole 2E being third closest to the receiving port 102 is guided to a two-euro drop passage 1162E, falls in the two-euro opening 1462E illustrated in FIG. 9, and is then stored in the two-euro storing and dispensing device 1142E arranged in the upper-stage space 144U.

The fifty-cent coin C that has fallen from the fifty-cent sorting hole 50C being fourth closest to the receiving port 102 is guided to a fifty-cent drop passage 11650C, falls in the fifty-cent opening 14650C, and is then stored in the fifty-cent storing and dispensing device 11450C arranged in the upper-stage space 144U.

The one-euro coin C that has fallen from the one-euro sorting hole 1E being fifth closest to the receiving port 102 is guided to a one-euro drop passage 1161E, falls in the one-euro opening 1461E, and is then stored in the one-euro storing and dispensing device 1141E arranged at a position of the middle-stage space 144M farthest from the receiving port 102. Since the one-euro storing and dispensing device 1141E is arranged in the middle-stage space 144M, the one-euro drop passage 1161E is configured to be separated into a one-euro upper drop passage 116U1E and a one-euro lower drop passage 116L1E. The one-euro lower drop passage 116L1E is laid in parallel to an overflow safe 134 described later, in a lateral width direction of the body 126.

The denominational drop passage 116 opposed to the two-cent sorting hole 2C, the five-cent sorting hole 5C, the ten-cent sorting hole 10C, the twenty-cent sorting hole 20C, and the overflow sorting hole OF arranged in the upper sorting portion 206 is separated into the upper drop passage 116U on a side higher than the top plate 1281, and the lower drop passage 116L lower than the top plate 1281.

The two-cent coin C that has fallen from the two-cent sorting hole 2C closest to the receiving port 102 is guided to a two-cent upper drop passage 116U2C, falls in the two-cent opening 1462C, is then guided to a two-cent lower drop passage 116L2C, and stored in the two-cent storing and dispensing device 1142C arranged in the middle-stage space 144M.

The five-cent coin C that has fallen from the five-cent sorting hole 5C being second closest to the receiving port 102 is guided to a five-cent upper drop passage 116U5C, falls in the five-cent opening 1465C, is then guided to a five-cent lower drop passage 116L5C arranged in the middle-stage space 144M, and stored in the five-cent storing and dispensing device 1145C.

The ten-cent coin C that has fallen from the ten-cent sorting hole 10C being third closest to the receiving port 102 is guided to a ten-cent upper drop passage 116U10C, falls in the ten-cent opening 14610C, is then guided to a ten-cent lower drop passage 116L10C, and stored in the ten-cent storing and dispensing device 11410C arranged in the lower-stage space 144L.

The twenty-cent coin C that has fallen from the twenty-cent sorting hole 20C being fourth closest to the receiving port 102 is guided to a twenty-cent upper drop passage 116U20C, falls in the twenty-cent opening 14620C, is then guided to a twenty-cent lower drop passage 116L20C, and stored in the twenty-cent storing and dispensing device 11420C arranged in the lower-stage space 144L.

The overflow coin C that has fallen from the overflow sorting hole OF being fifth closest to the receiving port 102 is guided to an overflow upper drop passage 116UOF, falls in the overflow opening 146OF, and then stored in the overflow safe 134 arranged in the upper-stage space 144U. The overflow coin C can also be arranged outside the cover 128.

The two-cent lower drop passage 116L2C, the five-cent lower drop passage 116L5C, the ten-cent lower drop passage 116L10C, and the twenty-cent lower drop passage 116L20C respectively have small lateral width in cross-section following the two-cent opening 1462C, the five-cent opening 1465C, the ten-cent opening 14610C, and the twenty-cent opening 14620C, are each formed into an oblong shape lengthwise in a transport direction of the coins C, and are laid in parallel in the right space 132R in a direction away from the receiving port 102. In Embodiment 1, the two-cent lower drop passage 116L2C, the five-cent lower drop passage 116L5C, the ten-cent lower drop passage 116L10C, and the twenty-cent lower drop passage 116L20C are configured integrally with the right plate 128R constituting the cover 128. Therefore, when coin jamming occurs in these passages, the coin jamming can be easily eliminated by working with the right plate 128R detached. Moreover, by configuring the denominational drop passage 116 in this way, a plurality of coin drop passages can be arranged in the same thin space in a width direction of the body, and there is an advantage that the device can be reduced in size.

As illustrated in FIG. 8, the two-cent lower drop passage 116L2C and the five-cent lower drop passage 116L5C respectively guide the coins C to the two-cent storing and dispensing device 1142C and the five-cent storing and dispensing device 1145C that are arranged in the middle-stage space 144M sequentially in a direction away from the receiving port 102, are therefore each formed into a crank shape, and each have a lower end thereof arranged in opposition to an upper end of a left (front) side end opening of the hopper bowl 236 of the corresponding storing and dispensing device.

Similarly, the ten-cent lower drop passage 116L10C and the twenty-cent lower drop passage 116L20C respectively guide the coins C to the ten-cent storing and dispensing device 11410C and the twenty-cent storing and dispensing device 11420C that are arranged in the lower-stage space 144L sequentially in a direction away from the receiving port 102, are therefore each formed into a crank shape, and each have a lower end thereof arranged in opposition to an upper end of a right (back) side end opening of the hopper bowl 236 of the corresponding storing and dispensing device. By arranging the denominational drop passage 116 in this way, bending of the denominational drop passage 116 can be reduced, and the denominational drop passage 116 in which the coins C can smoothly fall can be configured in a small space.

Next, the dispensing passage 118 is described mainly with reference to FIGS. 4 to 7.

The dispensing passage 118 has a function of dropping the coin C fed from the denominational storing and dispensing device 114 while guiding the coin C. In Embodiment 1, the dispensing passage 118 is the left space 132L formed between the left plate 128L and the inner left wall plate 130L. In the inner left wall plate 130L constituting the dispensing passage 118, a plurality of laterally long oblong denominational drop ports 252, where the coins C fed from the denominational storing and dispensing device 114 pass through, are formed. In Embodiment 1, since the denominational storing and dispensing devices 114 are arranged on three stages, the denominational drop ports 252 are also formed to be separated into three stages and laid in parallel in a horizontal direction.

Figure 5:
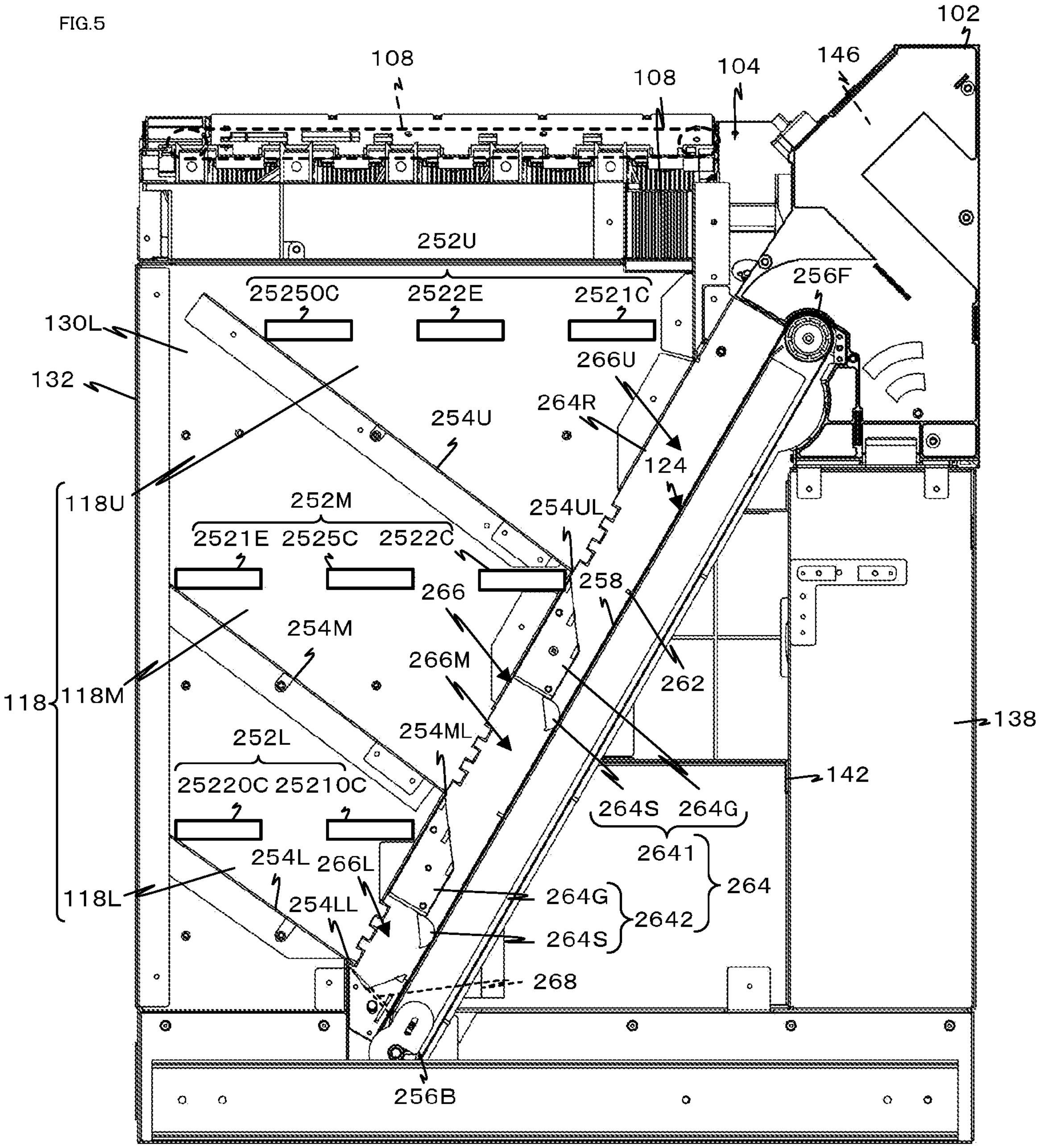
FIG. 5 is a longitudinal cross-sectional view along a vertical surface P1 in FIG. 1.

As illustrated in FIG. 5, a one-cent drop port 2521C, a two-euro drop port 2522E, and a fifty-cent drop port 25250C are horizontally formed along the coin transporting device 108 sequentially from the receiving port 102 side to correspond to the upper-stage storing and dispensing device array 114U, and constitute an upper-stage drop port array 252U.

A two-cent drop port 2522C, a five-cent drop port 2525C, and a one-euro drop port 2521E are horizontally formed along the coin transporting device 108 sequentially from the receiving port 102 side to correspond to the middle-stage storing and dispensing device array 114M, and constitute a middle-stage drop port array 252M.

A ten-cent drop port 25210C and a twenty-cent drop port 25220C are horizontally formed along the coin transporting device 108 sequentially from the receiving port 102 side to correspond to the lower-stage storing and dispensing device array 114L, and constitute a lower-stage drop port array 252L. In these drop ports 252 as well, the middle-stage drop port array 252M and the lower-stage drop port array 252L are aligned with each other in an up-down direction, as in the arrangement of the denominational storing and dispensing devices 114. The middle-stage drop port array 252M and the upper-stage drop port array 252U are arranged so as to be staggered in a front-back direction.

In Embodiment 1, the dispensing passage 118 is constituted of an upper-stage dispensing passage 118U for the upper-stage drop port array 252U, a middle-stage dispensing passage 118M for the middle-stage drop port array 252M, and a lower-stage dispensing passage 118L for the lower-stage drop port array 252L. The upper-stage dispensing passage 118U, the middle-stage dispensing passage 118M, and the lower-stage dispensing passage 118L are arranged closer to a back side in a front-back direction of the body 126.

The upper-stage dispensing passage 118U is a space surrounded by the top plate 1281, the left plate 128L, the inner left wall plate 130L, and an upper-stage inclined plate 254U and having an inverted triangle shape in a side view. The upper-stage inclined plate 254U constitutes a bottom surface of the upper-stage dispensing passage 118U, and is inclined downward toward the dispensing port 122 side at an angle at which a coin that has fallen from the upper-stage drop port array 252U slides down. The inclination angle of the upper-stage inclined plate 254U is preferably 35 to 45 degrees relative to a horizontal line, and an upper-stage inclined plate lower end 254UL that is a lower end of the upper-stage inclined plate 254U is arranged approximately in the middle of the body 126 in up-down and front-back directions.

With this configuration, the upper-stage inclined plate lower end 254UL is arranged under a back end of the one-cent drop port 2521C. Therefore, the coin C that has fallen from the one-cent drop port 2521C constituting the upper-stage drop port array 252U falls on the upward transport belt 124 described later through the upper-stage dispensing passage 118U, and the coins C that have fallen from the two-euro drop port 2522E and the fifty-cent drop port 25250C fall on the upper-stage inclined plate 254U through the upper-stage dispensing passage 118U, then slip down the upper-stage inclined plate 254U, and fall on the upward transport belt 124 from the upper-stage inclined plate lower end 254UL.

The middle-stage dispensing passage 118M is a space surrounded by the upper-stage inclined plate 254U, the left plate 128L, the inner left wall plate 130L, and a middle-stage inclined plate 254M and having an inverted trapezoid shape in a side view. The middle-stage inclined plate 254M constitutes a bottom surface of the middle-stage dispensing passage 118M, and is inclined downward toward the dispensing port 122 side at an angle at which the coin C that has fallen from the middle-stage drop port array 252M slides down. The middle-stage inclined plate 254M is inclined parallel to the upper-stage inclined plate 254U, and a middle-stage inclined plate lower end 254ML that is a lower end of the middle-stage inclined plate 254M is arranged below and behind the upper-stage inclined plate lower end 254UL.

With this configuration, the middle-stage inclined plate lower end 254ML is arranged under the space between the two-cent drop port 2522C and the five-cent drop port 2525C. Therefore, the coin C that has fallen from the two-cent drop port 2522C constituting the middle-stage drop port array 252M falls on the upward transport belt 124 described later through the middle-stage dispensing passage 118M, and the coins C that have fallen from the one-euro drop port 2521E and the five-cent drop port 2525C fall on the middle-stage inclined plate 254M through the middle-stage dispensing passage 118M, then slip down the middle-stage inclined plate 254M, and fall on the upward transport belt 124 from the middle-stage inclined plate lower end 254ML.

The lower-stage dispensing passage 118L is a space surrounded by the middle-stage inclined plate 254M, the left plate 128L, the inner left wall plate 130L, and a lower-stage inclined plate 254L and having an inverted trapezoid shape in a side view. The lower-stage inclined plate 254L constitutes a bottom surface of the lower-stage dispensing passage 118L, and is inclined downward toward the dispensing port 122 side at an angle at which the coin C that has fallen from the lower-stage drop port array 252L slides down. The lower-stage inclined plate 254L is inclined parallel to the middle-stage inclined plate 254M, and a lower-stage inclined plate lower end 254LL that is a lower end of the lower-stage inclined plate 254L is arranged below and behind the middle-stage inclined plate lower end 254ML.

With this configuration, the lower-stage inclined plate lower end 254LL is arranged below a back end of the ten-cent drop port 25210C. Therefore, the coin C that has fallen from the ten-cent drop port 25210C constituting the lower-stage drop port array 252L falls on the upward transport belt 124 described later, or on the lower-stage inclined plate lower end 254LL through the lower-stage dispensing passage 118L, and the coin C that has fallen from the twenty-cent drop port 25220C falls on the lower-stage inclined plate 254L through the lower-stage dispensing passage 118L, slips down the lower-stage inclined plate 254L, and falls on the upward transport belt 124 from the lower-stage inclined plate lower end 254LL.

As apparent from the above description, the upper-stage dispensing passage 118U, the middle-stage dispensing passage 118M, and the lower-stage dispensing passage 118L are arranged in a state of being stacked in an up-down direction in the left space 132L. This configuration enables the size of the body 126 in a width direction to be suppressed, and contributes to the reduction of the size of the body 126 in a width direction. The width of the dispensing passage 118 (the distance between a right guide plate 264R and a left guide surface 264GL) is preferably about twice the diameter of a largest-diameter coin. In Embodiment 1, the largest diameter is 25.75 mm of a two-euro coin and is therefore preferably about 50 mm which is twice larger.

Next, the upward transport belt 124 is described mainly with reference to FIG. 5.

The upward transport belt 124 has a function of transporting, to the dispensing port 122 located above, the coin C that has been fed from the denominational storing and dispensing device 114 and has fallen from the dispensing passage 118 (the upper-stage dispensing passage 118U, the middle-stage dispensing passage 118M, and the lower-stage dispensing passage 118L). In Embodiment 1, the upward transport belt 124 is constituted of the upward transport belt 124 wound around between a front dispensing transport roller 256F and a back dispensing transport roller 256B. The upward transport belt 124 presents a flat track field shape by the front dispensing transport roller 256F and the back dispensing transport roller 256B, and is arranged and inclined upward toward the dispensing port 122 side. Specifically, the back dispensing transport roller 256B is arranged lower and slightly closer to a front side than the lower-stage inclined plate lower end 254LL, and the front dispensing transport roller 256F is arranged higher than the front-side dispensing port 122 at approximately the same height as the upper-stage drop port array 252U in an up-down direction. Thus, a transport portion 258 of the upward transport belt 124 extends below the upper-stage inclined plate lower end 254UL, the middle-stage inclined plate lower end 254ML, and the lower-stage inclined plate lower end 254LL, in a state of being the same distance away from these lower ends and linearly inclined upward toward a front side (the dispensing port 122 side). From the perspective of an installation area and a transporting capability of the coins C, this upward inclination is preferably 45 degrees or more, more preferably, approximately 60 degrees relative to a horizontal line. However, an upward inclination angle of the upward transport belt 124 toward the dispensing port 122 side can be suitably set in consideration of the influence on the size in a depth direction of the coin receiving and dispensing device 100. Plate-shaped protrusions 262 protruding outward at right angles relative to the upward transport belt 124 are provided on a surface of the upward transport belt 124 at predetermined intervals in a longitudinal direction of the upward transport belt 124. The interval of the protrusions 262 is preferably the same as the interval of drop preventing devices 264 described later or the interval between the upper-stage inclined plate lower end 254UL and the middle-stage inclined plate lower end 254ML. Moreover, the protrusions 262 are configured to be separated into right protrusions 262R and left protrusions 262L in a width direction of the upward transport belt 124, and laid in parallel at predetermined intervals. On the transport portion 258 of the upward transport belt 124 on the dispensing passage 118 side, an upward transport passage 266 is configured by the left guide plate 264L and the right guide plate 264R arranged parallel at a predetermined interval in a width direction of the body 126.

Next, the transport passage 266 is described. The transport passage 266 has a function of guiding the coin C transported by the upward transport belt 124. In Embodiment 1, the upward transport belt 124 (flat belt) constitutes a bottom surface, and the left guide plate 264L and the right guide plate 264R constitute left and right guide surfaces. In other words, the transport passage 266 is configured, with the transport portion 258 of the upward transport belt 124 as a bottom surface and with the left guide plate 264L and the right guide plate 264R that are vertical relative to the bottom surface, into an elongated groove shape having a rectangular cross-section and extending obliquely toward the dispensing port 122. As illustrated in FIG. 5, a drop preventing plate 268 is arranged at a lower end of the transport passage 266 in such a way as to close the entire rectangular cross-section of the transport passage 266. The drop preventing device 264 is arranged in the transport passage 266.

Figure 10:
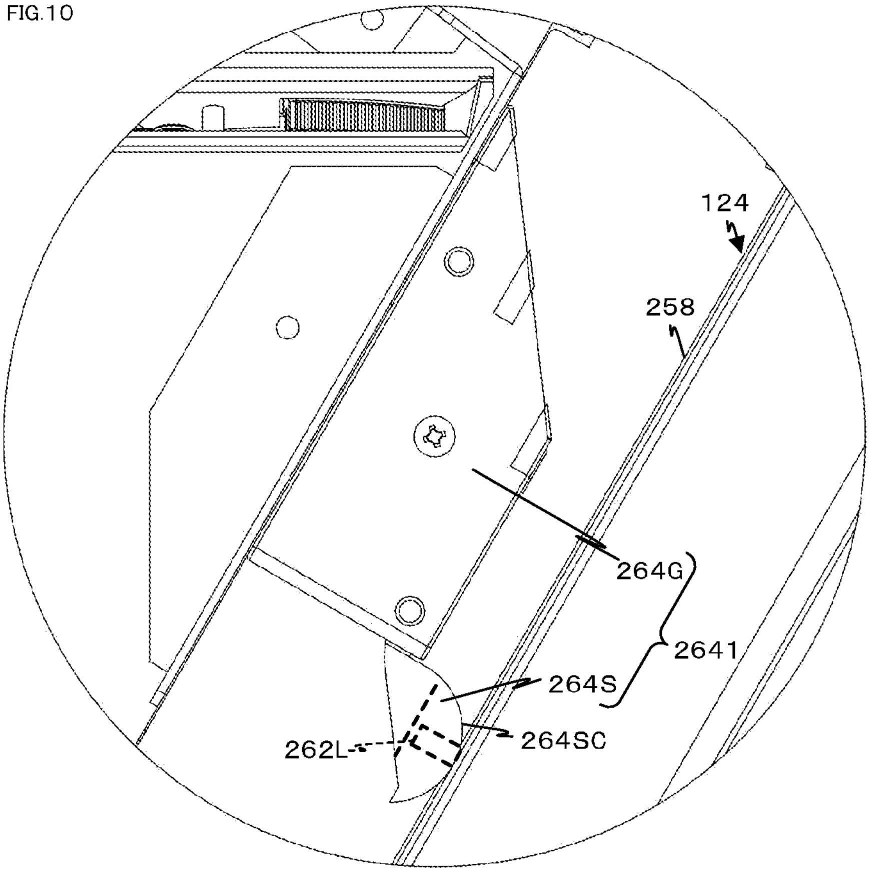
FIG. 10 is an enlarged left side view of a coin drop preventing device of the coin receiving and dispensing device of Embodiment 1 according to the present invention.
Figure 11:
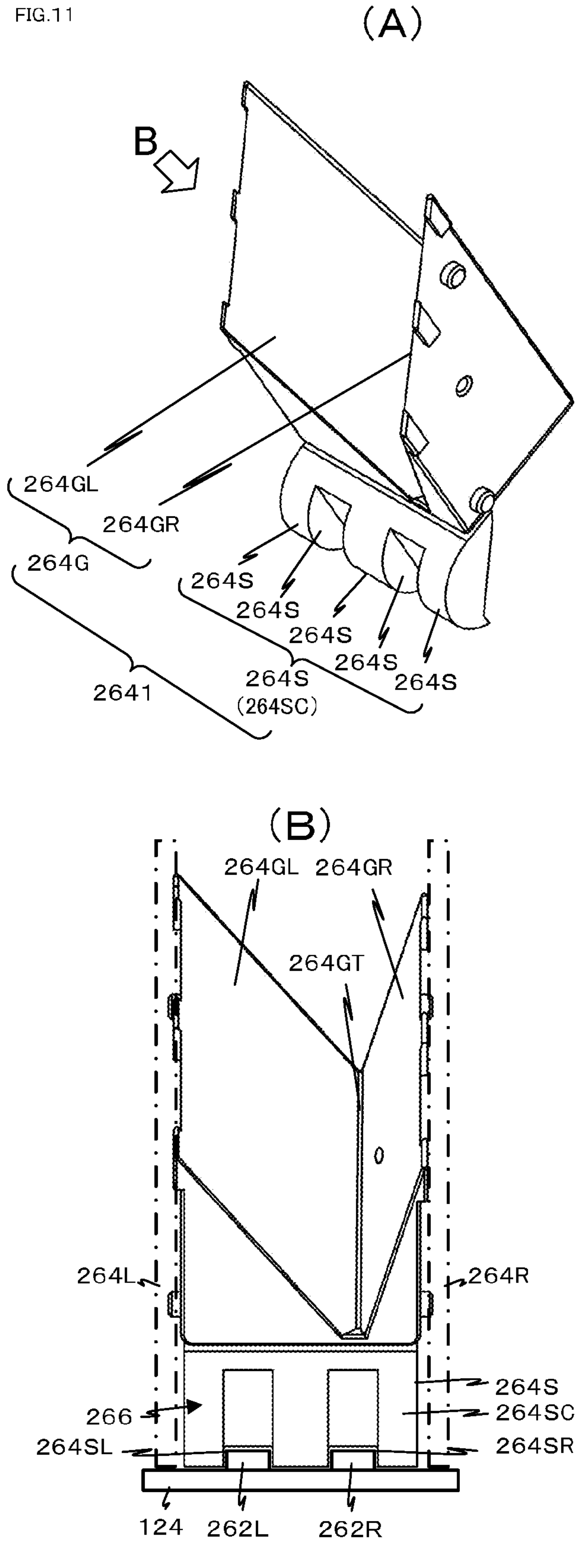
FIG. 11 illustrates the coin drop preventing device of the coin receiving and dispensing device of Embodiment 1 according to the present invention, in which (A) is an enlarged perspective view from a right side, and (B) is a view along the arrow B in (A).

Next, the drop preventing device 264 is described mainly with reference to FIGS. 10 and 11.

The drop preventing device 264 has a function of preventing the coin C fed to the upper dispensing passage 118 from falling to the lower dispensing passage 118 side in the transport passage 266. In Embodiment 1, the drop preventing device 264 has a function of preventing the coin C fed to the upper-stage dispensing passage 118U from falling to the middle-stage dispensing passage 118M in the transport passage 266. The drop preventing device 264 is provided with an upper-stage drop preventing device 2641 that prevents the coin C fed from the upper-stage storing and dispensing device array 114U to the upper-stage dispensing passage 118U from falling to the middle-stage dispensing passage 118M side below in the transport passage 266, and a middle-stage drop preventing device 2642 that prevents the coin C fed to the middle-stage dispensing passage 118M from falling to the lower-stage dispensing passage 118L side below in the transport passage 266. In other words, in Embodiment 1, the transport passage 266 has an upper-stage transport passage 266U configured higher than the upper-stage drop preventing device 2641, a middle-stage transport passage 266M configured between the upper-stage drop preventing device 2641 and the middle-stage drop preventing device 2642, and a lower-stage transport passage 266L formed under the middle-stage drop preventing device 2642. In Embodiment 1, since the upper-stage drop preventing device 2641 and the middle-stage drop preventing device 2642 have the same configuration, the upper-stage drop preventing device 2641 is described as a representative.

The upper-stage drop preventing device 2641 is constituted of a guide body 264G and a preventing body 264S. First, the guide body 264G is described with reference to FIG. 11(B).

The guide body 264G has a function of forcibly guiding, to the preventing body 264S side, the coin C falling downward through the upper-stage dispensing passage 118U along the upward transport belt 124. In Embodiment 1, the guide body 264G is formed into a V-shape by a right guide surface 264GR and a left guide surface 264GL expanding toward the dispensing port 122 side. A V-shaped top 264GT is formed above the right protrusion 262R so as to be biased to the middle space 132M side in a width direction of the upward transport belt 124. Therefore, the coin C is guided by the right guide surface 264GR and the left guide surface 264GL, and finally guided to the right protrusion 262R. However, the top 264GT can also be formed in such a way as to be opposed to the left protrusion 262L.

Next, the preventing body 264S is described.

The preventing body 264S has a function of preventing the coin C fed to the upper-stage dispensing passage 118U from falling to the middle-stage dispensing passage 118M side below in the upper-stage transport passage 266U. In Embodiment 1, the preventing body 264S is configured by a block of hard resin, hard rubber, metal, or the like having an upper end fixed to a lower end of the guide body 264G. A lower surface of the preventing body 264S is formed into a convex surface 264SC bulging toward the transport portion 258 side, and is configured to be partly arranged in a state of being in contact with or proximate to the transport portion 258 of the upward transport belt 124 so that the coin C does not fall from the space between the upward transport belt 124 and the convex surface 264SC. The convex surface 264SC is configured to have a left groove 264SL and a right groove 264SR formed in opposition to the protrusions 262 (the right protrusion 262R and the left protrusion 262L) so as to allow the passage of the right protrusion 262R and the left protrusion 262L moving integrally with the upward transport belt 124. With this configuration, the upper-stage drop preventing device 2641, specifically, the preventing body 264S prevents the coin C that has fallen in the upper-stage dispensing passage 118U from falling in the middle-stage transport passage 266M. The coin C that has been prevented from falling is locked by the right protrusion 262R or the left protrusion 262L and lifted toward the dispensing port 122 side.

The middle-stage drop preventing device 2642 also functions in a similar way, and prevents the coin C from falling to the lower-stage transport passage 266L from the middle-stage transport passage 266M.

Figure 4:
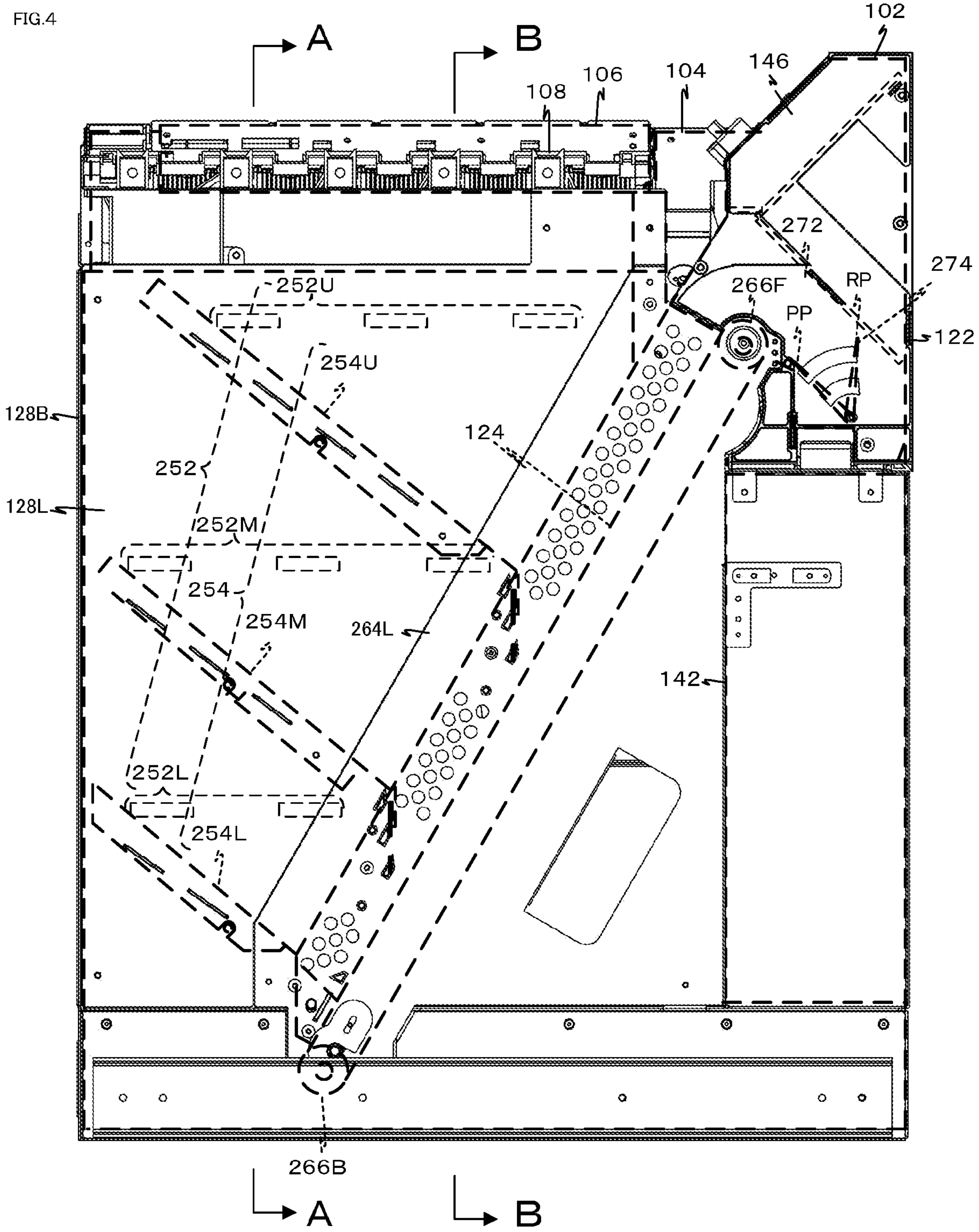
FIG. 4 is a left side view of the coin receiving and dispensing device of Embodiment 1 according to the present invention.

Next, the dispensing port 122 is described mainly with reference to FIG. 4.

The dispensing port 122 has a function of dispensing the coin C, transported by the upward transport belt 124, to an external device in order to deliver the coin C, or storing the coin C in the body 126, where a publicly known dispensing port 122 is used. In Embodiment 1, the dispensing port 122 is a rectangular opening formed closer to a left side at the intermediate position of a front surface of the body 126 in an up-down direction. In Embodiment 1, a downward dispensing port passage 272 is configured toward the dispensing port 122 following the upper-stage transport passage 266U opposed to the upward transport belt 124, the dispensing port 122 is further configured at an end of the dispensing port passage 272, and the coin C is supplied to an external reception from the dispensing port 122.

Next, the coin container 138 for collecting the coin C stored in the denominational storing and dispensing device 114 is described mainly with reference to FIG. 5.

The coin container 138 has a function of accommodating the coin C fed from the denominational storing and dispensing device 114 as described above, and the coin C is accommodated in the attachment hole 142 configured in the body 126 below the receiving port 102 and the dispensing port 122. In Embodiment 1, when the coin C stored in the denominational storing and dispensing device 114 is collected, the coin C is lifted by the upward transport belt 124, and fed toward the dispensing port 122, as in the case where the coin C is fed to the dispensing port 122. A switch plate 274 is arranged halfway in the dispensing port passage 272. The switch plate 274 is held at a dispensing position PP that configures a bottom plate of the dispensing port passage 272 during dispensing to the dispensing port 122. However, during collection of the coin C, the switch plate 274 is moved to a collection position RP where the switch plate 274 is flipped up, which closes the dispensing port passage 272, and opens a passage connecting to an upper surface opening of the coin container 138. Thus, the coin C lifted by the upward transport belt 124 is guided to the switch plate 274 and collected in the coin container 138.

Next, the action of the coin receiving and dispensing device 100 in Embodiment 1 is described.

In Embodiment 1, the coins C fed from the upper-stage storing and dispensing device array 114U arranged on an upper stage each fall in the upper-stage dispensing passage 118U through the one-cent drop port 2521C, the two-euro drop port 2522E, or the fifty-cent drop port 25250C of the upper-stage drop port array 252U, and fall on the upper-stage inclined plate 254U or the upward transport belt 124. The coin C that has fallen on the upper-stage inclined plate 254U slips down the upper-stage inclined plate 254U, and then falls on the upward transport belt 124. Even when the distance between the upper-stage drop port array 252U and the upper-stage inclined plate 254U or the upward transport belt 124 is small and the coin C that has fallen on these components bounces up, the coin C settles down in a short period of time as bounce is small, and the coin C is locked by the protrusions 262 on the upward transport belt 124 and transported toward the dispensing port 122.

The coins C fed from the two-cent drop port 2522C, the five-cent drop port 2525C, or the one-euro drop port 2521E of the middle-stage storing and dispensing device array 114M arranged on a middle stage each fall in the middle-stage dispensing passage 118M through the middle-stage drop port array 252M, and fall on the middle-stage inclined plate 254M or the upward transport belt 124. The coin C that has fallen on the middle-stage inclined plate 254M slips down the middle-stage inclined plate 254M, and then falls on the upward transport belt 124. Even when the distance between the middle-stage drop port array 252M and the middle-stage inclined plate 254M or the upward transport belt 124 is small and the coin C that has fallen on these components bounces up, the coin C settles down in a short period of time as the bounce is small, and the coin C is locked by the protrusions 262 on the upward transport belt 124 and transported toward the dispensing port 122.

The coins C fed from the ten-cent drop port 25210C or the twenty-cent drop port 25220C of the lower-stage storing and dispensing device array 114L arranged on a lower stage each fall in the lower-stage dispensing passage 118L through the lower-stage drop port array 252L, and fall on the lower-stage inclined plate 254L or the upward transport belt 124. The coin C that has fallen on the lower-stage inclined plate 254L slips down the lower-stage inclined plate 254L, and then falls on the upward transport belt 124. Even when the distance between the lower-stage drop port array 252L and the lower-stage inclined plate 254L or the upward transport belt 124 is small and the coin C that has fallen on these components bounces up, the coin C settles down in a short period of time as the bounce is small, and the coin C is locked by the protrusions 262 on the upward transport belt 124 and transported toward the dispensing port 122.

In normal dispensing processing, e.g., change dispensing processing, the number of the dispensed coins C is small, and the coins C are therefore smoothly dispensed to the dispensing port 122. In Embodiment 1, for example, even when a two-euro coin is thrown into the receiving port 102 to pay one cent, the coins C that are normally fed out are one one-euro coin, one fifty-cent coin, two twenty-cent coins, one five-cent coin, and two two-cent coins. In other words, one fifty-cent coin C is fed to the upper-stage dispensing passage 118U, one one-euro coin, one five-cent coin C, and two two-cent coins are fed to the middle-stage dispensing passage 118M, and one twenty-cent coin C is fed to the lower-stage dispensing passage 118L. In this case, a total of the four coins C are only fed to the middle-stage dispensing passage 118M, and these coins C are smoothly dispensed to the dispensing port 122 by the upward transport belt 124.

Next, the action in the case where the coins C are collected from all the denominational storing and dispensing devices 114 is described.

In this case, the coins C are simultaneously fed from each of the denominational storing and dispensing devices 114. Accordingly, the coins C exceed the dispensing and transporting capability of the upward transport belt 124, and remain in the upper-stage dispensing passage 118U, the middle-stage dispensing passage 118M, and the lower-stage dispensing passage 118L. In this case, in the upper-stage dispensing passage 118U, the fifty-cent storing and dispensing device 11450C and the two-euro storing and dispensing device 1142E are located above the upper-stage inclined plate 254U, so that the coin C fed from these components slips down on the upper-stage inclined plate 254U relatively slowly, and is then transported by the upward transport belt 124.

In the middle-stage dispensing passage 118M as well, the one-euro storing and dispensing device 1141E and the five-cent storing and dispensing device 1145C are located above the middle-stage inclined plate 254M, so that the coin C fed from these components slips down the middle-stage inclined plate 254M relatively slowly, and is then transported by the upward transport belt 124.

In the lower-stage dispensing passage 118L as well, the twenty-cent storing and dispensing device 11420C is located above the lower-stage inclined plate 254L, so that the coin C fed from these components slips down the lower-stage inclined plate 254L relatively slowly, and is then transported by the upward transport belt 124.

Accordingly, since the coins C remaining until transported by the upward transport belt 124 are dispersed into a plurality and remain, the coins C are not piled up high, and it becomes difficult for coin jamming to occur.

Particularly, when the drop preventing device 264 is provided, the coins C do not fall from the upper-stage dispensing passage 118U, and consequently, from the upper-stage transport passage 266U to the middle-stage transport passage 266M, and from the middle-stage transport passage 266M to the lower-stage transport passage 266L. Thus, the coins C are not piled up high, and it becomes more difficult for coin jamming to occur.

Embodiment 2

Figure 12:
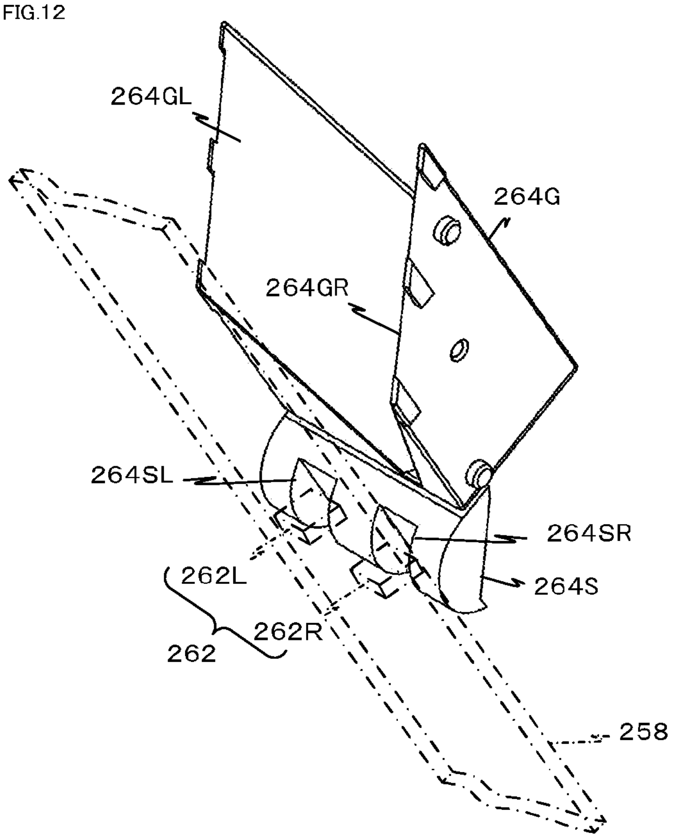
FIG. 12 is an operation explanatory view of a drop preventing device of a coin receiving and dispensing device of Embodiment 2 according to the present invention.
Figure 13:
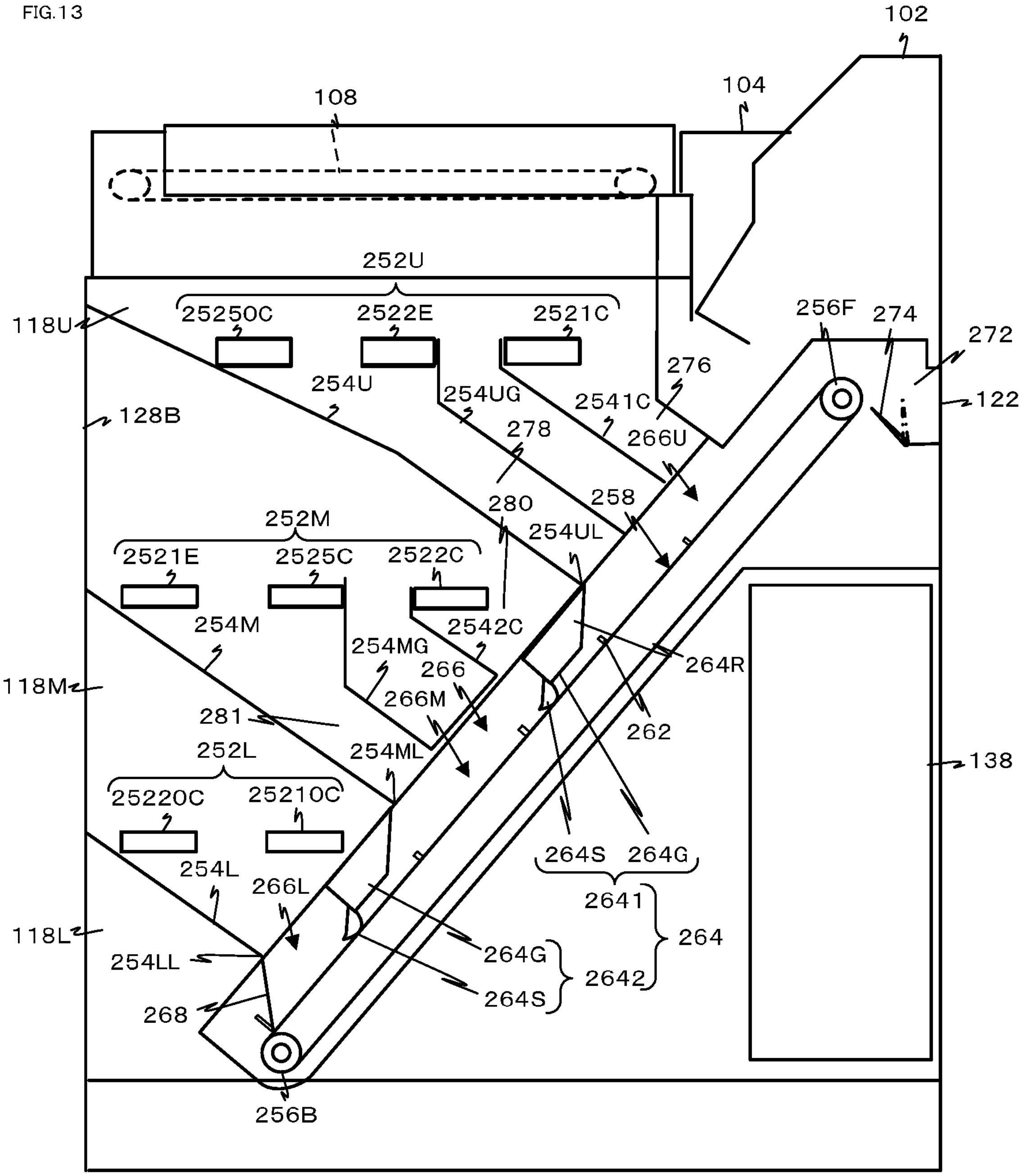
FIG. 13 is a longitudinal cross-sectional view of the coin receiving and dispensing device of Embodiment 2 according to the present invention at the same region as a vertical surface P1 in FIG. 1.

Next, a coin receiving and dispensing device 100 in Embodiment 2 is described with reference to FIGS. 12 and 13.

Embodiment 2 is different from Embodiment 1 in the configuration of a dispensing passage 118 (hereinafter referred to as a "second dispensing passage 1182" for convenience), and the other configurations are the same as those in Embodiment 1. Thus, description is omitted for the same components as those in Embodiment 1 by assigning the same reference signs, and the differing components are described.

The second dispensing passage 1182 is basically configured into a structure of three layers stacked on three respective stages of an upper-stage dispensing passage 118U, a middle-stage dispensing passage 118M, and a lower-stage dispensing passage 118L in a vertical direction by the upper-stage inclined plate 254U, the middle-stage inclined plate 254M, and the lower-stage inclined plate 254L. In Embodiment 2, an upper-stage forefront side inclined plate 2541C being an inclined plate that is inclined downward parallel to the upper-stage inclined plate 254U toward a dispensing port 122 side is further provided from a position immediately under a one-cent drop port 2521C until a transport passage 266, below a denominational storing and dispensing device 114 of the upper-stage storing and dispensing device array 114U closest to a receiving port 102, and in Embodiment 2, the one-cent drop port 2521C for a one-cent storing and dispensing device 1141C in the upper-stage dispensing passage 118U. With this configuration, a coin C fed from the one-cent storing and dispensing device 1141C falls in an upper-stage first passage 276 formed above the upper-stage forefront side inclined plate 2541C, and then slips down a upward transport belt 124 in an upper-stage transport passage 266U.

Furthermore, there is installed an upper-stage inclined plate guide plate 254UG being an inclined plate that extends downward from denominational storing and dispensing devices 114 of the upper-stage storing and dispensing device array 114U being second closest to the receiving port 102, and in Embodiment 2, a position of a two-euro drop port 2522E for a two-euro storing and dispensing device 1142E immediately close to the dispensing port 122 side, and then comes into a forwardly downward state parallel to the upper-stage forefront side inclined plate 2541C. With this configuration, the coins C fed from the two-euro storing and dispensing device 1142E and a 50-C storing and dispensing device 25250C fall in the upper-stage transport passage 266U while being guided to an upper-stage second passage 278 whose up-down direction is defined by the upper-stage inclined plate 254U and the upper-stage inclined plate guide plate 254UG. Even when the coins C fed from the two-euro storing and dispensing device 1142E and the 50-C storing and dispensing device 25250C are flipped due to the upper-stage inclined plate 254U, the coins C are guided by the upper-stage inclined plate guide plate 254UG that is close in distance, so that the coin flipping settles in a short period of time, and there is an advantage that quick coin dispensing can be performed.

Moreover, even when the coins C remain in the upper-stage first passage 276 or the upper-stage second passage 278 during coin collection, pileup in a height direction is limited, and the coins C remain along the upper-stage first passage 276 or the upper-stage second passage 278, and thus restriction of relative movement resulting from the coins C is therefore limited as well, so that occurrence of coin jamming is suppressed.

Furthermore, a middle-stage forefront side inclined plate 2542C being an inclined plate that is inclined downward parallel to the middle-stage inclined plate 254M toward the dispensing port 122 side is provided from a position immediately under a two-cent drop port 2522C until the transport passage 266, below the denominational storing and dispensing devices 114 of a middle-stage storing and dispensing device array 114M closest to the dispensing port 122, and in Embodiment 2, the two-cent drop port 2522C for the two-cent storing and dispensing device 1142C in the middle-stage dispensing passage 118M. With this configuration, the coin C fed from a two-cent storing and dispensing device 1142C falls in a middle-stage first passage 280 formed above the middle-stage forefront side inclined plate 2542C, and then slips down the upward transport belt 124 in a middle-stage transport passage 266M.

Additionally, there is installed a middle-stage inclined plate guide plate 254MG being an inclined plate that extends downward from the denominational storing and dispensing device 114 of the middle-stage storing and dispensing device array 114M being second closest to the dispensing port 122, and in Embodiment 2, a position of a five-cent drop port 2525C for a five-cent storing and dispensing device 1145C close to the dispensing port 122 side, and then comes into a forwardly downward state parallel to the middle-stage forefront side inclined plate 2542C. With this configuration, the coins C fed from a one-euro storing and dispensing device 1141E and a 5C storing and dispensing device 2525C fall in the middle-stage transport passage 266M while being guided to a middle-stage second passage 281 whose up-down direction is defined by the middle-stage inclined plate 254M and the middle-stage inclined plate guide plate 254MG. Even when the coins C fed from the one-euro storing and dispensing device 1141E and the 5C storing and dispensing device 2525C are flipped due to the middle-stage inclined plate 254M, the coins C are guided by the middle-stage inclined plate guide plate 254MG that is close in distance, so that the coin flipping settles in a short period of time, and there is an advantage that quick coin dispensing can be performed.

Moreover, even when the coins C remain in the middle-stage first passage 280 or the middle-stage second passage 281 during coin collection, pileup in a height direction is limited, and the coins C remain along the middle-stage first passage 280 or the middle-stage second passage 281, and thus restriction of relative movement resulting from the coins C is therefore limited as well, so that occurrence of coin jamming is suppressed.

Embodiment 3

Next, a coin receiving and dispensing device 100 in Embodiment 3 is described with reference to FIGS. 13 to 19.

Embodiment 3 is different from Embodiments 1 and 2 in the configurations of a dispensing passage 118 (hereinafter referred to as a "third dispensing passage 1183" for convenience) and a drop preventing device 264, and the other configurations are the same as those in Embodiment 1. Thus, description is omitted for the same components as those in Embodiment 1 by assigning the same reference signs, and the differing components are described.

The third dispensing passage 1183 is an example in which the dispensing passage 118 is configured for each denominational storing and dispensing device 114.

Figure 14:
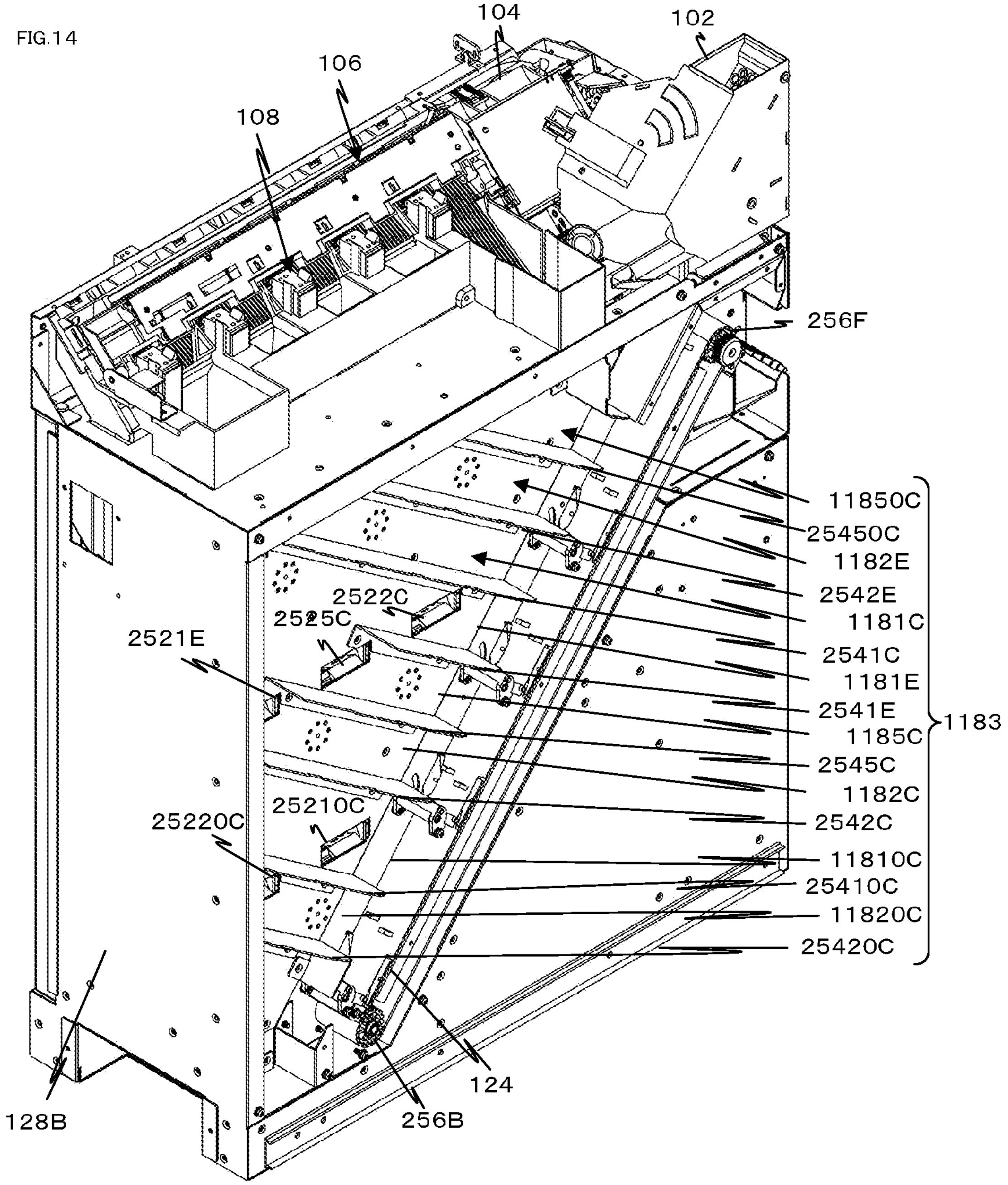
FIG. 14 is a perspective view of a coin receiving and dispensing device of Embodiment 3 according to the present invention from an upper left back direction.
Figure 15:
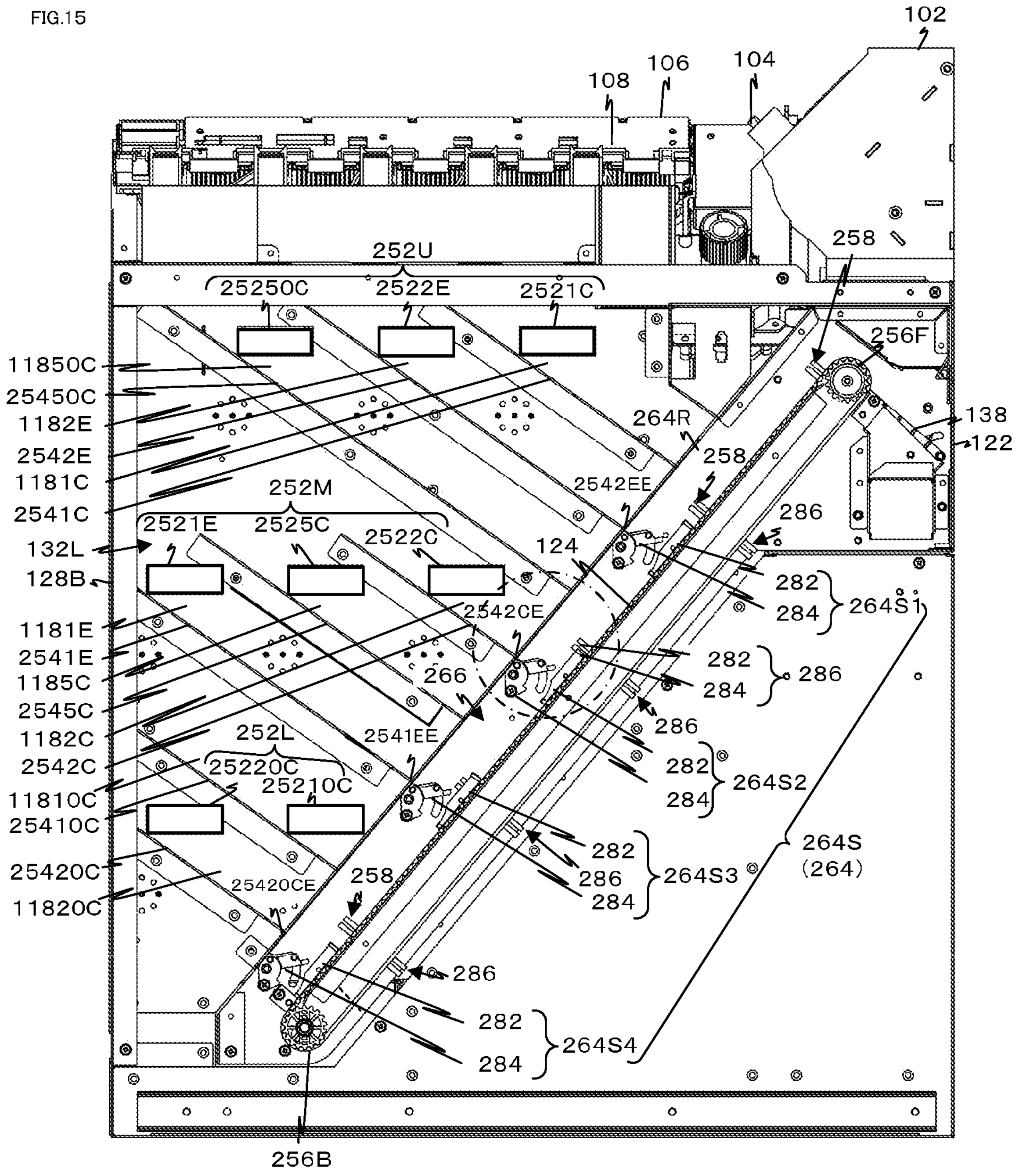
FIG. 15 is a longitudinal cross-sectional view of the coin receiving and dispensing device of Embodiment 3 according to the present invention at the same region as the vertical surface P1 in FIG. 1.
Figure 16:
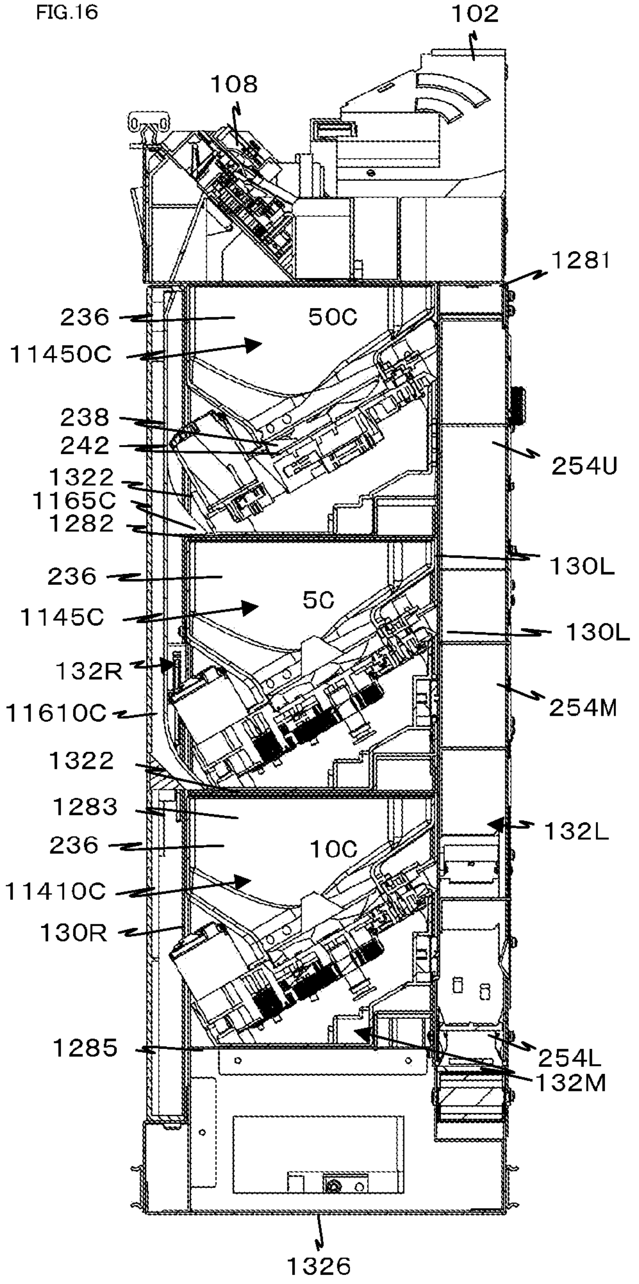
FIG. 16 is a cross-sectional view of the coin receiving and dispensing device of Embodiment 3 according to the present invention at a similar position to that in FIG. 6.
Figure 17:
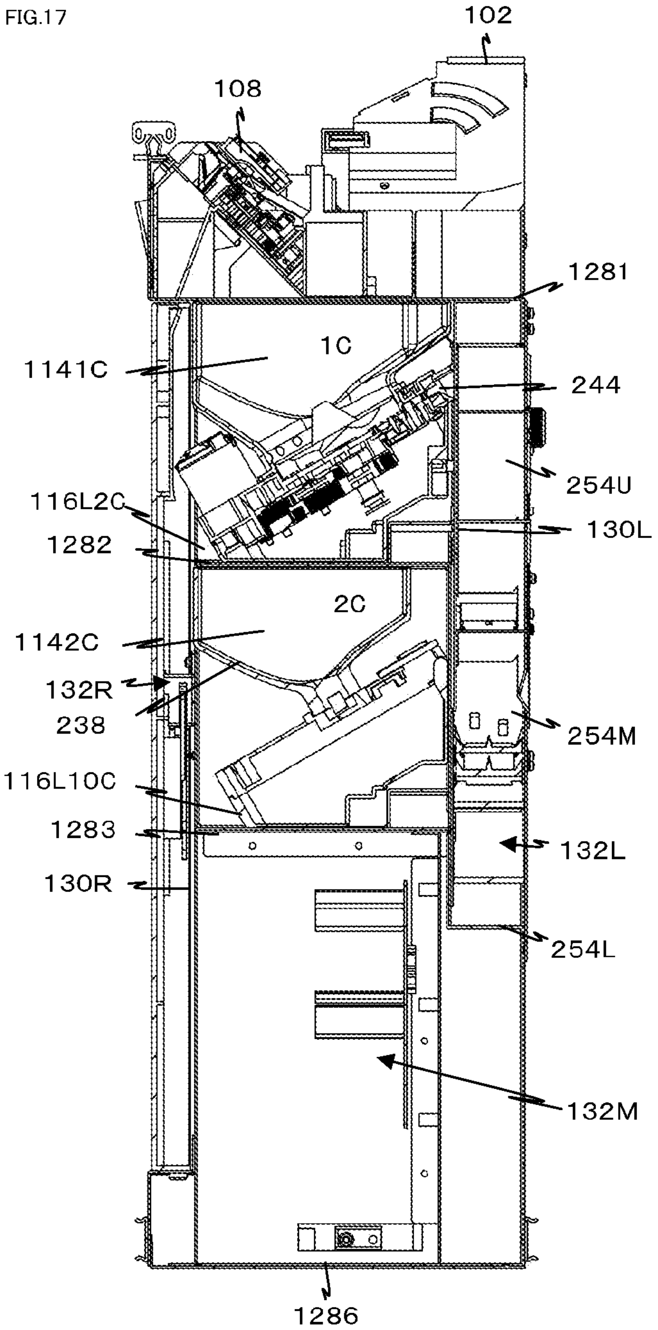
FIG. 17 is a cross-sectional view of the coin receiving and dispensing device of Embodiment 3 according to the present invention at a similar position to that in FIG. 7.

As illustrated in FIGS. 14 and 15, in a left space 132L, a guide plate 254 is arranged below each denominational drop port 252, and the dispensing passage 118 is formed for each denomination. A one-cent inclined plate 2541C, a two-euro inclined plate 2542E, and a fifty-cent inclined plate 25450C that are flat-plate-shaped are arranged for an upper-stage drop port array 252U. Specifically, the one-cent inclined plate 2541C has an upper end thereof arranged between a one-cent drop port 2521C and a two-euro drop port 2522E, and then arranged forwardly downward toward a transport passage 266 on a dispensing port 122 side.

Similarly, the two-euro inclined plate 2542E has an upper end thereof arranged between the two-euro drop port 2522E and a fifty-cent drop port 25250C, and then arranged forwardly downward toward the transport passage 266.

Similarly, the fifty-cent inclined plate 25450C has an upper end thereof arranged immediately under the fifty-cent drop port 25250C, and then arranged forwardly downward toward the transport passage 266.

Accordingly, a one-cent dispensing passage 1181C is formed on an upper side of the one-cent inclined plate 2541C, a two-euro dispensing passage 1182E is formed on an upper side of the two-euro inclined plate 2542E, a fifty-cent dispensing passage 11850C is formed on an upper side of the fifty-cent inclined plate 25450C, and these dispensing passages 118 are formed forwardly downward toward a upward transport belt 124 on the dispensing port 122 side.

A two-cent inclined plate 2542C, a five-cent inclined plate 2545C, and a one-euro inclined plate 2541E that are flat-plate-shaped are arranged for a middle-stage drop port array 252M. Specifically, the two-cent inclined plate 2542C has an upper end thereof arranged between a two-cent drop port 2522C and a five-cent drop port 2525C, and then arranged forwardly downward toward the transport passage 266.

Similarly, the five-cent inclined plate 2545C has an upper end thereof arranged between the five-cent drop port 2525C and a one-euro drop port 2521E, and then arranged forwardly downward toward the transport passage 266.

Similarly, the one-euro inclined plate 2541E has an upper end thereof arranged immediately under the one-euro drop port 2521E, and then arranged forwardly downward toward the transport passage 266 on the dispensing port 122 side.

Accordingly, a two-cent dispensing passage 1182C is formed on an upper side of the two-cent inclined plate 2542C, a five-cent dispensing passage 1185C is formed on an upper side of the five-cent inclined plate 2545C, a one-euro dispensing passage 1181E is formed on an upper side of the one-euro inclined plate 2541E, and these dispensing passages 118 are formed forwardly downward toward the upward transport belt 124 on the dispensing port 122 side.

A ten-cent inclined plate 25410C and a twenty-cent inclined plate 25420C that are flat-plate-shaped are arranged for a lower-stage drop port array 252L. Specifically, the ten-cent inclined plate 25410C has an upper end thereof arranged between a ten-cent drop port 25210C and a twenty-cent drop port 25220C, and then arranged forwardly downward toward the transport passage 266 on the dispensing port 122 side.

Similarly, the twenty-cent inclined plate 25420C has an upper end thereof arranged immediately under the twenty-cent drop port 25220C, and then arranged forwardly downward toward the transport passage 266 on the dispensing port 122 side.

Accordingly, a ten-cent dispensing passage 11810C is formed on an upper side of the ten-cent inclined plate 25410C, a twenty-cent dispensing passage 11820C is formed on an upper side of the twenty-cent inclined plate 25420C, and these dispensing passages 118 are formed forwardly downward toward the upward transport belt 124 on the dispensing port 122 side.

As apparent from the configuration described above, the coins C fed from the denominational storing and dispensing device 114 each fall in the denominational dispensing passage 118 from the denominational drop port 252, then fall on the denominational inclined plate 254, slip down the denominational inclined plates 254, then fall on the upward transport belt 124 being a bottom surface of the transport passage 266, and are transported to the dispensing port 122 by the travel of the upward transport belt 124.

Figure 18:
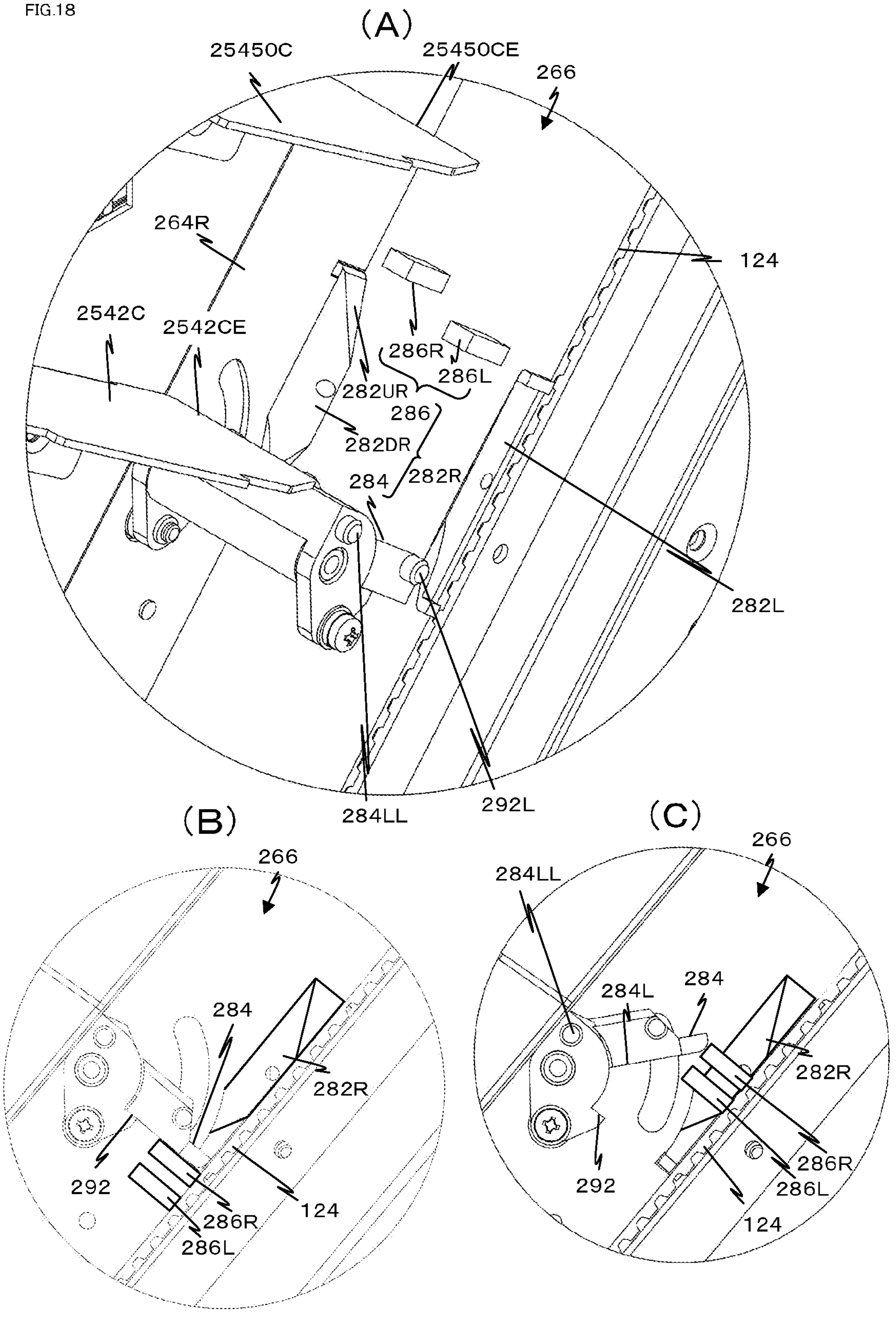
FIG. 18 is an enlarged view of a coin drop preventing device of the coin receiving and dispensing device of Embodiment 3 according to the present invention, in which (A) is a perspective view, (B) is an explanatory view at locking, and (C) is an explanatory view at flip-up.
Figure 19:
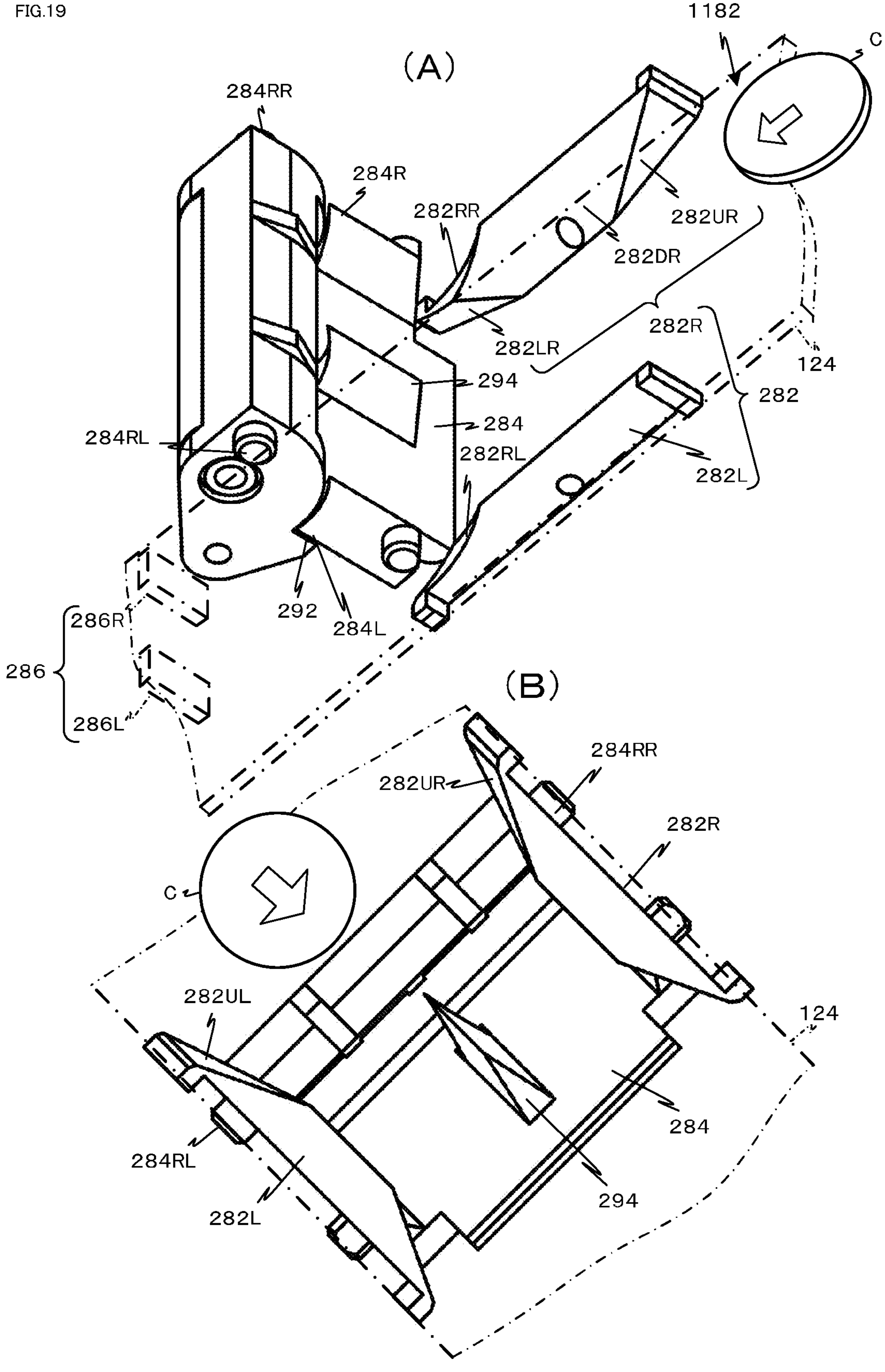
FIG. 19 is an enlarged view of the coin drop preventing device of the coin receiving and dispensing device of Embodiment 3 according to the present invention, in which (A) is a perspective view from an upper left direction, and (B) is a perspective view from a lower right direction.

Next, the drop preventing device 264 (referred to as a "second drop preventing device 264S" for convenience) is described mainly with reference to FIGS. 18 and 19. As with the drop preventing device 264, the second drop preventing device 264S has a function of preventing the coin C on the upward transport belt 124 from falling to the transport passage 266 below, and of flipping up the coin C toward the dispensing port 122 side of the transport passage 266. In Embodiment 3, a total of four sets of second drop preventing devices 264S are arranged. Specifically, a first second drop preventing device 264S1 is arranged in opposition to a lower end 2542EE of the two-euro inclined plate 2542E, a second second drop preventing device 264S2 is arranged in opposition to a lower end 2542CE of the two-cent inclined plate 2542C, a third second drop preventing device 264S3 is arranged in opposition to a lower end 2541EE of the one-euro inclined plate 2541E, and a fourth second drop preventing device 264S4 is arranged in opposition to a lower end 25420CE of the twenty-cent inclined plate 25420C. Since the first second drop preventing device 264S1, the second second drop preventing device 264S2, the third second drop preventing device 264S3, and the fourth second drop preventing device 264S4 in Embodiment 3 all have the same configuration, the second second drop preventing device 264S2 surrounded by a chain-line circle in FIG. 15 is described as a representative.

The second second drop preventing device 264S2 is constituted of a second guide device 282, a second preventing body 284, and a second protrusion 286. To summarize the function of each component, the coins C falling on the upward transport belt 124 are guided to the second preventing body 284 by the second guide device 282, flipped up toward the dispensing port 122 side by the second protrusion 286, dispersed on the upward transport belt 124, and thereby easily locked by the second protrusion 286.

First, the second guide device 282 is described mainly with reference to FIG. 19.

The second guide device 282 has a function of guiding the coin C falling on the upward transport belt 124 to the second preventing body 284, i.e., the middle of the upward transport belt 124 in a width direction.

Since the second guide device 282 is a pair of left and right rod-shaped guide bodies arranged along a longitudinal end of the upward transport belt 124 on a second dispensing passage 1182 side that is an upper side of the longitudinal end of the upward transport belt 124, and is symmetrically formed, the right second guide device 282 is described as a representative, and the description of the same component of a left guide plate 264L is omitted by changing right to left in the name and giving a reference sign with the same number and having the alphabet L in place of R.

A cross-section (a cross-section in a width direction of the upward transport belt 124) of an intermediate portion of a right guide body 282R has an approximately right-triangle elongated rod-shape. In the right guide body 282R, a right inclined surface toward middle 282UR sequentially approaching a middle side of the upward transport belt 124 is formed at an upper-side end, a left downward inclined surface 282DR sequentially approaching an upper surface of the upward transport belt 124 is formed in an intermediate portion, and a left separating inclined surface 282LR sequentially separating from the middle of the upward transport belt 124 to an end thereof is formed at a lower end. An upper side of the left separating inclined surface 282LR is formed on an arc-shaped left clearance surface 282RR. With this configuration, the coin C falling on the upward transport belt 124 is brought toward the middle in a width direction of the upward transport belt 124 by the right inclined surface toward middle 282UR and a left inclined surface toward middle 282UL, and the coin C falling from above the upward transport belt 124 is guided to the middle of the upward transport belt 124 by the right downward inclined surface 282DR and a left downward inclined surface 282DL (not seen) in a similar way, thereby guiding the coin C falling from an upper side, toward the middle of the second preventing body 284.

Next, the second preventing body 284 is described.

The second preventing body 284 has a function of keeping the coin C that has fallen while being guided by the second guide device 282 from further falling on the upward transport belt 124, and flipping up the coin C above the upward transport belt 124, i.e., toward the dispensing port 122. The second preventing body 284 in Embodiment 3 has an approximately square plate shape, and a left support shaft 284RL and a right support shaft 284RR protruding laterally from an upper-end side surface are revolvably supported by the left guide plate 264L and the right guide plate 264R, respectively. A right end 284R and a left end 284L of the second preventing body 284 are each locked to a stopper 292, the second preventing body 284 is stopped in a state of being approximately at right angles relative to an upper surface of the upward transport belt 124 as illustrated in FIG. 18(B), and a lower end of the second preventing body 284 in this instance is set to be less than the thickness of the thinnest coin C relative to the upper surface of the upward transport belt 124.

A thrust body 294 having a triangular cross-section is protrusively provided in the middle of a surface of the second preventing body 284 on the dispensing port 122 side. After the thrust body 294 plunges into a dense cluster of the coins C and thereby breaks down the dense cluster, the coins C are flipped up by the second preventing body 284, and can therefore be effectively flipped up.

Next, the second protrusion 286 is described.

The second protrusion 286 has a function of pushing the second preventing body 284 and forcibly revolving the second preventing body 284 around the left support shaft 284RL and the right support shaft 284RR. In Embodiment 3, the second protrusion 286 has a quadrangular plate shape protrusively formed at right angles relative to the upper surface of the upward transport belt 124, is a pair of small pieces composed of a right second protrusion 286R and a left second protrusion 286L that have a space in between in a width direction of the upward transport belt 124 and that are formed to be slightly staggered in a longitudinal direction of the upward transport belt 124, and is formed of the same material as the upward transport belt 124. With this configuration, the second protrusion 286 pushes the second preventing body 284 from a back surface side at a predetermined speed by movement of the upward transport belt 124 in a transport direction of the coins C. Thus, as illustrated in FIG. 18(C), the second preventing body 284 is revolved toward the dispensing port 122 side on the left support shaft 284RL and the right support shaft 284RR. In other words, the coin C that is prevented by the second preventing body 284 from falling is flipped up toward the dispensing port 122 side by the revolution of the second preventing body 284 toward the dispensing port 122 side, and then falls to the upward transport belt 124. Therefore, the coins C that are prevented by the second preventing body 284 from moving are dispersed and fall onto the upward transport belt 124. It becomes easy for each of the coins C to be locked to the second protrusion 286 by being dispersed, and the transport efficiency of the coins C increases. Moreover, the right second protrusion 286R and the left second protrusion 286L constituting one second preventing body 284 are arranged so as to be slightly staggered in a longitudinal direction of the upward transport belt 124, whereby the time in which the second preventing body 284 is revolved toward the dispensing port 122 side becomes longer, so that it becomes easy to lock the coin C by the right second protrusion 286R and the left second protrusion 286L. While the second preventing body 284 is revolved toward the dispensing port 122 side, falling of the coin C to the dispensing passage 118 below is prevented by the right second protrusion 286R and the left second protrusion 286L, and the coin C therefore does not fall to the transport passage 266 below. The right second protrusion 286R and the left second protrusion 286L can be integrated, which, however, increases the thickness of the second protrusion 286, and it is therefore preferable to split the second protrusion 286 as in Embodiment 3.

Next, the action of Embodiment 3 is described.

In Embodiment 3, the dispensing passage 118 is provided for each denominational storing and dispensing device 114. Therefore, a twenty-cent coin fed from a twenty-cent storing and dispensing device 11420C of the lower-stage storing and dispensing device array 114L falls in the twenty-cent dispensing passage 11820C through the twenty-cent drop port 25220C, and then falls on the upward transport belt 124. A ten-cent coin fed from a ten-cent storing and dispensing device 11410C of the lower-stage storing and dispensing device array 114L falls in the ten-cent dispensing passage 11810C through the ten-cent drop port 25210C, and then falls on the upward transport belt 124. A one-euro coin fed from a one-euro storing and dispensing device 1141E of a middle-stage storing and dispensing device array 114M falls in the one-euro dispensing passage 1181E through the one-euro drop port 2521E, and then falls on the upward transport belt 124. A five-cent coin fed from a five-cent storing and dispensing device 1145C of the middle-stage storing and dispensing device array 114M falls in the five-cent dispensing passage 1185C through the five-cent drop port 2525C, and then falls on the upward transport belt 124. A two-cent coin fed from a two-cent storing and dispensing device 1142C of the middle-stage storing and dispensing device array 114M falls in the two-cent dispensing passage 1182C through the two-cent drop port 2522C, and then falls on the upward transport belt 124. A fifty-cent coin fed from a fifty-cent storing and dispensing device 11450C of an upper-stage storing and dispensing device array 114U falls in the fifty-cent dispensing passage 11850C through the fifty-cent drop port 25250C, and then falls on the upward transport belt 124. A two-euro coin fed from a two-euro storing and dispensing device 1142E of the upper-stage storing and dispensing device array 114U falls in the two-euro dispensing passage 1182E through the two-euro drop port 2522E, and then falls on the upward transport belt 124. A one-cent coin fed from a one-cent storing and dispensing device 1141C of the upper-stage storing and dispensing device array 114U falls in the one-cent dispensing passage 1181C through the one-cent drop port 2521C, and then falls on the upward transport belt 124.

The coin C that has fallen on the upward transport belt 124 from the twenty-cent dispensing passage 11820C or the ten-cent dispensing passage 11810C is prevented by the fourth second drop preventing device 264S4 from further falling in the transport passage 266.

The coin C that has fallen on the upward transport belt 124 from the one-euro dispensing passage 1181E or the five-cent dispensing passage 1185C is prevented by the third second drop preventing device 264S3 from further falling.

The coin C that has fallen on the upward transport belt 124 from the two-cent dispensing passage 1182C or the fifty-cent dispensing passage 11850C is prevented by the second second drop preventing device 264S2 from further falling.

The coin C that has fallen on the upward transport belt 124 from the two-euro dispensing passage 1182E or the one-cent dispensing passage 1181C is prevented by the first second drop preventing device 264S1 from further falling.

The coin C on the upward transport belt 124 is locked by the right second protrusion 286R or the left second protrusion 286L and transported toward the dispensing port 122.

When all the coins C are collected, the coins C are simultaneously fed from the respective denominational storing and dispensing devices 114. Accordingly, the coins C exceed the dispensing and transporting capability of the upward transport belt 124, and remain in the one-cent dispensing passage 1181C, the two-euro dispensing passage 1182E, the fifty-cent dispensing passage 11850C, the two-cent dispensing passage 1182C, the five-cent dispensing passage 1185C, the one-euro dispensing passage 1181E, the ten-cent dispensing passage 11810C, or the twenty-cent dispensing passage 11820C. In this case, the coins C remain above the inclined plate 254 constituting each of the dispensing passages 118, so that as the coins C are sequentially transported by the upward transport belt 124, these remaining coins C are transported by the upward transport belt 124 after slowly slipping down the inclined plate 254. Furthermore, the coins C that are prevented by the first second drop preventing device 264S1 to the fourth second drop preventing device 264S4 from falling are flipped up toward the dispensing port 122 side by the second preventing body 284 that is pushed by the second protrusion 286, and are dispersed on the upward transport belt 124. Consequently, it becomes easy for the coins C to be locked to the second protrusion 286, and the coins C are smoothly transported toward the dispensing port 122 side.

Embodiment 4

A coin receiving and dispensing device 102 having a coin lifting device 100 in Embodiment 4 is described mainly with reference to FIGS. 20 to 29. In Embodiment 4, the coin receiving and dispensing device 102 for euro coins is intended to handle a two-cent coin, a five-cent coin, a ten-cent coin, a twenty-cent coin, a one-cent coin, a two-euro coin, a fifty-cent coin, and a one-euro coin, but is compatible with coins around the world such as Japanese coins and US coins.

The coin receiving and dispensing device 102 is used independently as an automatic receiving and dispensing device of coins C at a bank, a retail store, or the like, or used in combination with a bill receiving and dispensing device, a credit card and debit card processor or the like, and used to receive the inserted coins C as payment, dispense change, store the accepted coins C according to coin denominations, and automatically dispense the coin C of a designated denomination.

The coin receiving and dispensing device 102 in Embodiment 4 includes at least a coin separating and feeding device 106 that separates and feeds, one by one, the coins C accepted in a receiving port 104 in a bulk state, a coin distinguishing device 108 that distinguishes the authenticity and denominations of the coins C, a coin transporting device 110 that transports the coin C distinguished as an authentic coin by the coin distinguishing device 108, linearly in a direction away from the receiving port 104, a coin distributing device 112 that distributes, according to coin denominations, the coins C transported in a direction away from the receiving port 104 by the coin transporting device 110, a denominational storing and dispensing device 114 that stores the coins C distributed in the coin distributing device 112, and feeds the coins C one by one, a denominational drop passage 116 that guides, to the denominational storing and dispensing device 114, the coins C distributed by the coin distributing device 112, a dispensing passage 118 that guides the coins C fed one by one from the denominational storing and dispensing device 114, and an upward transport belt 124 that transports, to a dispensing port 122, the coins C that have fallen in the dispensing passage 118.

First, the entire coin receiving and dispensing device 102 in Embodiment 4 is described mainly with reference to FIGS. 20 to 27.

Figure 20:
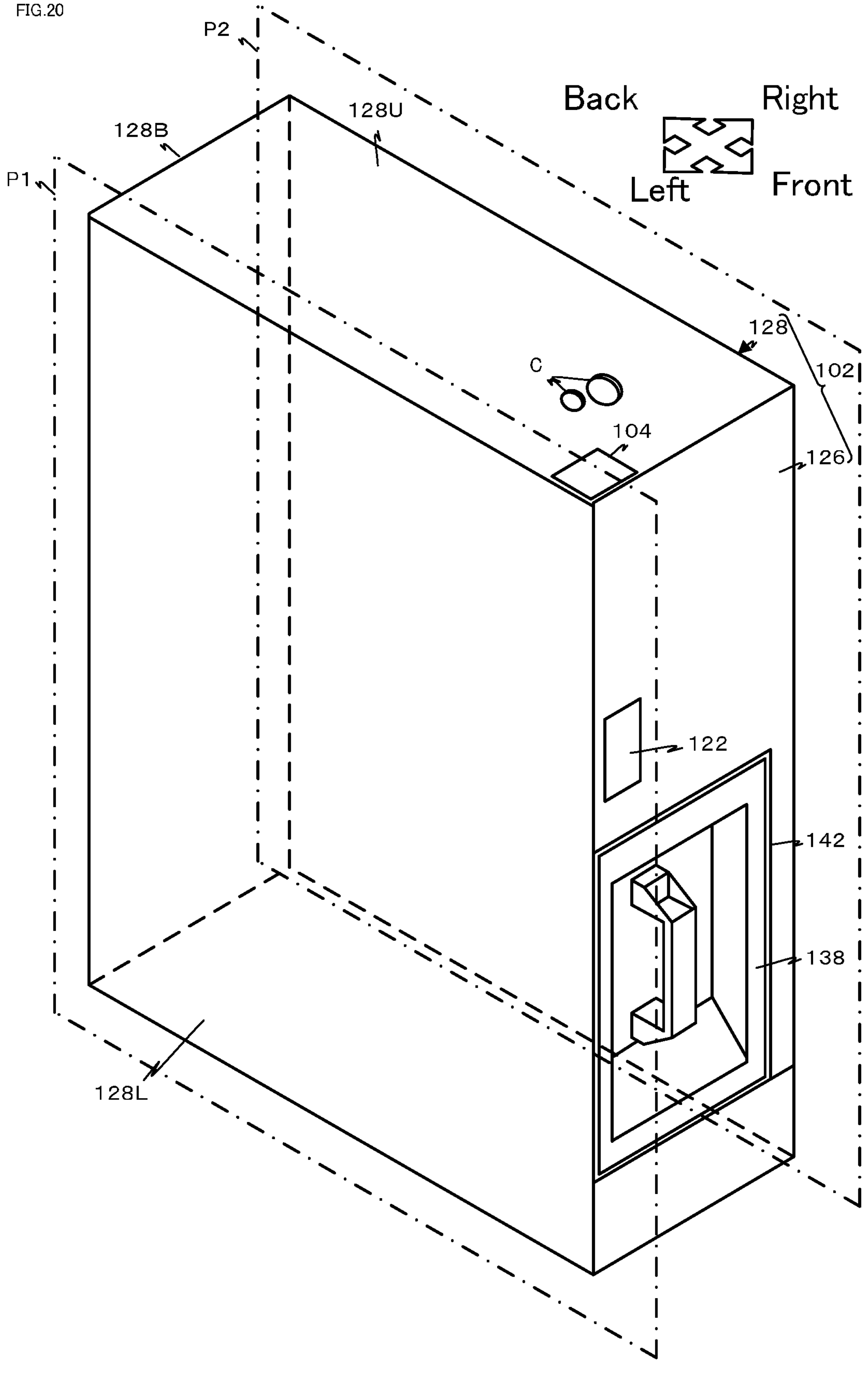
FIG. 20 is a perspective view of a coin receiving and dispensing device (with a cover) of Embodiment 4 according to the present invention from an upper left direction.
Figure 25:
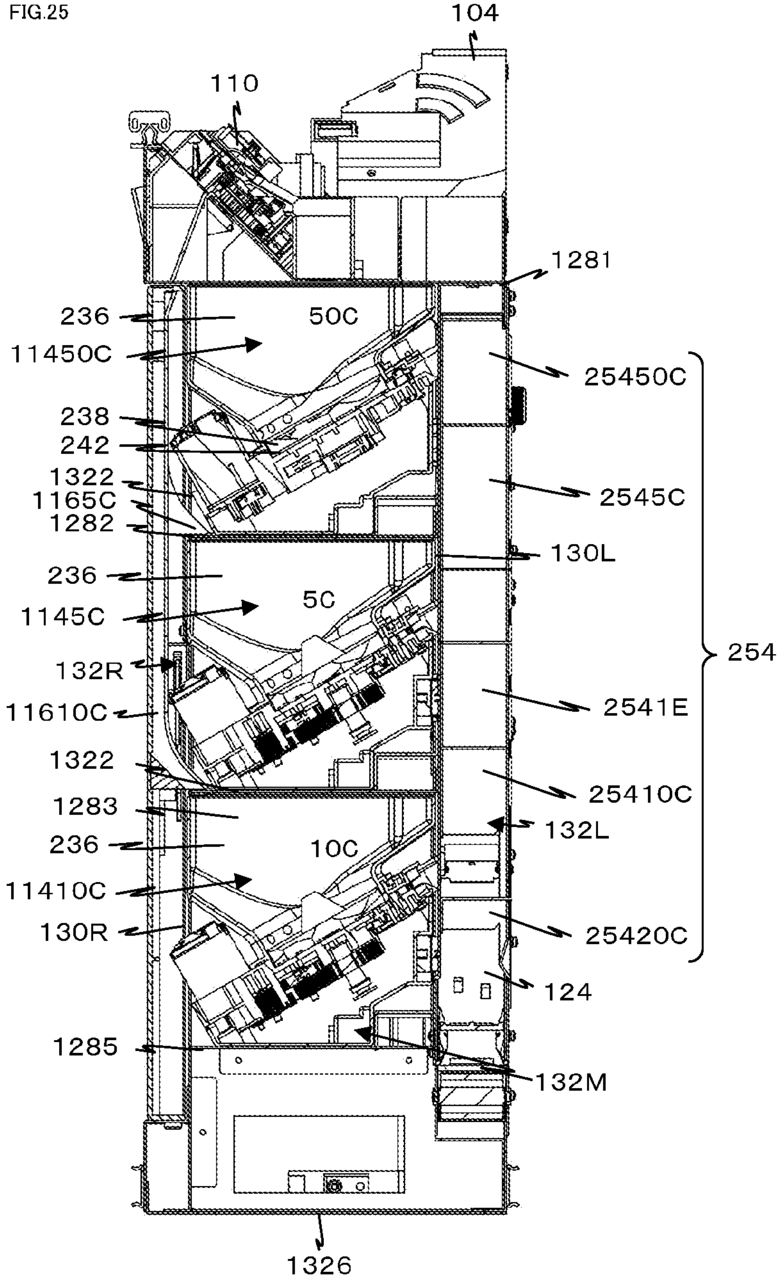
FIG. 25 is a cross-sectional view along the line B-B in FIG. 23.

In FIG. 20, the coin receiving and dispensing device 102 is configured into an elongated cubic shape by an approximately rectangular body 126, and a cover 128 covering a left plate 128L, a right plate 128R, an upper plate 128U, and a back plate 128B in an outer surface of the body 126. As illustrated in FIG. 25, inside the coin receiving and dispensing device 102, a vertically long right space 132R is demarcated by an inner right wall plate 130R arranged vertically on a right side in a width direction when seen from a front side in the width direction, a vertically long left space 132L is demarcated by an inner left wall plate 130L arranged vertically on a left side, and a vertically long middle space 132M wider than the right space 132R and the left space 132L is demarcated in the middle. A part of the denominational drop passage 116 is arranged in the right space 132R, the dispensing passage 118 is arranged in the left space 132L, and the denominational storing and dispensing device 114 is arranged in the long middle space 132M.

In a vertical front surface of the body 126, the rectangular dispensing port 122 is formed in an intermediate portion in an up-down direction. Below the dispensing port 122, an attachment hole 142 for a coin container 138 attachable to and detachable from a lower portion of the body 126 is formed. The coin container 138 accommodates all the coins C when all the coins are collected. A rectangular receiving port 104 for the coins C is formed upward in an upper surface of the body 126 close to the front surface. When the coin receiving and dispensing device 102 is arranged in a housing integrated with other processing devices, an upper left section of the left plate 128L facing the coin transporting device 110, and the upper plate 128U do not need to be covered.

Figure 23:
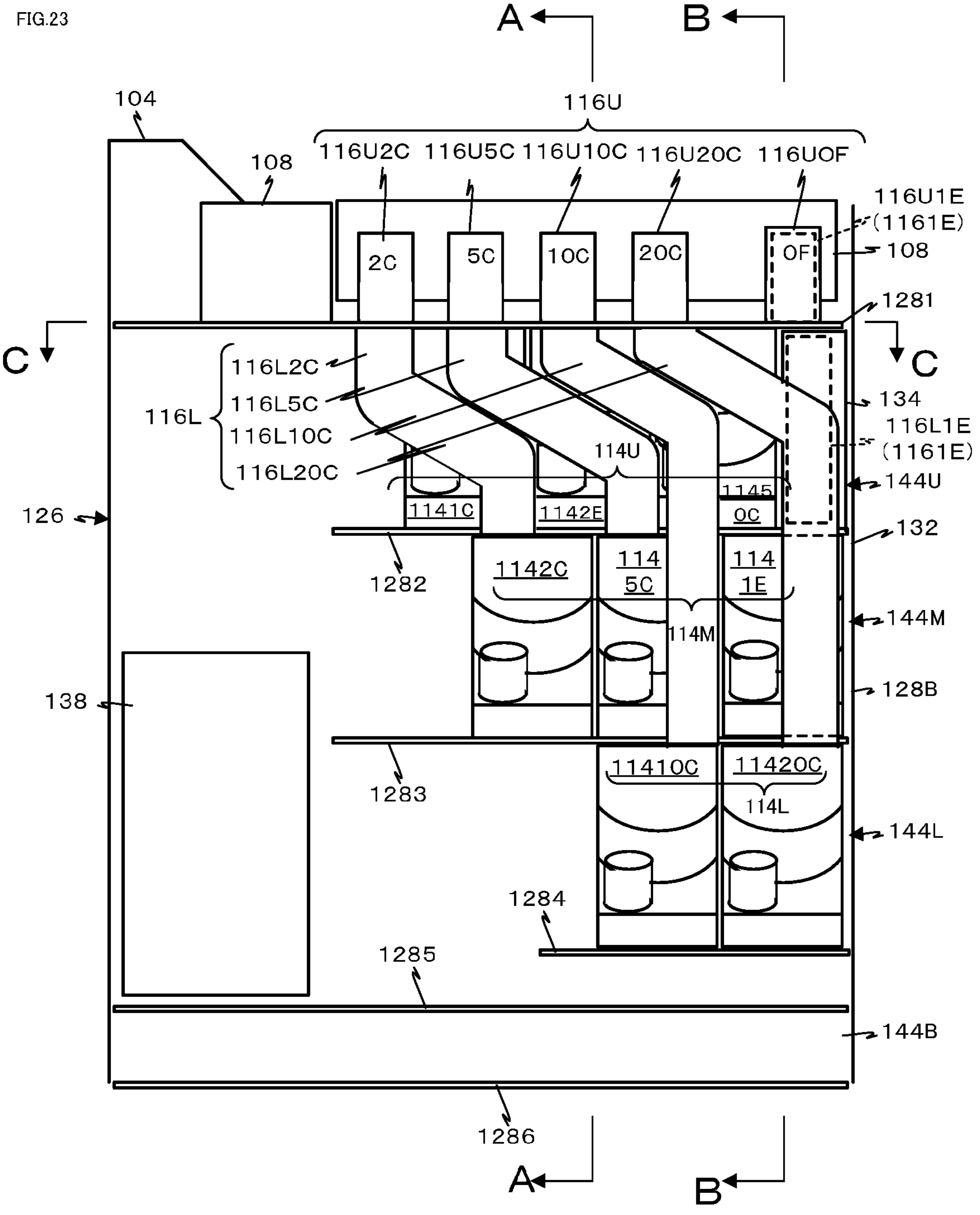
FIG. 23 is a longitudinal cross-sectional view along a vertical surface P2 in FIG. 20.

Next, the body 126 is described mainly with reference to FIG. 23.

Figure 26:
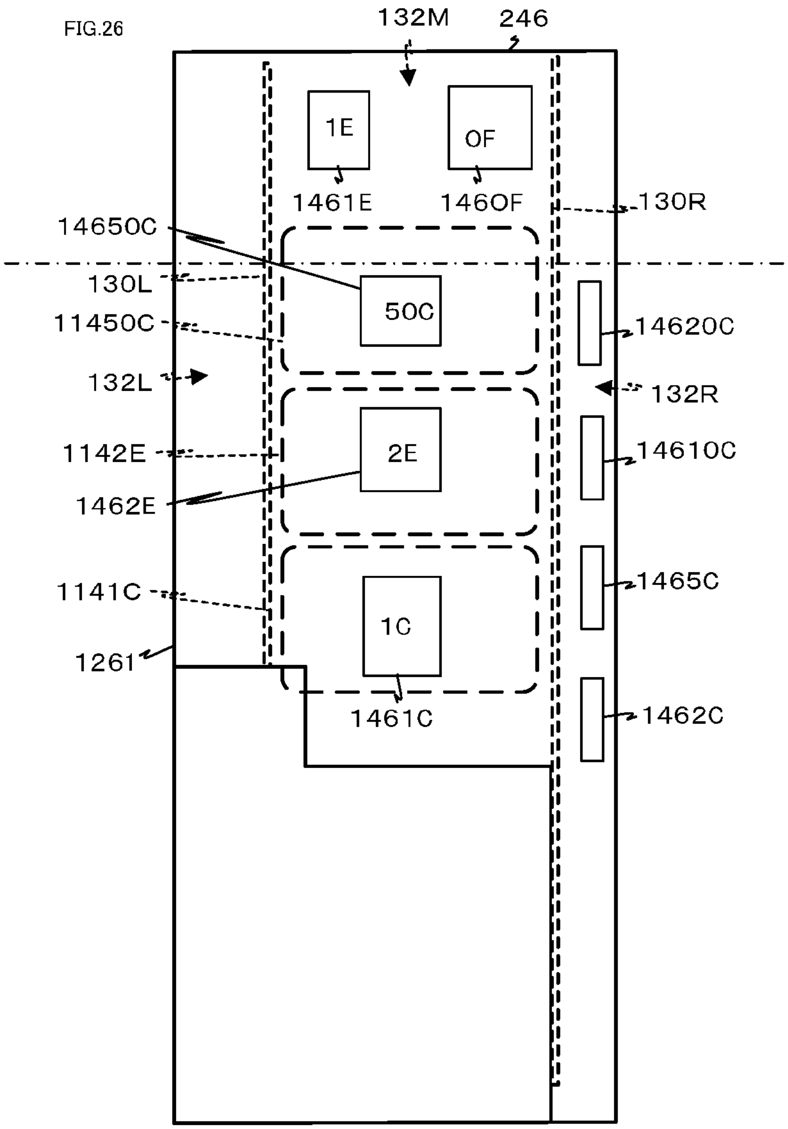
FIG. 26 is a cross-sectional view along the line C-C in FIG. 23.

The body 126 has a function of having the primary devices described above incorporated therein or attached thereto, is configured into an approximately vertical cubic shape by sheet metal, and is divided inside into approximately four layers in a vertical direction by a top plate 1281, an upper-stage bottom plate 1282, a middle-stage bottom plate 1283, a lower-stage bottom plate 1284, an inner bottom plate 1285, and a bottom plate 1286 that are installed approximately horizontally. That is, an upper-stage space 144U is formed between the top plate 1281 and the upper-stage bottom plate 1282, a middle-stage space 144M is formed between the upper-stage bottom plate 1282 and the middle-stage bottom plate 1283, and a lower-stage space 144L is formed between the middle-stage bottom plate 1283 and the lower-stage bottom plate 1284. A bottom space 144B is formed between the inner bottom plate 1285 and the bottom plate 1286. The upper-stage space 144U, the middle-stage space 144M, and the lower-stage space 144L are arranged below the receiving port 104, horizontally extend linearly in a direction away from the receiving port 104, and are formed with the same height and width. The coin transporting device 110 and the coin distributing device 112 that are integrated are installed on the top plate 1281. Moreover, as illustrated in FIG. 26, a one-cent opening 1461C for one-cent coin dropping, a two-euro opening 1462E for two-euro coin dropping, and a fifty-cent opening 14650C for fifty-cent coin dropping that are formed into an approximately square shape are formed above the middle space 132M being in the middle of the top plate 1281 in a width direction sequentially from the receiving port 104 side, and an overflow opening 146OF is made on a right side and a one-euro opening 1461E for one euro is made on a left side in the vicinity of a back wall 246. Moreover, a two-cent opening 1462C for two-cent coin dropping, a five-cent opening 1465C for five-cent coin dropping, a ten-cent opening 14610C for ten-cent coin dropping, and a twenty-cent opening 14620C for twenty-cent coin dropping that are approximately elongatedly formed in a transport direction of the coins C are formed above the right space 132R being on a right side of the top plate 1281 in a width direction sequentially from the receiving port 104 side.

Figure 21:
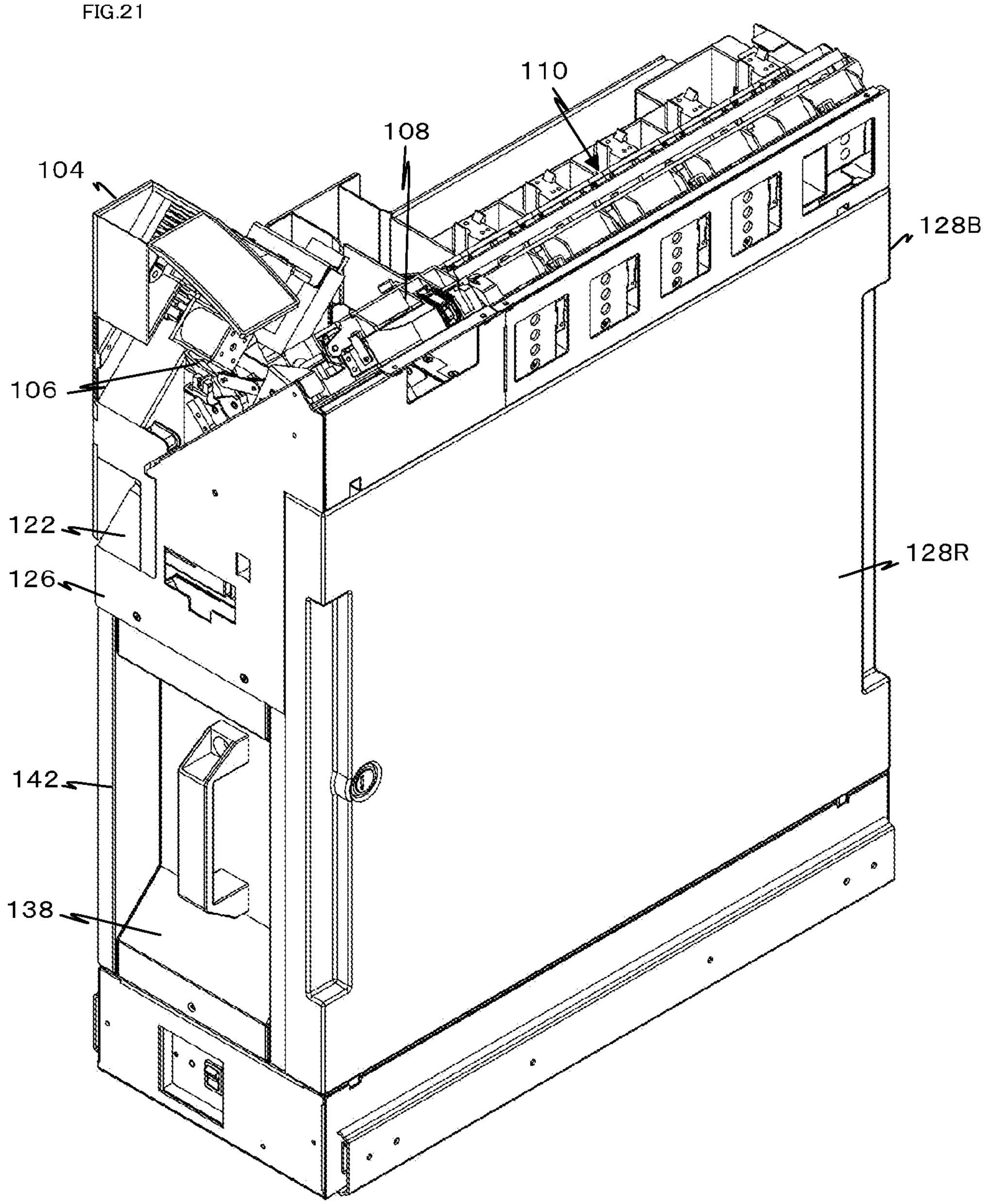
FIG. 21 is a perspective view of the coin receiving and dispensing device (without a cover) of Embodiment 4 according to the present invention from an upper right direction.

Next, the receiving port 104 is mainly described with reference to FIG. 21.

The receiving port 104 has a function of accepting the plurality of coins C collectively, and guiding the coins C to the coin separating and feeding device 106. In Embodiment 4, the receiving port 104 is an upward rectangular opening formed in a front-side upper surface of the body 126. A guide tube146 (FIG. 22) facing in a backward and obliquely downward direction of the body 126 is formed contiguously from the receiving port 104, and a lower end of the guide tube146 is open on an upper-surface opening of a bowl-shaped coin storing container 148 constituting the coin separating and feeding device 106. Therefore, the plurality of coins C thrown into the receiving port 104 are guided to the guide tube146 and fall in the coin storing container 148 of the coin separating and feeding device 106.

Figure 22:
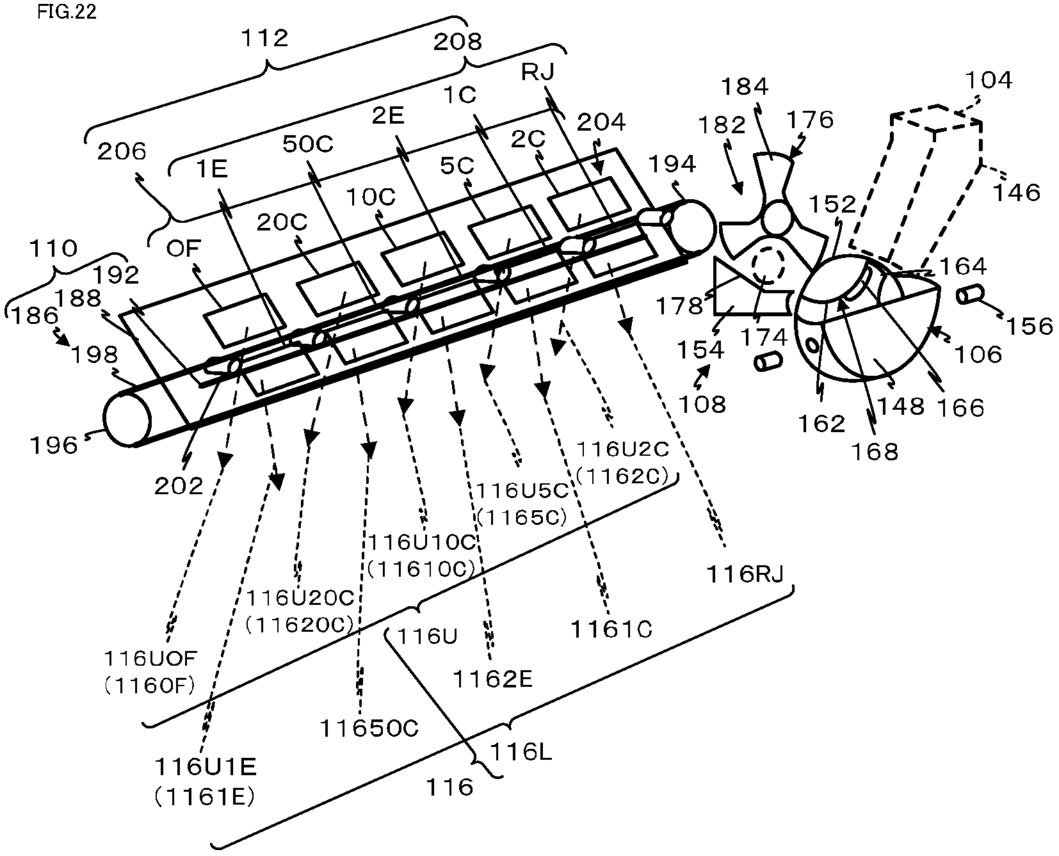
FIG. 22 is a schematic explanatory view of a coin distinguishing device, a coin transporting device, and a coin distributing device of the coin receiving and dispensing device of Embodiment 4 according to the present invention.

Next, the coin separating and feeding device 106 is described mainly with reference to FIG. 22.

The coin separating and feeding device 106 has a function of separating, one by one, the coins C of a plurality of denominations stored in a bulk load state and differing in diameter, and feeding the coins C to the coin distinguishing device 108 being a subsequent process. A publicly known coin separating and feeding device is used as the coin separating and feeding device 106.

The coin separating and feeding device 106 in Embodiment 4 is arranged under the receiving port 104, and includes a rotary disc 152, the coin storing container 148, a receiving body 154, and a full sensor 156.

The rotary disc 152 has an accepting portion 168 that accepts the coins C one by one, is inclined and arranged at a predetermined angle, and is rotated at a predetermined speed.

The accepting portion 168 has a Y-shaped plate 164 that has three concave portions 162 formed in an upper surface of the rotary disc 152 at equal intervals and that is fixed concentrically with the rotary disc 152.

A pushing body 166 that makes a pivot movement is arranged on one side of each of the concave portions 162 (e.g., see JP Patent No. 4997374).

In other words, the nearly semicircular accepting portion 168 is formed by the pushing body 166 and the concave portion 162.

The accepting portion 168 is set at a size that cannot accept two smallest-diameter coins in parallel and can accept only one largest-diameter coin.

The pushing body 166 is normally located in a static state at a position close to one side of the concave portion 162 so as to form the accepting portion 168, and feeds the stored coin C in a peripheral direction of the rotary disc 152 when making a pivot movement and moving to a predetermined position.

The accepting portion 168 accepts, one by one, the coins C stored in a bulk load state in a lower portion opposed to the coin storing container 148, and the pushing body 166 pushes the coins C in the accepting portion 168 in the peripheral direction at a predetermined position above a rotation center of the rotary disc 152, and delivers the coins C to the knife-shaped receiving body 154.

The rotary disc 152 is rotated at a predetermined speed by a non-illustrated electric motor via a reduction gear.

The full sensor 156 has a function of outputting a full signal when the amount of coins in the coin storing container 148 has become equal to or more than a predetermined amount, and is, for example, a transmission-type photoelectric sensor.

Acceptance of the coins C from the receiving port 104 is limited by a non-illustrated means when the full sensor 156 outputs a full signal, and the acceptance limitation of the coins C is canceled when a full signal is no longer output.

Next, the coin distinguishing device 108 is described.

The coin distinguishing device 108 has a function of acquiring, by a sensor, physical property information, surface pattern information, or the like of the coin C fed by the coin separating and feeding device 106, and performing a genuineness determination and a denomination determination on the basis of the acquired information, where a publicly known coin distinguishing device is used as the coin distinguishing device 108. In Embodiment 4, the coin distinguishing device 108 includes a magnetic sensor 174, a slide base (not illustrated) arranged flush with an upper surface of the rotary disc 152, a rotating body 176 for sending the coins C, and a reference guide 178.

The slide base (not illustrated) has a function of guiding one surface of the coin C pushed by the rotating body 176.

The rotating body 176 has a function of moving the coins C received from the coin separating and feeding device 106, and passing the coins C, one by one, through a coin accepting portion 182.

Further, the rotating body 176 has a function of delivering, to the coin transporting device 110, the coins C that have passed through the coin accepting portion 182.

The rotating body 176 is rotatable in a plane parallel and proximate to the slide base, forms the coin accepting portion 182 by three pushing levers 184 that are of the same number as the accepting portions 168 and that are arranged at equal intervals, and has a Y-shape.

The reference guide 178 has a function of linearly guiding the passing coin C in opposition to the coin accepting portion 182, and bringing the coin C to a constant position relative to the magnetic sensor 174. A coin determination device disclosed in JP Patent No. 4997374 is preferably, but not exclusively, used as the publicly known coin distinguishing device 108.

Next, the coin transporting device 110 is described.

The coin transporting device 110 has a function of linearly transporting, in a direction away from the receiving port 104, the coins C fed one by one from the coin distinguishing device 108.

The coin transporting device 110 in Embodiment 4 is mounted onto the top plate 1281 integrally with the coin distributing device 112 described later. The coin transporting device 110 includes an endless transport body 186 moving within the same plane in one direction away from the receiving port 104, a slide plate 188 on which one surface of the coin C pushed by the endless transport body 186 slides, and a straight guide rail 192 that guides a peripheral surface of the coin C.

In Embodiment 4, the endless transport body 186 is a chain 198 stretched substantially horizontally between a first sprocket 194 and a second sprocket 196 arranged at a predetermined interval. The chain 198 is installed in a flat running track form, and the first sprocket 194 is arranged immediately beside the rotating body 176 of the coin distinguishing device 108. Push pins 202 are fixed to a side surface of the chain 198 at predetermined intervals.

The plurality of push pins 202 are mounted on the chain 198 at intervals corresponding to the intervals of the pushing levers 184.

The first sprocket 194 is rotated at a predetermined speed, and the pushing levers 184 and the push pins 202 are set to immediately push, by the push pins 202, the coin C pushed to a transfer path 204 of the push pins 202 by the pushing levers 184. The transfer path 204 is a path where the coin C pushed by the push pins 202 moves while being guided by the guide rail 192.

The guide rail 192 has a function of guiding a lower-end peripheral surface of the coin C in such a way that the coin C pushed by the push pins 202 moves in the transfer path 204.

The guide rail 192 is arranged along and slightly below the chain 198 presenting an upper linear shape of the running track form.

The guide rail 192 protrudes slightly further than the largest thickness of the coin C to be handled, in a direction orthogonal to the slide plate 188.

Therefore, the coin C pushed by the push pins 202 has a lower surface of the coin C guided by the slide plate 188, and a lower-end peripheral surface of the coin C guided by the guide rail 192.

As described later, the guide rail 192 in Embodiment 4 also serves as a sorting portion. For example, a coin transporting device disclosed in JP Patent No. 4997374 is preferably, but not exclusively, used as the coin transporting device 110.

Next, the coin distributing device 112 is described.

The coin distributing device 112 has a function of dropping the coins C transported by the coin transporting device 110, into coin sorting holes of relevant denominations according to coin denominations distinguished in the coin distinguishing device 108, and distributing the coins C according to predetermined coin denominations.

The coin distributing device 112 in Embodiment 4 has an upper sorting portion 206 arranged along the guide rail 192 on an upper side of the guide rail 192, and a lower sorting portion 208 arranged along the guide rail 192 on a lower side of the guide rail 192.

The upper sorting portion 206 has a two-cent sorting hole 2C, a five-cent sorting hole 5C, a ten-cent sorting hole 10C, a twenty-cent sorting hole 20C, and an overflow sorting hole OF that are arranged sequentially toward a travel direction of the coin transporting device 110, i.e., in a direction away from the receiving port 104.

The lower sorting portion 208 has a reject sorting hole RJ, a one-cent sorting hole 1C, a two-euro sorting hole 2E, a fifty-cent sorting hole 50C, and a one-euro sorting hole 1E that are arranged sequentially toward the travel direction of the coin transporting device 110, i.e., in a direction away from the receiving port 104.

The arrangement of denominations for the respective coin sorting holes is one example, and therefore, denominations can be freely arranged as needed.

A gate device (not illustrated) that is actuated by an electric actuator is arranged for each of the coin sorting holes 2C, 5C, 10C, 20C, RJ, 1C, 2E, 50C, and 1E.

In Embodiment 4, the gate device for each of the coin sorting holes RJ, 1C, 2E, 50C, and 1E also serves as the guide rail 192.

That is, the guide rail 192 is constituted of a fixed guide fixed between the transfer path 204 and the coin sorting hole RJ, 1C, 2E, 50C, or 1E and an electrically moved movable guide, and normally presents one straight form. When the transported coin C is dropped in the coin sorting hole RJ, 1C, 2E, 50C, or 1E, the movable guide is moved from a normal position so that the coin C to be transferred is not guided to the movable guide and falls in a predetermined coin sorting hole (see JP Patent No. 4997374).

The gate device opposed to each of the coin sorting holes 2C, 5C, 10C, 20C, OF, RJ, 1C, 2E, 50C, or 1E is selectively opened or closed on the basis of a timing signal from a timing sensor (not illustrated), and authenticity and a denomination determined by coin information detected by the coin distinguishing device 108.

As a result, the coin C transported by the coin transporting device 110 is dropped in the predetermined the coin sorting hole 2C, 5C, 10C, 20C, OF, RJ, 1C, 2E, 50C or 1E for each denomination.

Figure 24:
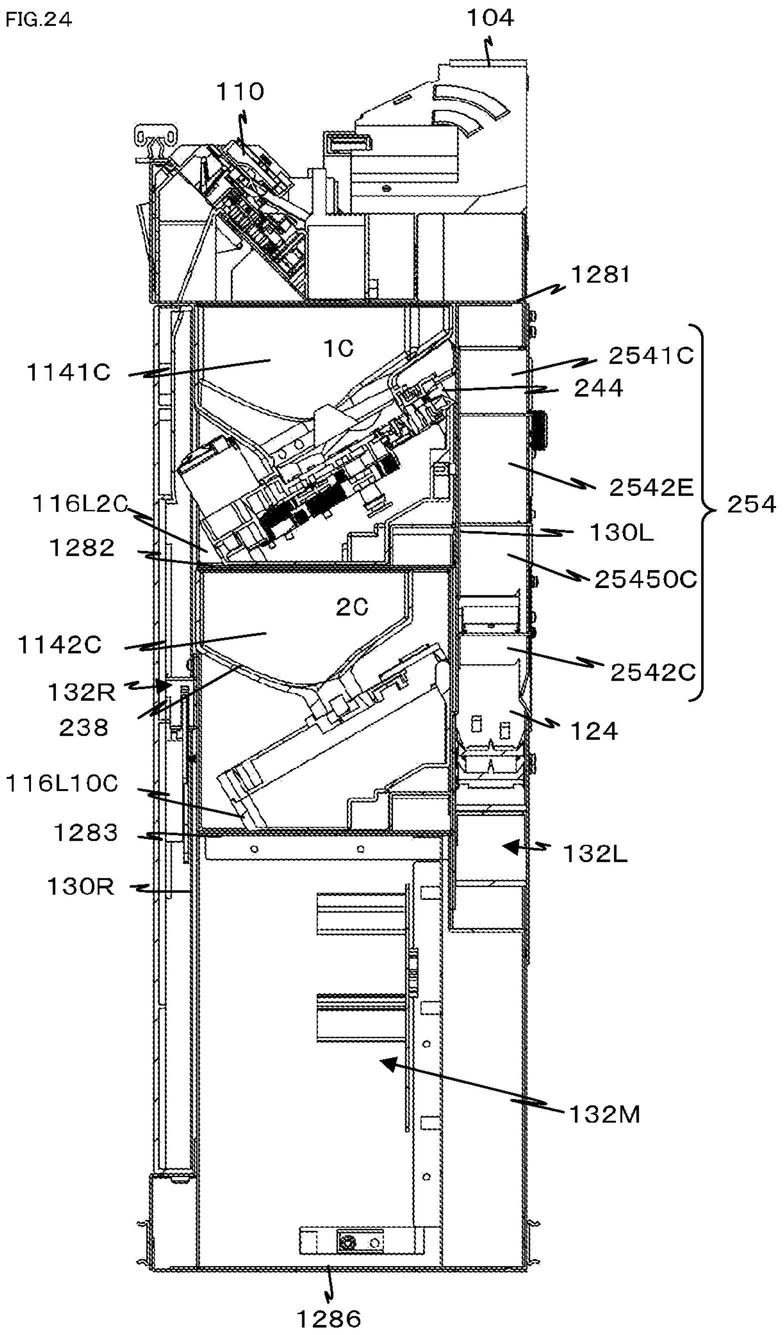
FIG. 24 is a cross-sectional view along the line A-A in FIG. 23.

Next, the denominational storing and dispensing device 114 is described mainly with reference to FIG. 24 or 25.

The denominational storing and dispensing device 114 has a function of storing, according to coin denominations, the coins C sorted for each denomination in the coin distributing device 112, and a function of paying out a predetermined number of coins C of predetermined denominations one by one in accordance with a command from high-order equipment, e.g., a POS register. In Embodiment 4, since intended denominations are eight denominations ranging from a one-cent coin to a two-euro coin, eight denominational storing and dispensing devices 114 are arranged. However, since the denominational storing and dispensing devices 114 all have the same basic configuration, the configuration of each portion is described with the same reference sign, and when explanation is particularly needed for each denomination, a denomination mark is given after the sign 114 for explanation. That is, a one-cent storing and dispensing device 1141C for one cent, a two-cent storing and dispensing device 1142C for two cents, a five-cent storing and dispensing device 1145C for five cents, a ten-cent storing and dispensing device 11410C for ten cents, a twenty-cent storing and dispensing device 11420C for twenty cents, a fifty-cent storing and dispensing device 11450C for fifty cents, a one-euro storing and dispensing device 1141E for one euro, and a two-euro storing and dispensing device 1142E for 2 euros are used.

In Embodiment 4, the denominational storing and dispensing device 114 is broadly constituted of a hopper bowl 236, a hole-equipped rotating body 238, a slide base 242, and a flick-out device (not illustrated).

The hopper bowl 236 is a vertical tubular body that is open in an upper surface and that is rectangular in an upper portion and circular in a lower portion, and stores the coins C in a bulk load state. The hole-equipped rotating body 238 is rotatably arranged in a circular hole in the bottom of the hopper bowl 236, and has a plurality of circular holes which are formed at eccentric positions and in which the coins C fall. The slide base 242 guides a lower surface of the coin C that has fallen in the hole-equipped rotating body 238. The flick-out device (not illustrated) is constituted of a snapping roller forced to approach a fixed roller arranged beside the hole-equipped rotating body 238, and is configured to catch the coin C pushed out by the hole-equipped rotating body 238 between the rollers and flick out the coin C laterally from a feeding port 244 (FIG. 24) formed beside the hole-equipped rotating body 238. A so-called coin hopper that is publicly known is preferably used as the denominational storing and dispensing device 114.

Next, arrangement of the denominational storing and dispensing devices 114 according to coin denominations is described mainly with reference to FIG. 23.

The denominational storing and dispensing devices 114 are arranged for three denominations in the upper-stage space 144U, for three denominations in the middle-stage space 144M, and for two denominations in the lower-stage space 144L. Specifically, the one-cent storing and dispensing device 1141C, the two-euro storing and dispensing device 1142E, and the fifty-cent storing and dispensing device 11450C are arranged on the upper-stage bottom plate 1282 sequentially from the receiving port 104 side, and thereby an upper-stage storing and dispensing device array 114U horizontally provided in the upper-stage space 144U is configured. The two-cent storing and dispensing device 1142C, the five-cent storing and dispensing device 1145C, and the one-euro storing and dispensing device 1141E are arranged on the middle-stage bottom plate 1283 sequentially from the receiving port 104 side, and constitute a middle-stage storing and dispensing device array 114M provided in a horizontal direction. The ten-cent storing and dispensing device 11410C and the twenty-cent storing and dispensing device 11420C are arranged on the lower-stage bottom plate 1284 sequentially from the receiving port 104 side, and constitute a lower-stage storing and dispensing device array 114L provided in a horizontal direction. The one-euro storing and dispensing device 1141E in the middle-stage space 144M and the twenty-cent storing and dispensing device 11420C in the lower-stage space 144L are arranged in the vicinity of the back plate 128B, and are aligned in an up-down direction. In other words, the one-euro storing and dispensing device 1141E in the middle-stage space 144M and the twenty-cent storing and dispensing device 11420C in the lower-stage space 144L are arranged in the middle space 132M that is the farthest from the receiving port 104, and arranged in such a way as to be stacked in a vertical direction. The five-cent storing and dispensing device 1145C in the middle-stage space 144M and the ten-cent storing and dispensing device 11410C in the lower-stage space 144L are aligned with each other in an up-down direction. In other words, the five-cent storing and dispensing device 1145C in the middle-stage space 144M and the ten-cent storing and dispensing device 11410C in the lower-stage space 144L are arranged in the middle space 132M that is second farthest from the receiving port 104, and arranged in such a way as to be stacked in a vertical direction. The fifty-cent storing and dispensing device 11450C, the two-euro storing and dispensing device 1142E, and the one-cent storing and dispensing device 1141C in the upper-stage space 144U are staggered toward the receiving port 104 side relative to the one-euro storing and dispensing device 1141E, the five-cent storing and dispensing device 1145C, and the two-cent storing and dispensing device 1142C in the middle-stage space 144M. This is because the denominational drop passage 116 is arranged between the denominational storing and dispensing device 114 and the back plate 128B.

Next, the denominational drop passage 116 is described mainly with reference to FIGS. 23 and 26.

The denominational drop passage 116 has a function of guiding the coin C, distributed by the coin distributing device 112 according to coin denominations, to the denominational storing and dispensing device 114 for each denomination. In Embodiment 4, the denominational drop passage 116 is approximately formed into a tubular shape extending in an up-down direction, and is separated into an upper drop passage 116U arranged on an upper side of the top plate 1281, and a lower drop passage 116L arranged below the top plate 1281. Thus, the denominational drop passage 116 corresponding to the one-cent sorting hole 1C, the two-euro sorting hole 2E, the fifty-cent sorting hole 50C, and the one-euro sorting hole 1E that are formed in the lower sorting portion 208 is only configured by the upper drop passage 116U on the upper side of the top plate 1281.

First, the denominational drop passage 116 for the one-cent storing and dispensing device 1141C, the two-euro storing and dispensing device 1142E, and the fifty-cent storing and dispensing device 11450C that are arranged in the upper-stage space 144U is described. As illustrated in FIG. 22, a return denominational drop passage 116RJ is formed under a return sorting hole RJ of the lower sorting portion 208 in the coin distributing device 112 closest to the receiving port 104, and guides the coin C to be returned in such a way that the coin C slips down to the dispensing port 122.

The one-cent coin C that has fallen from the one-cent sorting hole 1C being second closest to the receiving port 104 is guided to a one-cent drop passage 1161C, falls in the one-cent opening 1461C illustrated in FIG. 26, and is then stored in the one-cent storing and dispensing device 1141C arranged in the upper-stage space 144U.

The two-euro coin C that has fallen from the two-euro sorting hole 2E being third closest to the receiving port 104 is guided to a two-euro drop passage 1162E, falls in the two-euro opening 1462E illustrated in FIG. 26, and is then stored in the two-euro storing and dispensing device 1142E arranged in the upper-stage space 144U.

The fifty-cent coin C that has fallen from the fifty-cent sorting hole 50C being fourth closest to the receiving port 104 is guided to a fifty-cent drop passage 11650C, falls in the fifty-cent opening 14650C, and is then stored in the fifty-cent storing and dispensing device 11450C arranged in the upper-stage space 144U.

The one-euro coin C that has fallen from the one-euro sorting hole 1E being fifth closest to the receiving port 104 is guided to a one-euro drop passage 1161E, falls in the one-euro opening 1461E, and is then stored in the one-euro storing and dispensing device 1141E arranged at a position of the middle-stage space 144M farthest from the receiving port 104. Since the one-euro storing and dispensing device 1141E is arranged in the middle-stage space 144M, the one-euro drop passage 1161E is configured to be separated into a one-euro upper drop passage 116U1E and a one-euro lower drop passage 116L1E. The one-euro lower drop passage 116L1E is laid in parallel to an overflow safe 134 described later, in a lateral width direction of the body 126.

The denominational drop passage 116 opposed to the two-cent sorting slot 2C, the five-cent sorting hole 5C, the ten-cent sorting hole 10C, the twenty-cent sorting hole 20C, and the overflow sorting hole OF arranged in the upper sorting portion 206 is separated into the upper drop passage 116U on a side higher than the top plate 1281, and the lower drop passage 116L lower than the top plate 1281.

The two-cent coin C that has fallen from the two-cent sorting hole 2C closest to the receiving port 104 is guided to a two-cent upper drop passage 116U2C, falls in the two-cent opening 1462C, is then guided to a two-cent lower drop passage 116L2C, and stored in the two-cent storing and dispensing device 1142C arranged in the middle-stage space 144M.

The five-cent coin C that has fallen from the five-cent sorting hole 5C being second closest to the receiving port 104 is guided to a five-cent upper drop passage 116U5C, falls in the five-cent opening 1465C, is then guided to a five-cent lower drop passage 116L5C arranged in the middle-stage space 144M, and stored in the five-cent storing and dispensing device 1145C.

The ten-cent coin C that has fallen from the ten-cent sorting hole 10C being third closest to the receiving port 104 is guided to a ten-cent upper drop passage 116U10C, falls in the ten-cent opening 14610C, is then guided to a ten-cent lower drop passage 116L10C, and stored in the ten-cent storing and dispensing device 11410C arranged in the lower-stage space 144L.

The twenty-cent coin C that has fallen from the twenty-cent sorting hole 20C being fourth closest to the receiving port 104 is guided to a twenty-cent upper drop passage 116U20C, falls in the twenty-cent opening 14620C, is then guided to a twenty-cent lower drop passage 116L20C, and stored in the twenty-cent storing and dispensing device 11420C arranged in the lower-stage space 144L.

The overflow coin C that has fallen from the overflow sorting hole OF being fifth closest to the receiving port 104 is guided to an overflow upper drop passage 116UOF, falls in the overflow opening 146OF, and is then stored in the overflow safe 134 arranged in the upper-stage space 144U. The overflow coin C can also be arranged outside the cover 128.

The two-cent lower drop passage 116L2C, the five-cent lower drop passage 116L5C, the ten-cent lower drop passage 116L10C, and the twenty-cent lower drop passage 116L20C respectively have small lateral width in cross-section following the two-cent opening 1462C, the five-cent opening 1465C, the ten-cent opening 14610C, and the twenty-cent opening 14620C, are each formed into an oblong shape lengthwise in a transport direction of the coins C, and are laid in parallel in the right space 132R in a direction away from the receiving port 104. In Embodiment 4, the two-cent lower drop passage 116L2C, the five-cent lower drop passage 116L5C, the ten-cent lower drop passage 116L10C, and the twenty-cent lower drop passage 116L20C are configured integrally with the right plate 128R constituting the cover 128. Therefore, when coin jamming occurs in these passages, the coin jamming can be easily eliminated by working with the right plate 128R detached. Moreover, by configuring the denominational drop passage 116 in this way, a plurality of coin drop passages can be arranged in the same thin space in a width direction of the body, and there is an advantage that the device can be reduced in size.

As illustrated in FIG. 23, the two-cent lower drop passage 116L2C and the five-cent lower drop passage 116L5C respectively guide the coins C to the two-cent storing and dispensing device 1142C and the five-cent storing and dispensing device 1145C that are arranged in the middle-stage space 144M sequentially in a direction away from the receiving port 104, are therefore each formed into a crank shape, and each have a lower end thereof arranged in opposition to an upper end of a left (front) side end opening of the hopper bowl 236 of the corresponding storing and dispensing device.

Similarly, the ten-cent lower drop passage 116L10C and the twenty-cent lower drop passage 116L20C respectively guide the coins C to the ten-cent storing and dispensing device 11410C and the twenty-cent storing and dispensing device 11420C that are arranged in the lower-stage space 144L sequentially in a direction away from the receiving port 104, are therefore each formed into a crank shape, and each have a lower end thereof arranged in opposition to an upper end of a right (back) side end opening of the hopper bowl 236 of the corresponding storing and dispensing device. By arranging the denominational drop passage 116 in this way, bending of the denominational drop passage 116 can be reduced, and the denominational drop passage 116 in which the coins C can smoothly fall can be configured in a small space.

Figure 27:
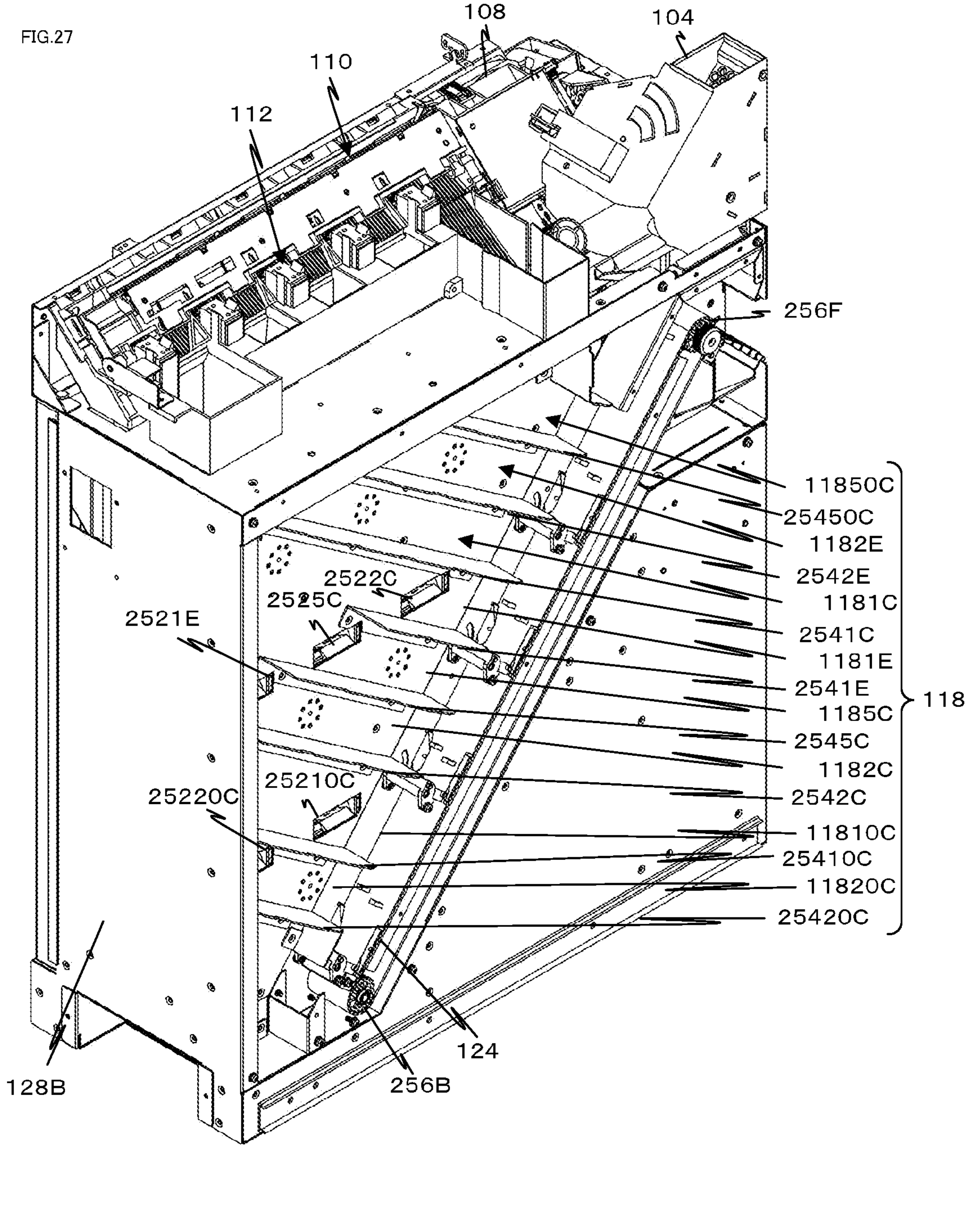
FIG. 27 is a perspective view of the coin receiving and dispensing device of Embodiment 4 according to the present invention from an upper left back direction.
Figure 28:
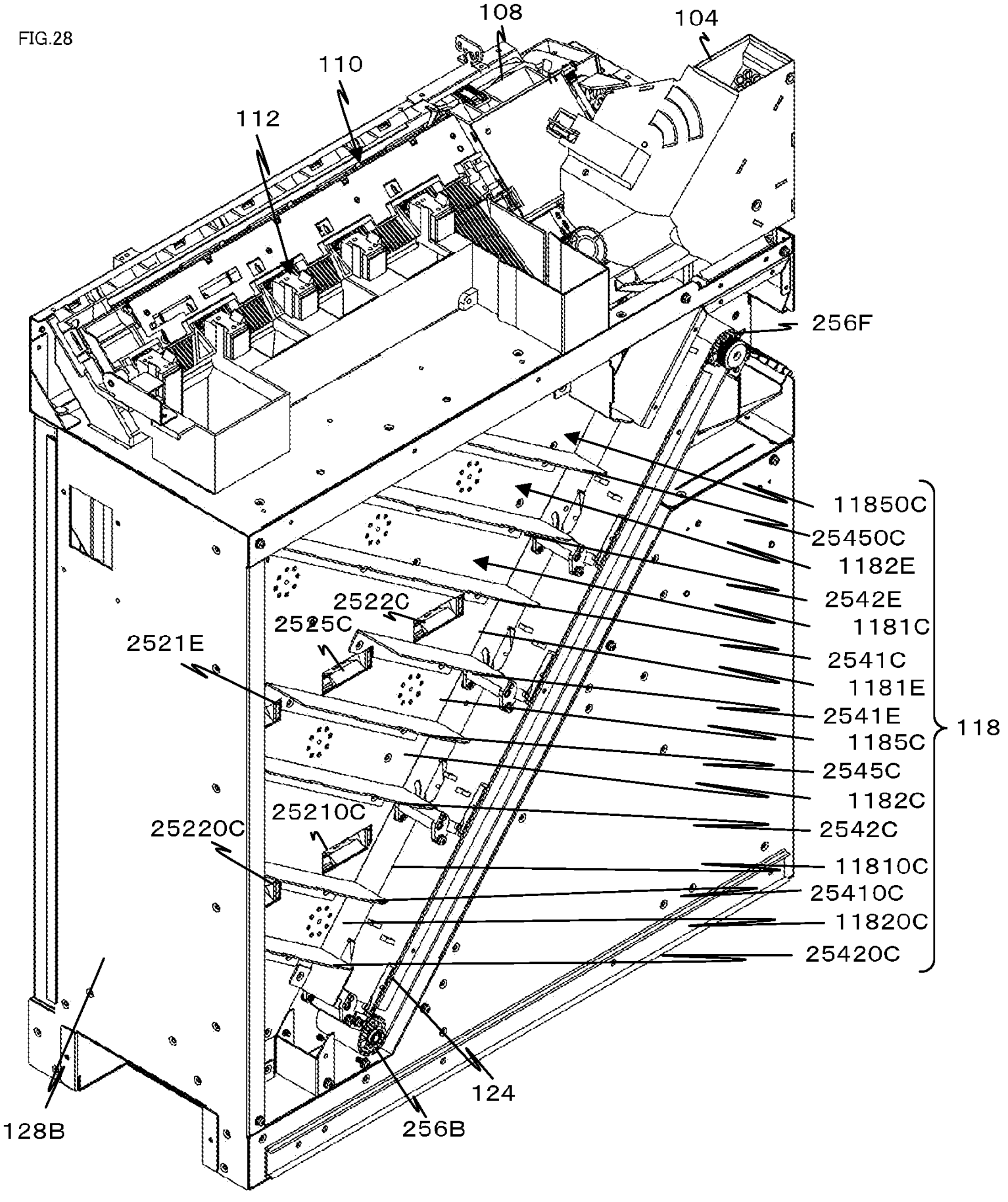
FIG. 28 is a longitudinal cross-sectional view of the coin receiving and dispensing device of Embodiment 4 according to the present invention at the same region as the vertical surface P in FIG. 1.

Next, the dispensing passage 118 is described mainly with reference to FIGS. 27 and 28.

The dispensing passage 118 has a function of dropping the coin C fed from the denominational storing and dispensing device 114 while guiding the coin C. In Embodiment 4, the dispensing passage 118 is provided in the left space 132L formed between the left plate 128L and the inner left wall plate 130L, as illustrated in FIGS. 24 and 25. In the inner left wall plate 130L constituting the dispensing passage 118, a plurality of laterally long oblong denominational drop ports 252, where the coins C fed from the denominational storing and dispensing device 114 pass through, are formed. In Embodiment 4, since the denominational storing and dispensing devices 114 are arranged on three stages, the denominational drop ports 252 are also formed to be separated into three stages and laid in parallel in a horizontal direction.

As illustrated in FIG. 28, a one-cent drop port 2521C, a two-euro drop port 2522E, and a fifty-cent drop port 25250C are horizontally formed along the coin transporting device 110 sequentially from the receiving port 104 side to correspond to the upper-stage storing and dispensing device array 114U, and constitute an upper-stage drop port array 252U.

A two-cent drop port 2522C, a five-cent drop port 2525C, and a one-euro drop port 2521E are horizontally formed along the coin lifting device 100 sequentially from the receiving port 104 side to correspond to the middle-stage storing and dispensing device array 114M, and constitute a middle-stage drop port array 252M.

A ten-cent drop port 25210C and a twenty-cent drop port 25220C are horizontally formed along the coin transporting device 110 sequentially from the receiving port 104 side to correspond to the lower-stage storing and dispensing device array 114L, and constitute a lower-stage drop port array 252L. In these drop ports 252 as well, the middle-stage drop port array 252M and the lower-stage drop port array 252L are aligned with each other in an up-down direction, as in the arrangement of the denominational storing and dispensing devices 114. The middle-stage drop port array 252M and the upper-stage drop port array 252U are arranged so as to be staggered in a front-back (depth) direction.

In a left space 132L, a guide plate 254 is arranged below each denominational drop port 252, and the dispensing passage 118 is formed for each denomination. A one-cent inclined plate 2541C, a two-euro inclined plate 2542E, and a fifty-cent inclined plate 25450C that are flat-plate-shaped are arranged for an upper-stage drop port array 252U. Specifically, the one-cent inclined plate 2541C has an upper end thereof arranged between a one-cent drop port 2521C and a two-euro drop port 2522E, and then arranged forwardly downward toward a lifting passage 266 on a dispensing port 122 side.

Similarly, the two-euro inclined plate 2542E has an upper end thereof arranged between the two-euro drop port 2522E and a fifty-cent drop port 25250C, and then arranged forwardly downward toward the lifting passage 266.

Similarly, the fifty-cent inclined plate 25450C has an upper end thereof arranged immediately under the fifty-cent drop port 25250C, and then arranged forwardly downward toward the lifting passage 266.

Accordingly, a one-cent dispensing passage 1181C is formed on an upper side of the one-cent inclined plate 2541C, a two-euro dispensing passage 1182E is formed on an upper side of the two-euro inclined plate 2542E, a fifty-cent dispensing passage 11850C is formed on an upper side of the fifty-cent inclined plate 25450C, and these dispensing passages 118 are formed forwardly downward toward the coin lifting device 100.

A two-cent inclined plate 2542C, a five-cent inclined plate 2545C, and a one-euro inclined plate 2541E that are flat-plate-shaped are arranged for a middle-stage drop port array 252M. Specifically, the two-cent inclined plate 2542C has an upper end thereof arranged between a two-cent drop port 2522C and a five-cent drop port 2525C, and then arranged forwardly downward toward the lifting passage 266.

Similarly, the five-cent inclined plate 2545C has an upper end thereof arranged between the five-cent drop port 2525C and a one-euro drop port 2521E, and then arranged forwardly downward toward the lifting passage 266.

Similarly, the one-euro inclined plate 2541E has an upper end thereof arranged immediately under the one-euro drop port 2521E, and then arranged forwardly downward toward the lifting passage 266.

Accordingly, a two-cent dispensing passage 1182C is formed on an upper side of the two-cent inclined plate 2542C, a five-cent dispensing passage 1185C is formed on an upper side of the five-cent inclined plate 2545C, a one-euro dispensing passage 1181E is formed on an upper side of the one-euro inclined plate 2541E, and these dispensing passages 118 are formed forwardly downward toward the coin lifting device 100.

A ten-cent inclined plate 25410C and a twenty-cent inclined plate 25420C that are flat-plate-shaped are arranged for a lower-stage drop port array 252L. Specifically, the ten-cent inclined plate 25410C has an upper end thereof arranged between a ten-cent drop port 25210C and a twenty-cent drop port 25220C, and then arranged forwardly downward toward the lifting passage 266.

Similarly, the twenty-cent inclined plate 25420C has an upper end thereof arranged immediately under the twenty-cent drop port 25220C, and then arranged forwardly downward toward the lifting passage 266.

Accordingly, a ten-cent dispensing passage 11810C is formed on an upper side of the ten-cent inclined plate 25410C, a twenty-cent dispensing passage 11820C is formed on an upper side of the twenty-cent inclined plate 25420C, and these dispensing passages 118 are formed forwardly downward toward the coin lifting device 100.

As apparent from the configuration described above, the coins C fed from the denominational storing and dispensing device 114 each fall in the denominational dispensing passage 118 from the denominational drop port 252, then fall on the denominational inclined plate 254, slip down the denominational inclined plate 254, and are transported by the coin lifting device 100 to the dispensing port 122 side being a subsequent process.

As apparent from the above description, the one-cent dispensing passage 1181C, the two-euro dispensing passage 1182E, the fifty-cent dispensing passage 11850C, the two-cent dispensing passage 1182C, the five-cent dispensing passage 1185C, the one-euro dispensing passage 1181E, the ten-cent dispensing passage 11810C, and the twenty-cent dispensing passage 11820C are arranged in a state of being stacked in an up-down direction in the left space 132L. This configuration enables the size of the body 126 in a width direction to be suppressed, and contributes to the reduction of the size of the body 126 in a width direction. The width of the dispensing passage 118 (the interval between the left plate 128L and the inner left wall plate 130L) is preferably about twice the diameter of a largest-diameter coin. In Embodiment 4, the largest diameter is 25.75 mm of a two-euro coin and is therefore preferably about 50 mm which is twice larger.

Next, the action of the dispensing passage 118 is described.

In Embodiment 4, the dispensing passage 118 is provided for each denominational storing and dispensing device 114. Therefore, a twenty-cent coin fed from the twenty-cent storing and dispensing device 11420C of the lower-stage storing and dispensing device array 114L falls in the twenty-cent dispensing passage 11820C through the twenty-cent drop port 25220C, slips down the twenty-cent inclined plate 25420C, and then falls on the upward transport belt 124 constituting a bottom surface of the lifting passage 266. A ten-cent coin fed from the ten-cent storing and dispensing device 11410C of the lower-stage storing and dispensing device array 114L falls in the ten-cent dispensing passage 11810C through the ten-cent drop port 25210C, slips down the ten-cent inclined plate 25410C, and then falls on the upward transport belt 124. A one-euro coin fed from the one-euro storing and dispensing device 1141E of the middle-stage storing and dispensing device array 114M falls in the one-euro dispensing passage 1181E through the one-euro drop port 2521E, slips down the one-euro inclined plate 2541E, and then falls on the upward transport belt 124. A five-cent coin fed from the five-cent storing and dispensing device 1145C of the middle-stage storing and dispensing device array 114M falls in the five-cent dispensing passage 1185C through the five-cent drop port 2525C, slips down the five-cent inclined plate 2545C, and then falls on the upward transport belt 124. A two-cent coin fed from the two-cent storing and dispensing device 1142C of the middle-stage storing and dispensing device array 114M falls in the two-cent dispensing passage 1182C through the two-cent drop port 2522C, slips down the two-cent inclined plate 2542C, and then falls on the upward transport belt 124. A fifty-cent coin fed from the fifty-cent storing and dispensing device 11450C of the upper-stage storing and dispensing device array 114U falls in the fifty-cent dispensing passage 11850C through the fifty-cent drop port 25250C, slips down the fifty-cent inclined plate 25450C, and then falls on the upward transport belt 124. A two-euro coin fed from the two-euro storing and dispensing device 1142E of the upper-stage storing and dispensing device array 114U falls in the two-euro dispensing passage 1182E through the two-euro drop port 2522E, slips down the two-euro inclined plate 2542E, and then falls on the upward transport belt 124. A one-cent coin fed from the one-cent storing and dispensing device 1141C of the upper-stage storing and dispensing device array 114U falls in the one-cent dispensing passage 1181C through the one-cent drop port 2521C, slips down the one-cent inclined plate 2541C, and then falls on the upward transport belt 124. Instead of configuring the dispensing passage 118 for each of the denominational storing and dispensing devices 114, one dispensing passage 118 can be provided for the plurality of denominational storing and dispensing devices 114. For example, the dispensing passage 118 can be provided for each of the upper-stage storing and dispensing device array 114U, the middle-stage storing and dispensing device array 114M, and the lower-stage storing and dispensing device array 114L.

Next, the coin lifting device 100 is described.

The coin lifting device 100 has a function of lifting the coin C that has fallen from the dispensing passage 118 to a subsequent process existing above, and in the present invention, particularly has a function of lifting a coin that has fallen from a predetermined dispensing passage 118 while preventing the coin from falling to a dispensing passage 118 side located below. In Embodiment 4, the coin lifting device 100 includes at least a transporting device 262 and a drop preventing device 264.

First, the transporting device 262 is described.

The transporting device 262 has a function of transporting the coin C to a subsequent process obliquely upward. In Embodiment 4, the transporting device 262 includes the upward transport belt 124, a pair of lifting rollers 256F and 256B, and the lifting passage 266.

Next, the upward transport belt 124 is described mainly with reference to FIGS. 27 and 28.

Figure 30:
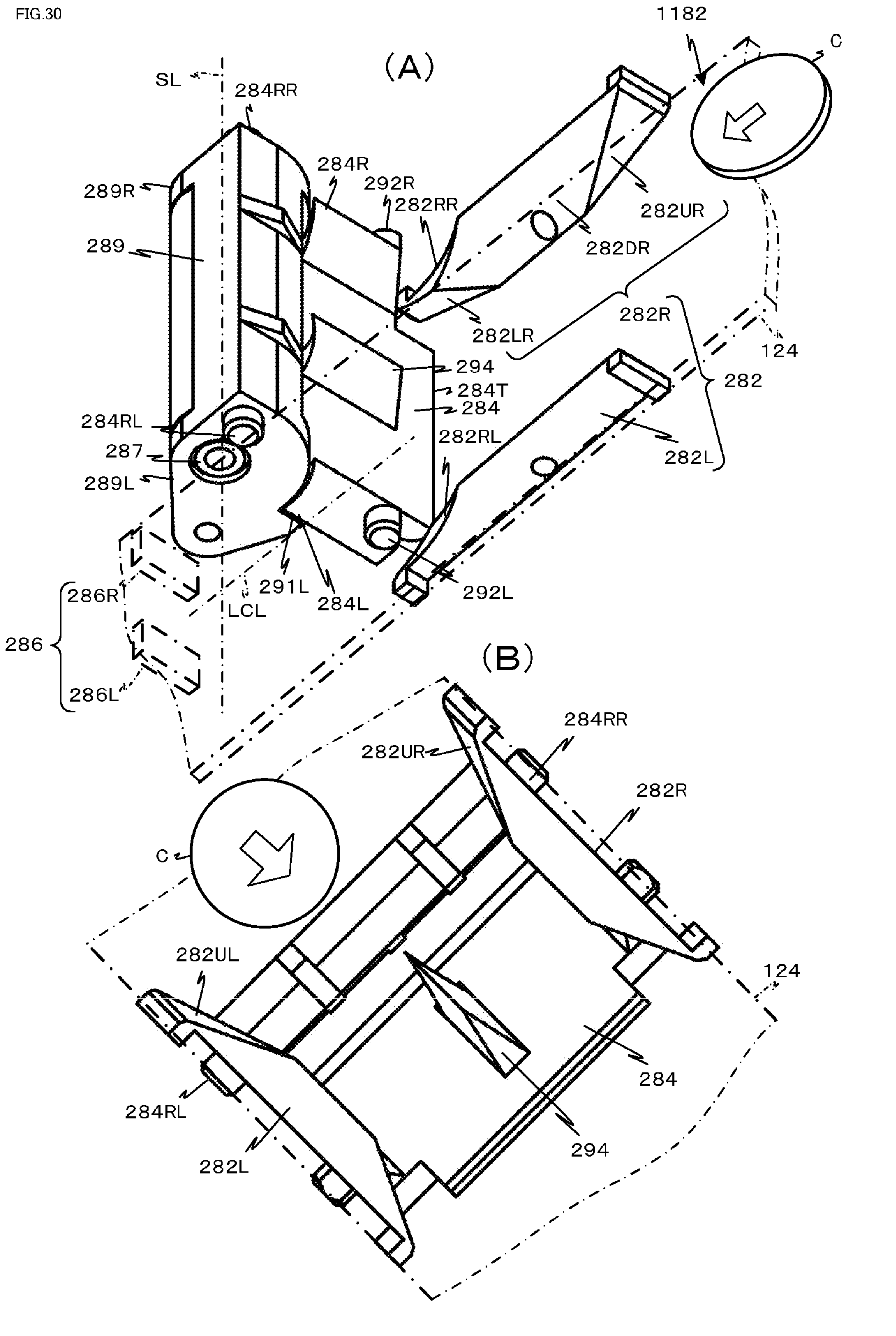
FIG. 30 is an enlarged view of the coin drop preventing device of the coin receiving and dispensing device of Embodiment 4 according to the present invention, in which (A) is a perspective view from an upper left direction, and (B) is a perspective view from a lower right direction.

The upward transport belt 124 has a function of transporting, to the dispensing port 122 being a subsequent process and located above, the coin C that has been fed from the plurality of denominational storing and dispensing devices 114 and has fallen from the dispensing passage 118 (the one-cent dispensing passage 1181C, the two-euro dispensing passage 1182E, the fifty-cent dispensing passage 11850C, the two-cent dispensing passage 1182C, the five-cent dispensing passage 1185C, the one-euro dispensing passage 1181E, the ten-cent dispensing passage 11810C, and the twenty-cent dispensing passage 11820C). In Embodiment 4, the upward transport belt 124 is wound around between the front lifting roller 256F and the back lifting roller 256B constituting a pair of lifting rollers 256, to present a flat track field shape, and arranged and inclined upward toward the dispensing port 122 side. Specifically, the back lifting roller 256B is arranged lower than the twenty-cent inclined plate 25420C and slightly closer to a front side, and the front lifting roller 256F is arranged higher than the front-side dispensing port 122 at approximately the same height as the upper-stage drop port array 252U in an up-down direction. Thus, a transport portion 258 of the upward transport belt 124 extends below the lower ends of the respective inclined plates 254, in a state of being the same distance away from these lower ends and linearly inclined upward toward a front side (the dispensing port 122 side). From the perspective of an installation area and a transporting capability of the coins C, this upward inclination is preferably 45 degrees or more, more preferably, approximately 60 degrees relative to a horizontal line. However, an upward inclination angle of the upward transport belt 124 toward the dispensing port 122 side can be suitably set in consideration of the influence on the size in a depth direction of the coin receiving and dispensing device 102. The transport portion 258 of the upward transport belt 124 frictionally contacts the coin C and transports the coin C obliquely upward, and is therefore preferably made of a material that is high in frictional coefficient and abundantly wear resistant, e.g., a rubber-base material. Moreover, in order to increase the frictional coefficient, the transport portion 258 can have a shark-skin-like surface, a surface in which a large number of minute protrusions are formed, or the like. As illustrated in FIG. 30, the upward transport belt 124 has a longitudinal center line LCL that is a straight line connecting middle points of a width direction of the upward transport belt 124 (the transport portion 258).

Next, the lifting passage 266 is described with reference to FIGS. 27 and 28.

The lifting passage 266 has a function of guiding the coin C transported by the upward transport belt 124. In Embodiment 4, the upward transport belt 124 (flat belt) constitutes a bottom surface, and a left guide wall 264L and a right guide wall 264R constitute left and right guide surfaces 264. In other words, the lifting passage 266 is configured, with the transport portion 258 of the upward transport belt 124 as a bottom surface and with the left guide wall 264L and the right guide wall 264R that are vertical relative to the bottom surface, into a quadrangular groove shape having an elongated rectangular cross-section and extending obliquely upward toward the dispensing port 122 being a subsequent process. The left guide wall 264L and the right guide wall 264R are smoothed as a whole in such a way that the coin C transported by the upward transport belt 124 is locked or the falling coin C is not locked. The drop preventing device 264 is arranged in the lifting passage 266. A first lifting passage 2661 is on a side higher than a first drop preventing device 2641 described later (the dispensing port 122 side), a second lifting passage 2662 is between the first drop preventing device 2641 and a second drop preventing device 2642, a third lifting passage 2663 is between the second drop preventing device 2642 and a third drop preventing device 2643, and a fourth lifting passage 2664 is between the third drop preventing device 2643 and a fourth drop preventing device 2644. Therefore, not falling in the lifting passage 266 below means that the lifting passage 266 is the second lifting passage 2662 in the case of the first lifting passage 2661, the third lifting passage 2663 in the case of the second lifting passage 2662, the fourth lifting passage 2664 in the case of the third lifting passage 2663, and the side below the fourth lifting passage 2664 in the case of the fourth lifting passage 2664.

Figure 29:
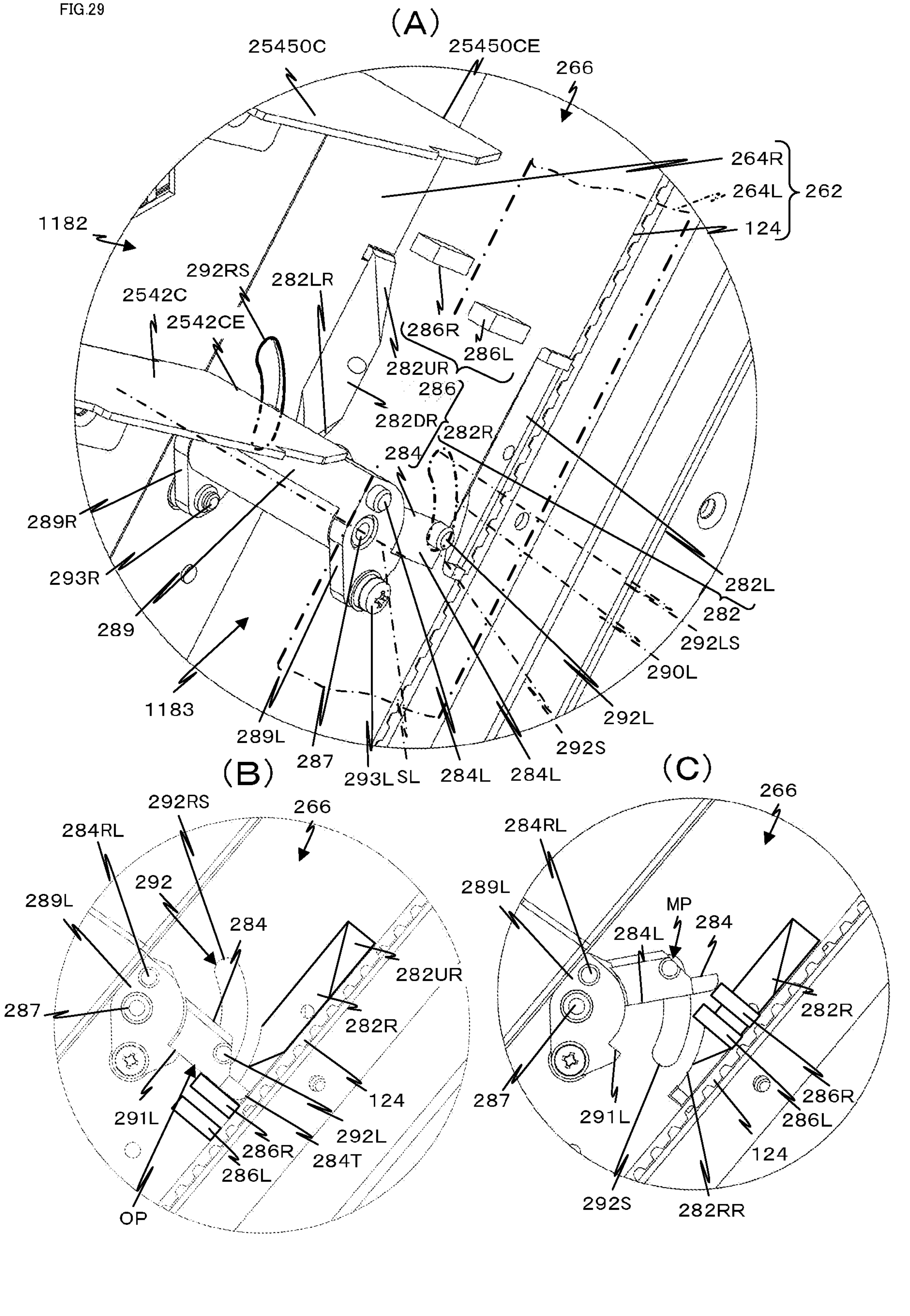
FIG. 29 is an enlarged view of a coin drop preventing device of the coin receiving and dispensing device of Embodiment 4 according to the present invention, in which (A) is a perspective view, (B) is an explanatory view at locking, and (C) is an explanatory view at flip-up.

Next, the drop preventing device 264 is described mainly with reference to FIGS. 28 to 30.

The drop preventing device 264 has a function of preventing the coin C on the upward transport belt 124 from falling to the lifting passage 266 lower than the drop preventing device 264, and of flipping up the coin C toward a subsequent process (the dispensing port 122) side of the lifting passage 266. In other words, the drop preventing device 264 has a function of flipping up, toward a longitudinal downstream side of the upward transport belt 124, the coin C that has been prevented from falling. Therefore, other devices having the same function can be deployed. In Embodiment 4, a total of four sets of drop preventing devices 264 are arranged. Specifically, the first drop preventing device 2641 is arranged in opposition to a lower end 2542EE of the two-euro inclined plate 2542E, the second drop preventing device 2642 is arranged in opposition to a lower end 2542CE of the two-cent inclined plate 2542C, the third drop preventing device 2643 is arranged in opposition to a lower end 2541EE of the one-euro inclined plate 2541E, and the fourth drop preventing device 2644 is arranged in opposition to a lower end 25420CE of the twenty-cent inclined plate 25420C. Since the first drop preventing device 2641, the second drop preventing device 2642, the third drop preventing device 2643, and the fourth drop preventing device 2644 in Embodiment 4 all have the same configuration, the second drop preventing device 2642 surrounded by a chain-line circle in FIG. 28 is described as a representative, and the description of the same sections of the other drop preventing devices is omitted by assigning the same reference signs to these sections.

The second drop preventing device 2642 is constituted of a guide device 282, a drop preventing body 284, and a protrusion 286. To summarize the function of each component, the coin C falling on the upward transport belt 124 is guided to a front surface side of the drop preventing body 284 by the guide device 282, and flipped up toward the longitudinal downstream side of the upward transport belt 124 by the drop preventing body 284 that is revolved toward a subsequent process side by the protrusion 286 moved integrally with the upward transport belt 124. In other words, the coins C are flipped up toward the dispensing port 122 side being a subsequent process, dispersed on the upward transport belt 124, and thereby easily locked by the protrusion 286.

First, the guide device 282 is described mainly with reference to FIGS. 29 and 30.

The guide device 282 has a function of guiding the coin C falling on the upward transport belt 124 in the lifting passage 266 or from the dispensing passage 118, toward a middle side of a front surface of the drop preventing body 284, i.e., to the middle of the width direction of the upward transport belt 124 on the longitudinal downstream side.

Since the guide device 282 is a pair of left and right rod-shaped guide bodies arranged along a longitudinal end of the upward transport belt 124 on a second dispensing passage 1182 side that is an upper side of the longitudinal end of the upward transport belt 124, and is symmetrically formed, a right guide device 282R is described as a representative, and the description of the same component of the left guide wall 264L is omitted by changing right to left in the name and giving a reference sign with the same number and having the alphabet L in place of R.

A cross-section (a cross-section in a width direction of the upward transport belt 124) of an intermediate portion of the right guide body 282R has an approximately right-triangle elongated rod-shape. In the right guide body 282R, a right inclined surface toward middle 282UR sequentially approaching a middle side of the upward transport belt 124 is formed at an upper-side end, a left downward inclined surface 282DR sequentially approaching an upper surface (the transport portion 258) of the upward transport belt 124 is formed in an intermediate portion, and a left separating inclined surface 282LR sequentially separating from the middle of the upward transport belt 124 to an end thereof is formed at a lower end. An upper side of the left separating inclined surface 282LR is formed on an arc-shaped left clearance surface 282RR. With this configuration, the coin C falling on the upward transport belt 124 is brought toward the middle in a width direction of the upward transport belt 124 by the right inclined surface toward middle 282UR and a left inclined surface toward middle 282UL (not seen), and the coin C falling from above the upward transport belt 124 is guided to the middle of the upward transport belt 124 by the right downward inclined surface 282DR and a left downward inclined surface 282DL (not seen) in a similar way, thereby guiding the coin C falling from an upper side, toward the middle of the drop preventing body 284 on the longitudinal downstream side of the upward transport belt 124.

Next, the drop preventing body 284 is described.

The drop preventing body 284 has a function of keeping the coin C that has fallen while being guided by the guide device 282 or by the right guide wall 264R or the left guide wall 264L from falling on the lifting passage 266 below, i.e., falling in the lifting passage 266 on a side lower than the drop preventing body 284, and flipping up the coin C toward the longitudinal downstream side of the upward transport belt 124, i.e., toward the dispensing port 122 being a subsequent process. The drop preventing body 284 in Embodiment 4 has an approximately square plate shape, and an upper end of the drop preventing body 284 is mounted, revolvably on a support shaft 287 having left and right ends thereof fixed, to a right support body 289R arranged on a lateral side of a right end 284R (not seen) of the drop preventing body 284, and a left support body 289L arranged on a lateral side of a left end 284L, in a gate-shaped support body 289.

When looked down from above, an axis line SL of the support shaft 287 is arranged so as to intersect at right angles the longitudinal center line LCL of the upward transport belt 124, above a transport surface (a surface on which the coin C falling from the tip of each of the inclined plates 254 is rested) of the upward transport belt 124. A right preventing stopper 291R (not seen) and a left preventing stopper 291L that are step portions are respectively formed on subsequent process sides of the right support body 289R and the left support body 289L, contact a back surface of the drop preventing body 284, and are configured to limit the revolution of the drop preventing body 284 in a clockwise direction in FIG. 29. In other words, the drop preventing body 284 is revolved in a clockwise direction in FIG. 29 by a revolution torque resulting from its own weight, prevented from revolving by the right preventing stopper 291R (not seen) and the left preventing stopper 291L, and arrested approximately at an arrest position OP where the drop preventing body 284 becomes vertical relative to a transport surface of the upward transport belt 124. A clearance between a drop preventing body lower end 284T of the drop preventing body 284 and the upward transport belt 124 is set to be substantially narrower than the thinnest coin C at the arrest position OP. In other words, this is intended to keep the thinnest coin C from falling in the dispensing passage 118 below through the clearance between the drop preventing body lower end 284T and the upward transport belt 124 in a state where a plane of the thinnest coin C is in surface contact with the transport surface of the upward transport belt 124. A right convex portion 292R and a left convex portion 292L are columnar, and laterally protrude from lower-end side surfaces of the right end 284R and the left end 284L of the drop preventing body 284. The right convex portion 292R is inserted in a right arc groove 290R formed in the right guide wall 264R, and the left convex portion 292L is inserted in a left arc groove 290L formed in the left guide wall 264L (not seen). The right convex portion 292R and the left convex portion 292L of the drop preventing body 284 are configured to be locked to a right revolution limit stopper 292RS and a left revolution limit stopper 292LS being regulating portions 292 that respectively regulate the degree of revolution of the right convex portion 292R and the left convex portion 292L in a counterclockwise direction in FIG. 29 (B) and (C). The drop preventing body lower end 284T is set to be located slightly higher than an upper end of the protrusion 286 so that the protrusion 286 can pass under the drop preventing body lower end 284T when the right convex portion 292R and the left convex portion 292L are respectively locked by the right revolution limit stopper 292RS and the left revolution limit stopper 292LS. However, an interval between the drop preventing body lower end 284T and the upper end of the protrusion 286 has only to be determined so that the thinnest coin does not fall in the lifting passage 266 below from between the drop preventing body lower end 284T and the upper end of the protrusion 286. In other words, an interval between the drop preventing body lower end 284T and the upper end of the protrusion 286 is set to be smaller than the thickness of the thinnest coin C.

A left positioning protrusion 284RL and a right positioning protrusion 284RR that protrude laterally from an upper-end side surface of the support body 289 are tightly inserted in positioning holes (not illustrated) that are respectively pierced in the right guide wall 264R and the left guide wall 264L, and are used to position the support body 289, therefore, the drop preventing body 284. The support bodies 289 are respectively fixed to the right guide wall 264R and the left guide wall 264L by a left fixing screw 293L and a right fixing screw 293R threaded through through-holes (not illustrated) formed in the right guide wall 264R and the left guide wall 264L that define the lifting passage 266.

As illustrated in FIG. 30, a protrusion, specifically, a thrust body 294 having a triangular cross-section is protrusively provided in the middle of a front surface of the drop preventing body 284 on the dispensing port 122 side being a subsequent process. After the thrust body 294 plunges into a dense cluster of the coins C and thereby breaks down the dense cluster, the coins C are flipped up by the drop preventing body 284, and can therefore be effectively flipped up.

The drop preventing body 284 normally revolves in a clockwise direction in FIG. 29 (B) by its own weight, has a back surface thereof that is prevented from revolving by the right preventing stopper 291R (not seen) and the left preventing stopper 291L, and is static at the arrest position OP. Accordingly, the coin C falling in the lifting passage 266 is prevented from falling by the drop preventing body 284, and does not fall in the lifting passage 266 below.

Next, the protrusion 286 is described mainly with reference to FIGS. 29 and 30.

The protrusion 286 has a function of pushing the drop preventing body 284 and forcibly revolving the drop preventing body 284 around the support shaft 287. In Embodiment 4, the protrusion 286 has a quadrangular plate shape protrusively formed at right angles relative to the upper surface of the upward transport belt 124, is a pair of small pieces composed of a right protrusion 286R and a left protrusion 286L that have a predetermined space in between in a width direction of the upward transport belt 124 and that are formed to be slightly staggered in a longitudinal direction of the upward transport belt 124, and is integrally formed of the same material as the upward transport belt 124. With this configuration, the protrusion 286 pushes the drop preventing body 284 from a back surface side (an upstream side relative to a longitudinal direction of the upward transport belt 124) at a predetermined speed by movement of the upward transport belt 124 in a transport direction of the coins C. Thus, as illustrated in FIG. 29 (C), the drop preventing body 284 is revolved on the support shaft 287 toward the dispensing port 122 side being a subsequent process. In other words, the coin C that is prevented by the drop preventing body 284 from falling is flipped up toward the dispensing port 122 side obliquely upward in the lifting passage 266 by the revolution of the drop preventing body 284 toward the dispensing port 122 side, and then falls onto the upward transport belt 124. Therefore, the coins C that are prevented by the drop preventing body 284 from moving are dispersed by being flipped up, and then fall onto the upward transport belt 124. It becomes easy for each of the coins C to be locked to the protrusion 286 by being dispersed, and the transport efficiency of the coins C increases. Moreover, the right protrusion 286R and the left protrusion 286L are arranged so as to be slightly staggered in a longitudinal direction of the upward transport belt 124, whereby the time in which the drop preventing body 284 is revolved toward the dispensing port 122 side becomes longer, so that it becomes easy to lock the coin C by the right protrusion 286R and the left protrusion 286L. The degree of revolution of the drop preventing body 284 toward the dispensing port 122 side is limited by respectively locking the right convex portion 292R and the left convex portion 292L to the right revolution limit stopper 292RS and the left revolution limit stopper 292LS. At a maximum movement position MP of the drop preventing body 284, a clearance between the drop preventing body lower end 284T and the right protrusion 286R as well as the left protrusion 286L is narrower than the thickness of the thinnest coin, and the coin C therefore cannot pass through the clearance. Therefore, since a downward movement of the coin C is prevented by the drop preventing body 284, the right protrusion 286R, and the left protrusion 286L, the coin C does not fall in the lifting passage 266 below. The right protrusion 286R and the left protrusion 286L can be integrated, which, however, increases the thickness of the protrusion 286, and it is therefore preferable to split the protrusion 286 as in Embodiment 4.

As described above, the drop preventing device 264 does not drop, to the lifting passage 266 below, the coin C that has fallen from the dispensing passage 118. Specifically, the coin C that has fallen on the upward transport belt 124 from the twenty-cent dispensing passage 11820C or the ten-cent dispensing passage 11810C is prevented from falling from the fourth lifting passage 2664 by the fourth drop preventing device 2644.

The coin C that has fallen on the upward transport belt 124 from the one-euro dispensing passage 1181E or the five-cent dispensing passage 1185C is prevented from falling from the third lifting passage 2663 to the fourth lifting passage 2664 by the third drop preventing device 2643.

The coin C that has fallen on the upward transport belt 124 from the two-cent dispensing passage 1182C or the fifty-cent dispensing passage 11850C is prevented from falling from the second lifting passage 2662 to the third lifting passage 2663 by the second drop preventing device 2642.

The coin C that has fallen on the upward transport belt 124 from the two-euro dispensing passage 1182E or the one-cent dispensing passage 1181C is prevented from falling from the first lifting passage 2661 to the second lifting passage 2662 by the first drop preventing device 2641.

The coin C on the upward transport belt 124 is locked to the right protrusion 286R or the left protrusion 286L and transported in the lifting passage 266 toward the dispensing port 122 obliquely upward.

Next, the dispensing port 122 is described mainly with reference to FIG. 29.

The dispensing port 122 is a subsequent process of the coin lifting device 100, and has a function of dispensing the coin C, transported by the upward transport belt 124, to an external device in order to deliver the coin C, or storing the coin C in the body 126, where a publicly known dispensing port 122 is used. In Embodiment 4, the dispensing port 122 is a rectangular opening formed closer to a left side at the intermediate position of a front surface of the body 126 in an up-down direction. In Embodiment 4, a downward dispensing port passage 272 is configured toward the dispensing port 122 following the lifting passage 266 opposed to the upward transport belt 124, the dispensing port 122 is further configured at an end of the dispensing port passage 272, and the coin C is supplied to an external reception from the dispensing port 122.

Next, the action of the coin lifting device 100 in Embodiment 4 is described.

When coins are dispensed in change or exchange processing or the like, the number of the coins C fed from each of the denominational storing and dispensing devices 114 is not so large. For example, in change processing, when a product of one cent is purchased with a five-euro bill, the change is four euros and nine cents. When this change is paid out, two coins C are fed from the two-euro storing and dispensing device 1142E, one coin C is fed from the five-cent storing and dispensing device 1145C, and two coins C are fed from the two-cent storing and dispensing device 1142C. The fed two-euro coin falls in the two-euro dispensing passage 1182E by its own weight, falls on the two-euro inclined plate 2542E, then slips down the two-euro inclined plate 2542E, and then falls in the first lifting passage 2661. The fed five-cent coin C falls in the five-cent dispensing passage 1185C by its own weight, falls on the five-cent inclined plate 2545C, and then falls in the third lifting passage 2663. The fed two-cent coin C falls in the two-cent dispensing passage 1182C by its own weight, falls on the two-cent inclined plate 2542C, and then falls in the second lifting passage 2662. Each of the coins C that has fallen in each of the lifting passages 266 is locked to the protrusion 286 on the upward transport belt 124 and dispensed to the dispensing port 122. The coin C that is not locked to the protrusion 286 is prevented from falling by each of the drop preventing bodies 284, and stored in the lifting passage 266 where the coin C has fallen. The drop preventing body 284 is revolved by the protrusion 286 toward the dispensing port 122 (the longitudinal downstream side of the upward transport belt 124) side being a subsequent process. Due to this revolution, the coin C that has been prevented from falling is flipped up toward the dispensing port 122 side, again falls on the upward transport belt 124, is locked to the protrusion 286, and fed toward the dispensing port 122 side. This operation is repeated, and all the coins C are fed toward the dispensing port 122 side in the end.

The action in the case where all the coins C are collected from each of the denominational storing and dispensing devices 114 is described.

The coins C are simultaneously fed from each of the denominational storing and dispensing devices 114. Accordingly, the coins C exceed the dispensing and transporting capability of the upward transport belt 124, and remain in the one-cent dispensing passage 1181C, the two-euro dispensing passage 1182E, the fifty-cent dispensing passage 11850C, the two-cent dispensing passage 1182C, the five-cent dispensing passage 1185C, the one-euro dispensing passage 1181E, the ten-cent dispensing passage 11810C, or the twenty-cent dispensing passage 11820C. In this case, the coins C remain above the inclined plate 254 constituting each of the dispensing passages 118, so that as the coins C are sequentially transported by the upward transport belt 124, these remaining coins C are transported by the upward transport belt 124 after slowly slipping down the inclined plate 254. The coins C that are prevented by the first drop preventing device 2641 to the fourth drop preventing device 2644 from falling are flipped up toward the dispensing port 122 side by the drop preventing body 284 that is pushed by the protrusion 286, as described above, and are dispersed on the upward transport belt 124. Consequently, it becomes easy for the coins C to be locked to the protrusion 286, and the coins C are smoothly transported toward the dispensing port 122 side.

The invention claimed is:

1. A coin lifting device that drops coins, fed from a plurality of denominational storing and dispensing devices arrayed in a horizontal direction, onto an upward transport belt inclined forwardly upward toward a subsequent process side, and feeds the coins toward the subsequent process by running of the upward transport belt, the coin lifting device comprising:

at least a drop preventing body having, above the upward transport belt, an upper end being revolvable around an axis line extending approximately in a direction orthogonal to a longitudinal center line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

2. The coin lifting device according to claim 1, further comprising a regulation portion that regulates revolution of the drop preventing body toward the longitudinal downstream side of the upward transport belt.

3. The coin lifting device according to claim 1, wherein the drop preventing body has a thrust body formed in a middle portion of the upward transport belt on the longitudinal downstream side, the thrust body protruding toward the longitudinal downstream side of the upward transport belt.

4. The coin lifting device according to claim 1, wherein a plurality of the protrusions are provided, and arranged so as to be staggered in a width direction and a longitudinal direction of the upward transport belt.

5. The coin lifting device according to claim 1, wherein a right guide wall and a left guide wall that are each vertical relative to the upward transport belt are arranged on a right side and a left side along the upward transport belt, a right downwardly inclined surface and a left downwardly inclined surface that are inclined downward toward a middle side of the upward transport belt from the respective sides of the right guide wall and the left guide wall on the longitudinal downstream side of the upward transport belt relative to the arrest position of the drop preventing body are formed, and a right inclined surface toward middle and a left inclined surface toward middle, that face toward the middle side of the upward transport belt respectively from the right guide wall and the left guide wall on the longitudinal downstream side of the upward transport belt, and that are inclined toward the longitudinal downstream side of the upward transport belt are formed.

6. A coin lifting device that drops coins, fed from a plurality of arrays of coin storing and dispensing devices provided in a horizontal direction and stacked on a plurality of stages in an up-down direction, onto an upward transport belt inclined forwardly upward toward a subsequent process side, and feeds the coins toward the subsequent process by running of the upward transport belt, the coin lifting device comprising:

at least a drop preventing body having, above the upward transport belt, an upper end being revolvable around an axis line extending approximately in a direction orthogonal to a longitudinal center line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

7. A coin lifting device that drops coins, fed from a plurality of arrays of coin storing and dispensing devices provided in a horizontal direction and stacked on a plurality of stages in an up-down direction, onto an upward transport belt inclined forwardly upward toward a subsequent process side, and feeds the coins toward the subsequent process by running of the upward transport belt, the coin lifting device comprising:

at least an inclined plate which the coins fed from the plurality of coin storing and dispensing devices fall on and then slip down toward the upward transport belt;

a drop preventing body having, under a lower end of the inclined plate and above the upward transport belt, an upper end being revolvable around an axis line extending approximately in a direction orthogonal to a longitudinal center line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

8. A coin lifting device that drops coins, fed from a plurality of arrays of coin storing and dispensing devices provided in a horizontal direction and stacked on a plurality of stages in an up-down direction, onto an upward transport belt inclined forwardly upward toward a subsequent process side, and feeds the coins toward the subsequent process by running of the upward transport belt, the coin lifting device comprising:

at least a plurality of inclined plates which some of the coins fed from the plurality of coin storing and dispensing devices fall on and then slip down toward the upward transport belt and which are provided for each of the coin storing and dispensing devices or for each of a plurality of the coin storing and dispensing devices;

a drop preventing body having, under a lower end of a predetermined inclined plate among the inclined plates and above the upward transport belt, an upper end being revolvable around an axis line extending approximately in a direction orthogonal to a longitudinal center line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

9. A coin lifting device of a coin receiving and dispensing device that discriminates, by a coin distinguishing device, coins thrown into a receiving port, then distributes the coins according to a plurality of denominations by a coin distributing device while transporting the coins one by one by a coin transporting device extending linearly in a direction away from the receiving port, then guides and stores the coins by a denominational drop passage arranged on one side of the coin transporting device into a plurality of denominational storing and dispensing devices arrayed on a plurality of stages in a vertical direction and arranged along the coin transporting device, feeds the coins one by one to a dispensing passage arranged on the other side of the coin transporting device from a feeding port of each of the denominational storing and dispensing devices on the basis of a dispensing command, drops the coins on an upward transport belt arranged along the array of the denominational storing and dispensing devices, and feeds the coins to a dispensing port or a coin storing container by running of the upward transport belt, the coin lifting device of a coin receiving and dispensing device comprising:

a plurality of inclined plates which the coins fed from the plurality of coin storing and dispensing devices fall on and then slip down toward the upward transport belt and which are provided for each of the coin storing and dispensing devices or for each of a plurality of the coin storing and dispensing devices;

a drop preventing body having, under a lower end of a predetermined inclined plate among the inclined plates and above the upward transport belt, an upper end being revolvable around an axis line extending approximately in a direction orthogonal to a longitudinal center line of the upward transport belt, and a lower end being revolvable toward an arrest position where revolution is arrested at a position less than the thickness of a thinnest coin relative to an upper surface of the upward transport belt, and toward a longitudinal downstream side of the upward transport belt further than the arrest position; and a protrusion that is protrusively provided on the upward transport belt and that revolves the drop preventing body while pushing the drop preventing body toward the longitudinal downstream side of the upward transport belt by movement toward the longitudinal downstream side of the upward transport belt, wherein the drop preventing body prevents the coin falling on the upward transport belt with a surface of the upward transport belt on the longitudinal downstream side at the arrest position, and is pushed by the protrusion from a surface side of the upward transport belt on a longitudinal upstream side to flip the stopped coin up, toward the longitudinal downstream side of the upward transport belt.

* * * * *